(12) United States Patent
Mochizuki et al.

(10) Patent No.: US 8,994,745 B2
(45) Date of Patent: Mar. 31, 2015

(54) INFORMATION PROCESSOR, INFORMATION PROCESSING METHOD AND PROGRAM

(75) Inventors: Daisuke Mochizuki, Chiba (JP); Tatsuhito Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 220 days.

(21) Appl. No.: 13/486,367

(22) Filed: Jun. 1, 2012

(65) Prior Publication Data
US 2012/0313965 A1    Dec. 13, 2012

(30) Foreign Application Priority Data
Jun. 10, 2011    (JP) ................... 2011-130543

(51) Int. Cl.
*G09G 5/00* (2006.01)
*G06F 17/30* (2006.01)

(52) U.S. Cl.
CPC ...... *G06F 17/30817* (2013.01); *G06F 17/3028* (2013.01); *G06F 17/30265* (2013.01)
USPC .......................................... 345/619; 701/426

(58) Field of Classification Search
CPC    G06F 17/30241; G06F 3/0482; G06F 3/0484
USPC ................... 345/619, 629; 701/426
See application file for complete search history.

(56) References Cited

U.S. PATENT DOCUMENTS

| | | | |
|---|---|---|---|
| 5,850,618 A * | 12/1998 | Suetsugu et al. ............. | 701/428 |
| 5,945,976 A * | 8/1999 | Iwamura et al. ............. | 345/419 |
| 6,968,511 B1 * | 11/2005 | Robertson et al. ............ | 715/835 |
| 7,783,419 B2 * | 8/2010 | Taniguchi et al. ............ | 701/454 |
| 8,487,935 B2 * | 7/2013 | Aoki .......................... | 345/440.1 |
| 2003/0063072 A1 * | 4/2003 | Brandenberg et al. ........ | 345/173 |
| 2004/0012506 A1 * | 1/2004 | Fujiwara et al. ............. | 340/995.1 |
| 2005/0154505 A1 * | 7/2005 | Nakamura et al. ............ | 701/1 |
| 2005/0177303 A1 * | 8/2005 | Han ............................ | 701/209 |
| 2006/0229807 A1 * | 10/2006 | Sheha et al. .................. | 701/209 |
| 2007/0038950 A1 * | 2/2007 | Taniguchi et al. ............ | 715/768 |
| 2007/0050129 A1 * | 3/2007 | Salmre ......................... | 701/207 |
| 2008/0115083 A1 * | 5/2008 | Finkelstein et al. ........ | 715/805 |
| 2008/0253663 A1 * | 10/2008 | Gotoh et al. ................. | 382/225 |
| 2009/0177381 A1 * | 7/2009 | Taniguchi et al. ............ | 701/208 |
| 2010/0058173 A1 * | 3/2010 | Kizuka et al. ................ | 715/243 |
| 2010/0305843 A1 * | 12/2010 | Yan et al. ..................... | 701/201 |
| 2011/0231799 A1 * | 9/2011 | Kizuka et al. ................ | 715/834 |
| 2011/0239163 A1 * | 9/2011 | Mochizuki et al. .......... | 715/853 |
| 2012/0194547 A1 * | 8/2012 | Johnson et al. ............... | 345/632 |
| 2013/0135344 A1 * | 5/2013 | Stirbu et al. .................. | 345/629 |

FOREIGN PATENT DOCUMENTS

JP    2007-122562    5/2007

* cited by examiner

*Primary Examiner* — M Good Johnson
(74) *Attorney, Agent, or Firm* — Oblon, McClelland, Maier & Neustadt, L.L.P.

(57) ABSTRACT

Provided is an information processor, including a selection section that selects a set of content data satisfying a predetermined condition from a group of content data each associated with a piece of positional information representing a position in a feature space prescribed based on a predetermined feature amount as metadata, and a display format selection control section that selects a display format for displaying at least a part of the feature space and the set of the content data selected by the selection section in accordance with a display screen. The display format selection control section is configured to display an object which includes a direction indicator indicating a direction of existence of the set of the relevant content data within the display screen, and further integrate the relevant plurality of direction indicators into a new direction indicator to display the new direction indicator on the display screen.

9 Claims, 47 Drawing Sheets

DIRECTION INDICATOR DISPLAY AREA IS FORMED

MAP CORRESPONDING TO CLUSTER IS DISPLAYED

FIG.6

| DATA NAME | VALUE |
|---|---|
| CLUSTER ID | 0001 |
| CLUSTER CENTER | (N39.4939999, E141.239901) |
| CLUSTER RADIUS | 56.50 |
| CLUSTER NAME | HANAMAKI |
| NUMBER OF CONTENTS | 10 |
| CONTENT LIST | 1, 2, 3, 4, 7, 10, 12, 13, 15, 20 |
| CHILD CLUSTER LIST | 0002, 0007 |

FIG.23B
LABELS AND DIRECTION INDICATORS
ARE MOVABLE BY USER'S OPERATION
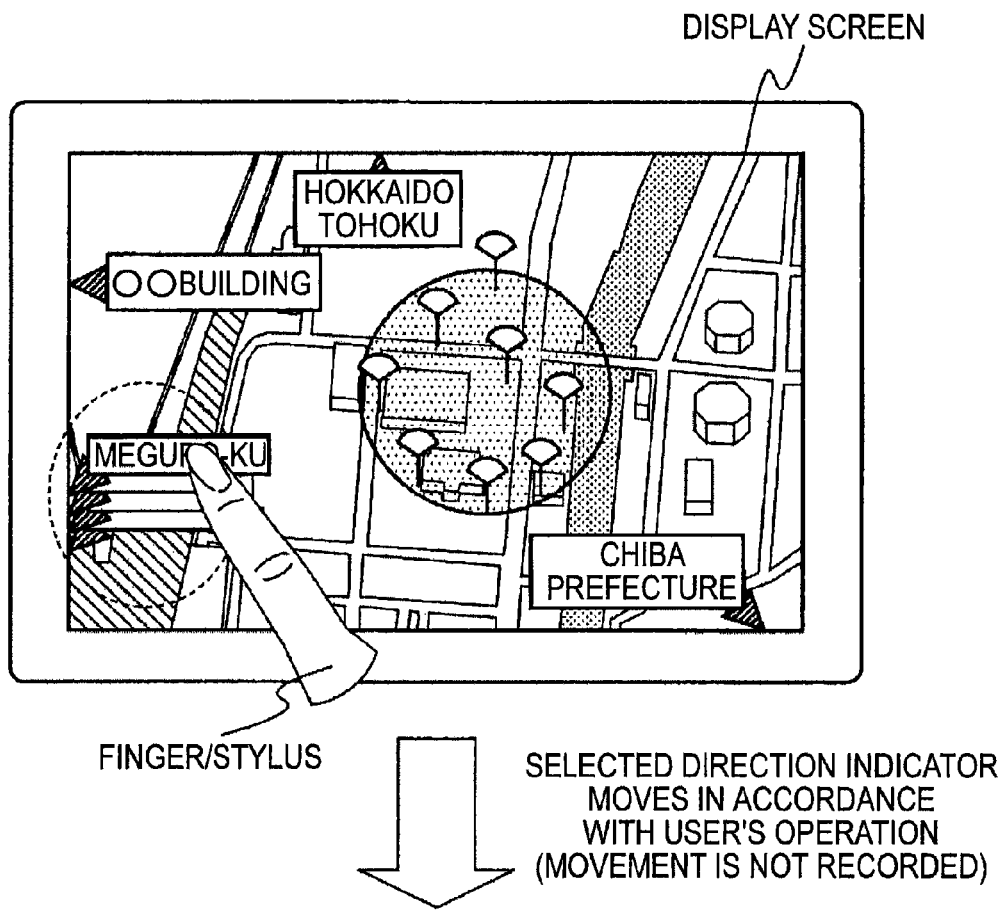
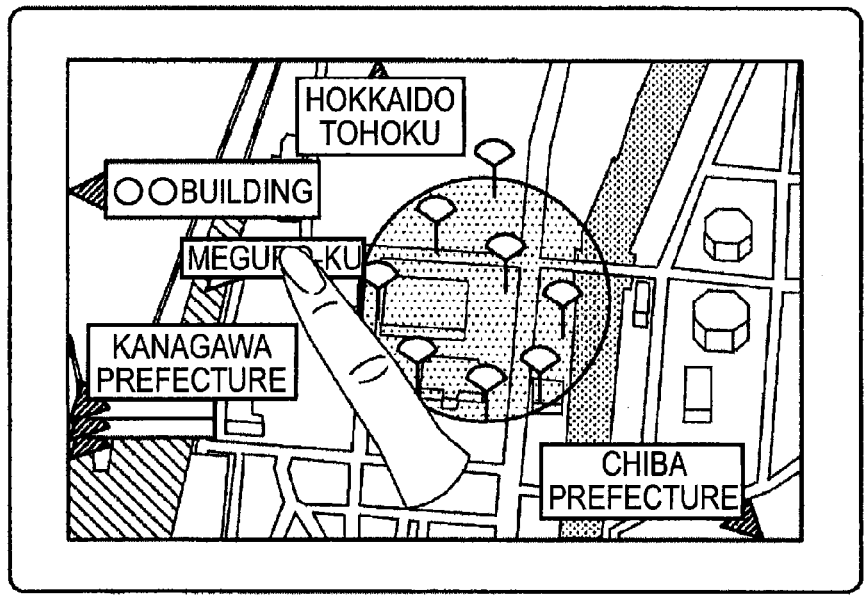

CLUSTERS LOCATED AT A LONG-DISTANCE
ARE INDICATED WITH DIRECTION INDICATOR ONLY

FIG.30
WHEN GROUP DIRECTION INDICATOR IS SELECTED
MAP IS GRAYED OUT
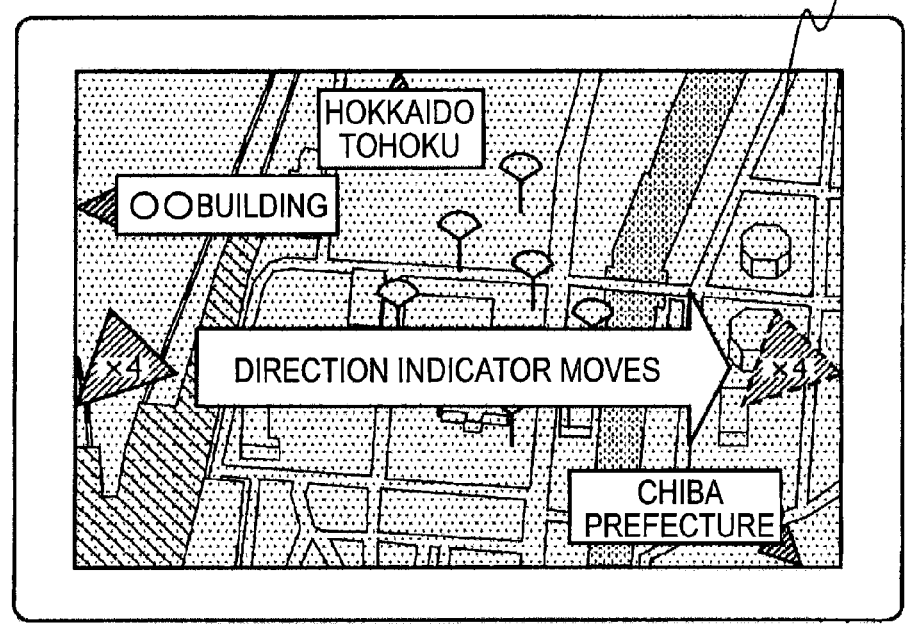
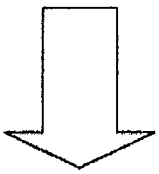
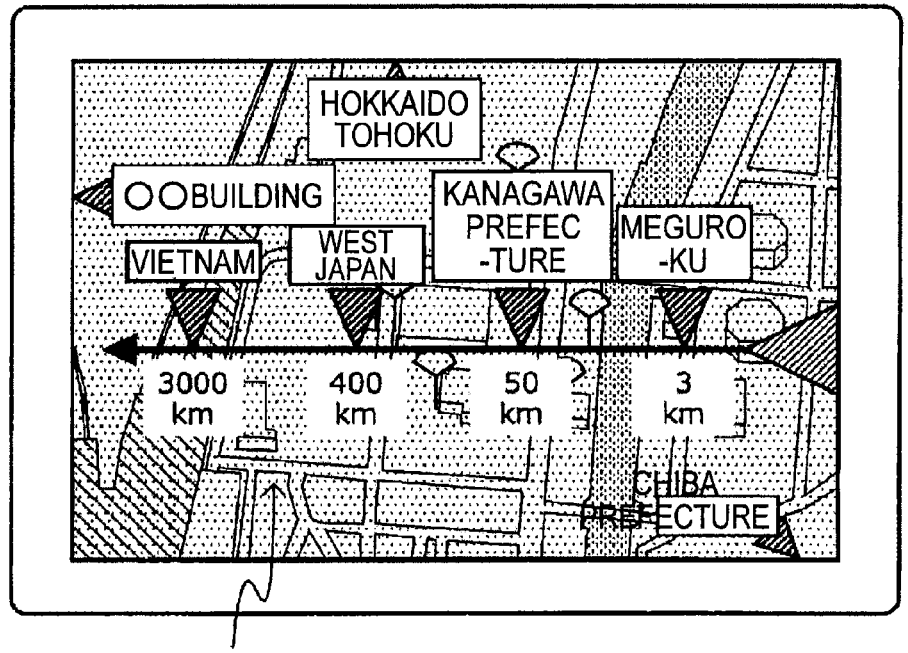
CONTENTS OF GROUP DIRECTION INDICATOR ARE EXPANDED ON A STRAIGHT LINE

FIG.32
WHEN ALL CONTENTS ARE NOT DISPLAYED IN A SINGLE DISPLAY SCREEN
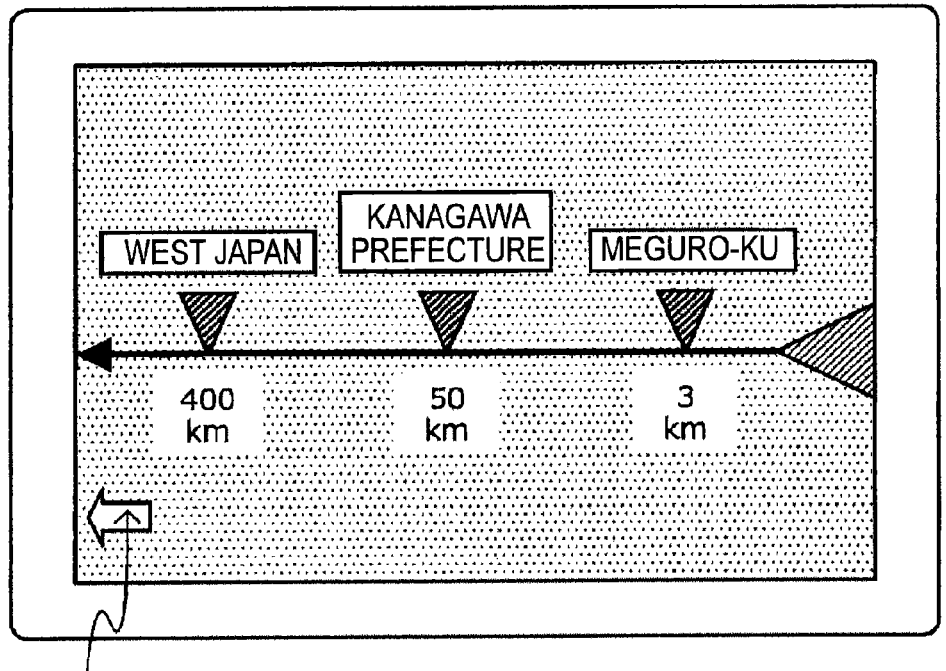
OBJECT INDICATING EXISTENCE OF REMAINING CONTENTS
WHEN OBJECT IS SELECTED
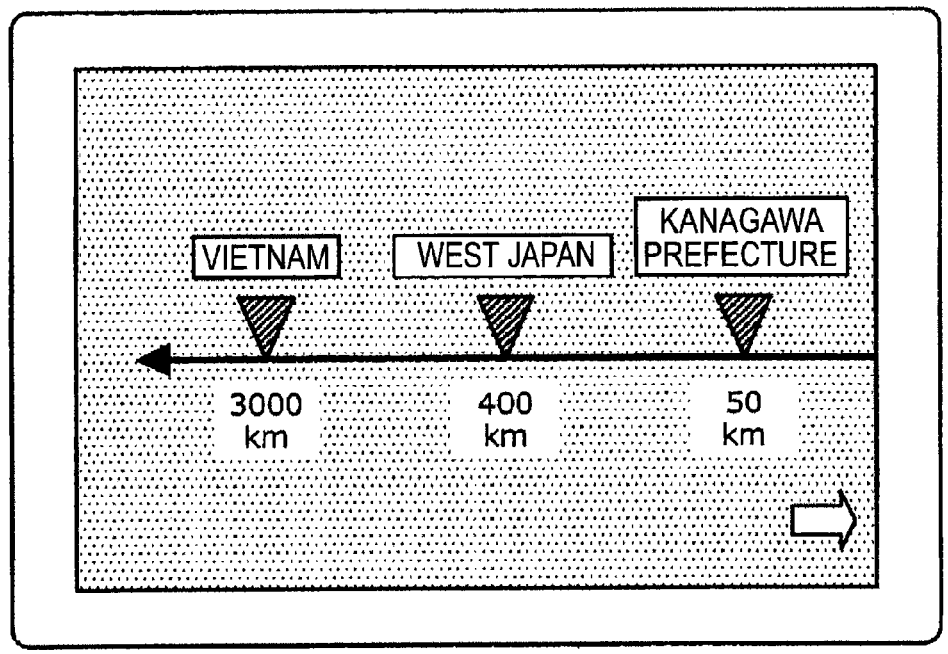

FIG.36
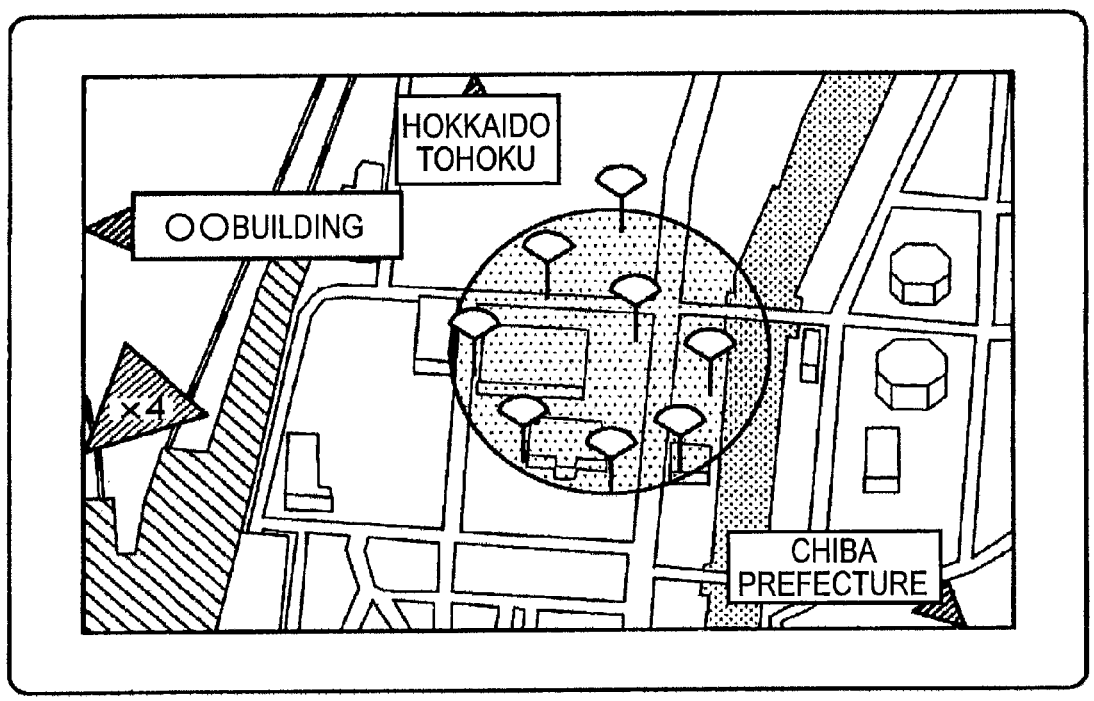
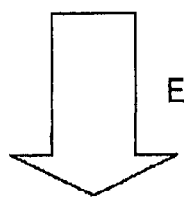
ENTIRE MAP SLIDE
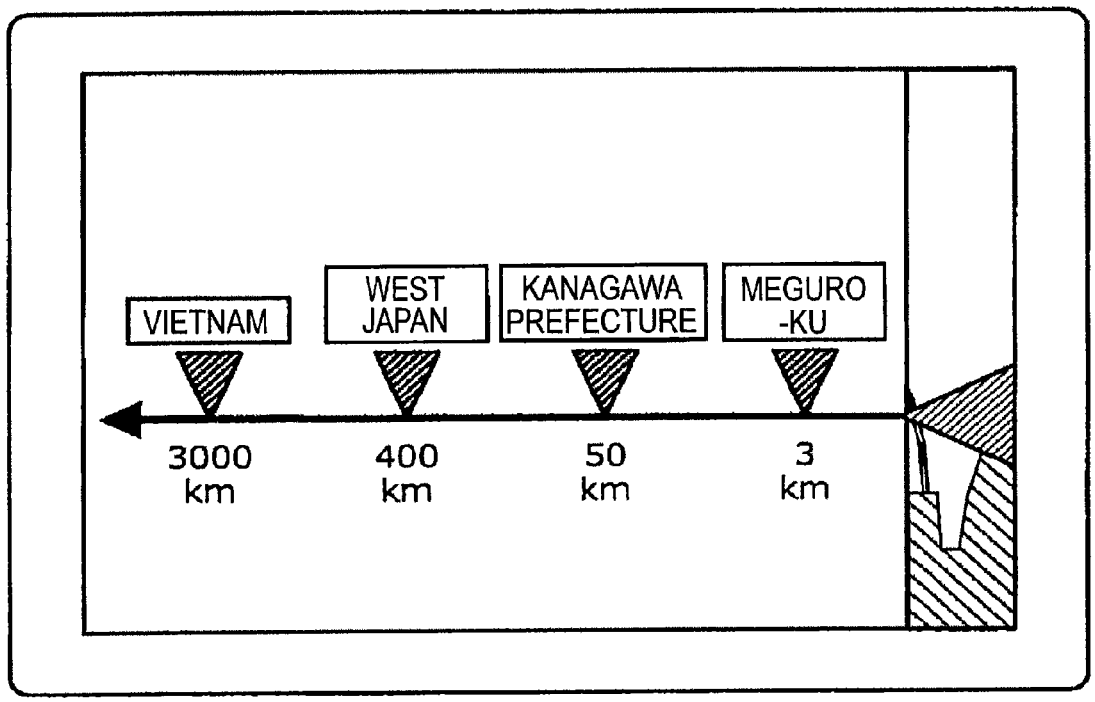

FIG.40
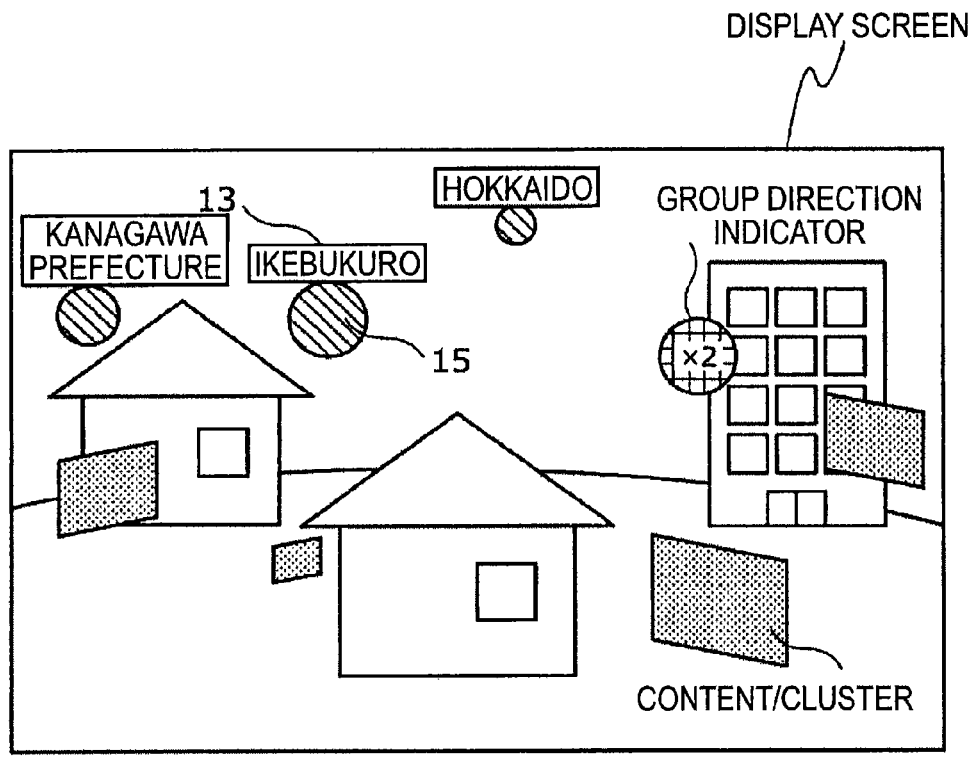
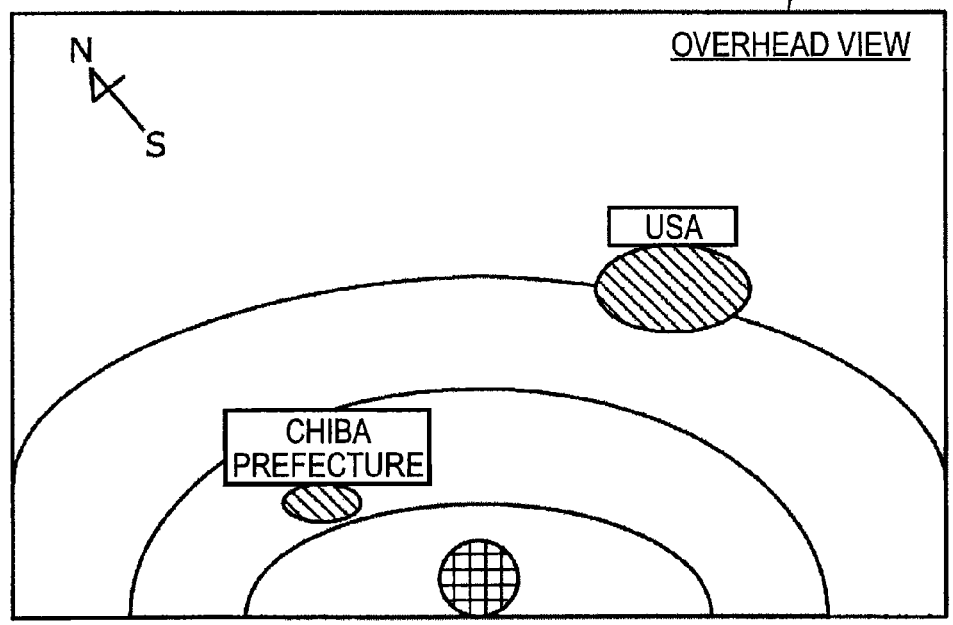

INFORMATION PROCESSOR, INFORMATION PROCESSING METHOD AND PROGRAM

BACKGROUND

The present disclosure relates to an information processor, an information processing method and a program.

There is a technique called clustering for creating a group of data which are positioned in a close distance within a feature space prescribed by a predetermined feature quantity, and the technique is widely applied to various fields. Also, there is a technique widely used to create a tree-like data structure by grouping data included in clusters generated by the clustering.

The data structure, which is thus created, has a configuration to have such structure that an upper hierarchy includes a lower hierarchy. Therefore, the data structure is used for searching for desired data by selecting from a group having coarser granularity to a group having finer granularity in order. Also, the data structure is used to create new groups of certain data each having different granularity by changing the hierarchy (refer to, for example, Japanese Patent Application Laid-Open Publication No. 2007-122562).

When searching for a data group, many users trace in order from the top the hierarchy structure which is formed by clustering technique to obtain desired data. The Japanese Patent Application Laid-Open Publication No. 2007-122562 teaches a technique to provide a display screen which allows users to instinctively comprehend a hierarchy structure and provide easy data search.

When data as a target of search are cleared, the search method disclosed in the Japanese Patent Application Laid-Open Publication No. 2007-122562 is effective. However, when searching for content data like pictures which have a similar situation, for example, as the situation the contents are generated (for example, contents of pictures which taken at a generally identical location), it is more convenient to browse or search for the data based on a piece of presently focused data.

Under such circumstances, in these days, new applications and services are under development, which are capable of displaying a list of contents based on a specified location.

SUMMARY

However, in a known application for displaying a list of contents which used a specified position as a reference as describe above, since every contents were displayed on a display screen, there was a problem that the display screen got cluttered.

Accordingly, the present disclosure proposes an information processor, an information processing method and a program capable of providing information on contents without cluttering the display screen.

According to an embodiment of the present disclosure, there is provided an information processor, including a selection section that selects a set of content data satisfying a predetermined condition from a group of content data each associated with a piece of positional information representing a position in a feature space prescribed based on a predetermined feature amount as metadata, and a display format selection control section that selects a display format for displaying at least a part of the feature space and the set of the content data selected by the selection section in accordance with a display screen. The display format selection control section is configured to, with respect to a set of the content data located outside the displayed feature space as the feature space to be displayed on the display screen, display an object which includes a direction indicator indicating a direction of existence of the set of the relevant content data within the display screen, and when each of a plurality of the direction indicators indicates a similar direction to each other, further integrate the relevant plurality of direction indicators into a new direction indicator to display the new direction indicator on the display screen.

According to another embodiment of the present disclosure, there is provided an information processing method, including selecting a set of content data which satisfies a predetermined condition from a group of content data associated with a piece of positional information representing a position in a feature space prescribed based on a predetermined feature amount as metadata, and selecting a display format for displaying at least a part of the feature space and a set of the selected content data in accordance with a display screen. When selecting the display format, with respect to the set of the content data located outside a displayed feature space as the feature space to be displayed on the display screen, an object including a direction indicator indicating a direction of existence of the set of the relevant content data is displayed within the display screen, and when indicating a direction in which a plurality of the direction indicators indicate a similar direction to each other, the relevant plurality of direction indicators are further integrated into a new direction indicator so as to be displayed on the display screen.

According to still another embodiment of the present disclosure, there is provided a program for causing a computer to achieve a selection function to select a set of content data satisfying a predetermined condition from a group of content data each associated with a piece of positional information representing a position in a feature space prescribed based on a predetermined feature amount as metadata, and a display format selection control function to select a display format for displaying at least a part of the feature space and the set of the content data selected by the selection function in accordance with a display screen. The display format selection control function is configured to, with respect to a set of the content data located outside a displayed feature space as the feature space to be displayed on the display screen, to display an object which includes a direction indicator indicating a direction of existence of the set of the relevant content data within the display screen, and when each of a plurality of the direction indicators indicates a similar direction to each other, to further integrate the relevant plurality of direction indicators into a new direction indicator to display the new direction indicator on the display screen.

According to the embodiment of the present disclosure, the selection section selects a set of content data satisfying a predetermined condition from a group of content data each associated with a piece of positional information representing a position in a feature space prescribed based on a predetermined feature amount as metadata, and the display format selection control section selects a display format for displaying at least a part of the feature space and the set of the content data selected by the selection section in accordance with a display screen. The display format selection control section is configured to, with respect to a set of the content data located outside the displayed feature space as the feature space to be displayed on the display screen, display an object which includes a direction indicator indicating a direction of existence of the set of the relevant content data within the display screen, and when each of a plurality of the direction indicators indicates a similar direction to each other, further integrate the relevant plurality of direction indicators into a new direction indicator to display the new direction indicator on the display screen.

As described above, the present disclosure is capable of providing information on contents without cluttering the display screen.

BRIEF DESCRIPTION OF THE DRAWINGS

FIG. 6 is a diagram for explaining a metadata associated with a cluster;

FIG. 23B is an illustration showing an example of the display screen control method according to the embodiment;

FIG. 30 is an illustration showing an example of the display screen control method according to the embodiment;

FIG. 32 is an illustration showing an example of the display screen control method according to the embodiment;

FIG. 36 is an illustration showing an example of the display screen control method according to the embodiment;

FIG. 40 is an illustration for explaining the display screen control method according to the embodiment;

DETAILED DESCRIPTION OF THE EMBODIMENTS

Figure 1:
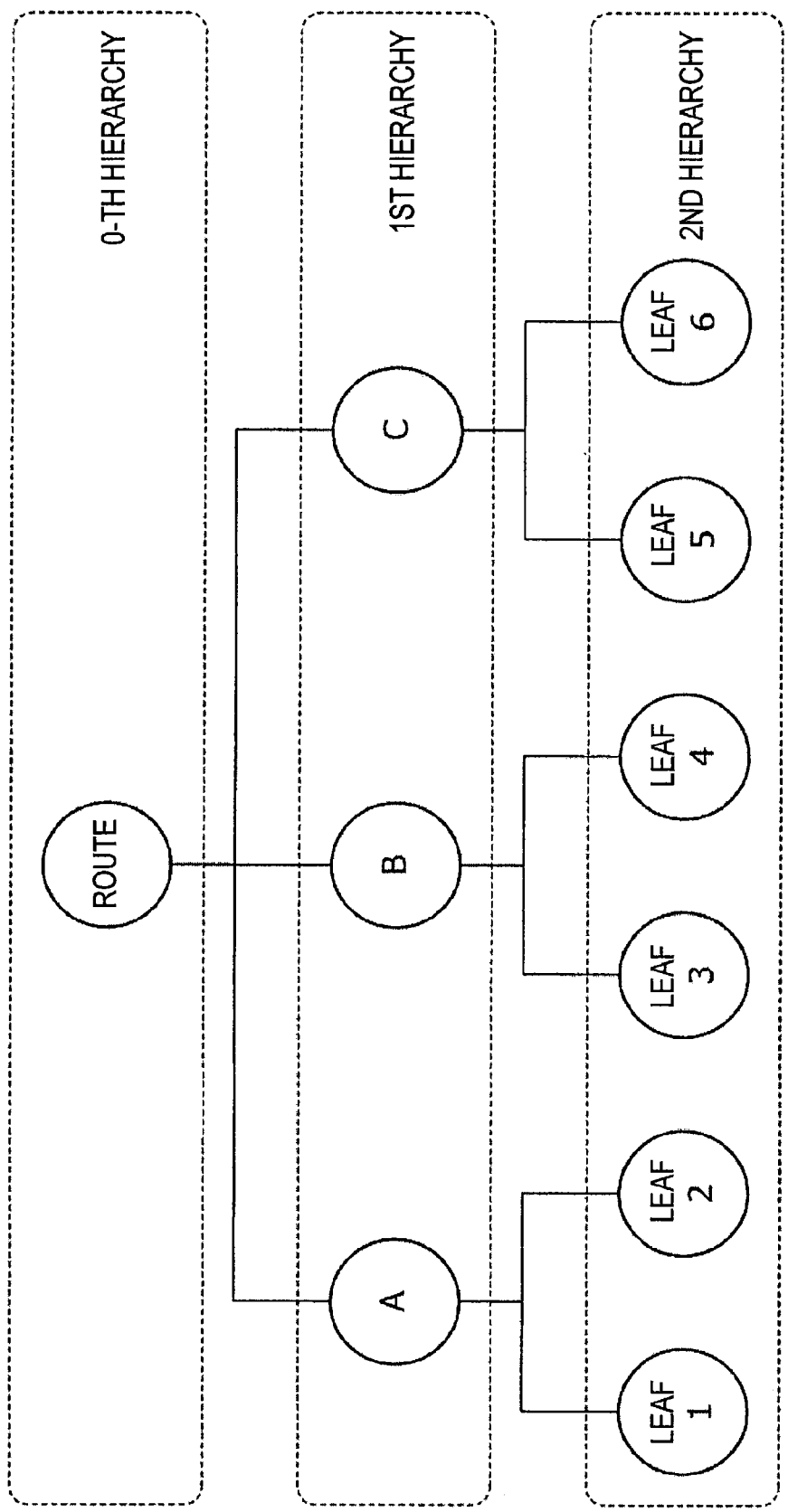
FIG. 1 is an illustration for explaining a tree structure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Description will be made in the following order.
(1) Tree structure
(2) First embodiment
  (2-1) Outline of clustering used in the information processor
  (2-2) Configuration of the information processor
  (2-3) Flow of information processing method
  (2-4) First example of modification
(3) Second embodiment
  (3-1) Example of display screen
  (3-2) Configuration of information processor
  (3-3) Example of control method of display screen
(4) Third embodiment
  (4-1) Configuration of information processor
(5) Hardware configuration of an information processor according to an embodiment of the present disclosure
(Tree Structure)

Before describing embodiments according to the present disclosure, several terms relevant to a tree structure which are used in the description will be briefly described referring to FIG. 1. FIG. 1 is an illustration for explaining the tree structure.

The tree structure includes a plurality of elements (marked with a circle in FIG. 1) as shown in FIG. 1. Each of the plurality of elements is referred to as node. In the tree structure, a node positioned at the top is referred to as route node. As viewed from the route node, several branches extend downward from the route node in the figure, and at the end of each branch, a node is positioned respectively. By repeating branching as described above, the tree structure is formed to have a multilayered structure as shown in FIG. 1. In the tree structure, a node positioned at the bottom is referred to as a leaf node. As illustrated in the figure, no branch extends from the leaf nodes.

Here, when focusing to a node "B" shown in FIG. 1, a branch extending upward from the node B is connected to a route node; and branches extending downward from the node B are connected to two nodes (leaf nodes) of a leaf 3 and a leaf 4. Herein, a node, which is directly connected to a branch extending upward (i.e. toward the route node) like the route node with respect to the node B, will be referred to as parent node. Also, a node, which is directly connected to a branch extending downward (i.e. in a direction opposite to the direction toward route node) with respect to the node B like the leaf 3 and the leaf 4, will be referred to as child node.

Naming of "parent node" and "child node" is just a relative naming. When focused node is changed, the naming is also changed. For example, the node B is the parent node with respect to the leaf 3 or leaf 4, but the node B is a child node with respect to the route node.

The tree structure has a multilayered structure as shown in FIG. 1. Hereinafter, a hierarchy to which the route node belongs will be referred to as 0-th hierarchy; a hierarchy to which a child node of the route node belongs will be called as first hierarchy; and a hierarchy to which a child node of the node which is positioned at the first hierarchy will be referred to as second hierarchy. Hereinafter, the hierarchies will be referred to as a third hierarchy, a fourth hierarchy . . . in order as necessary.

When focusing to the node B, child nodes other than the focused node, which are branched from the parent node of a certain node like the node A and node C, will be referred to as sibling node. For example, when focusing to the leaf 3 in FIG. 1, a sibling node thereof is the leaf 4.

FIG. 1 shows an example of a case where a plurality of branches extend from a certain node. However, the number of the branches extending downward (i.e. in a direction opposite to the direction toward route node) may be only one. Also, the number of the branches extending from a certain node is not limited to the example shown in FIG. 1.

First Embodiment

Outline of Clustering Used in the Information Processor

Figure 2:
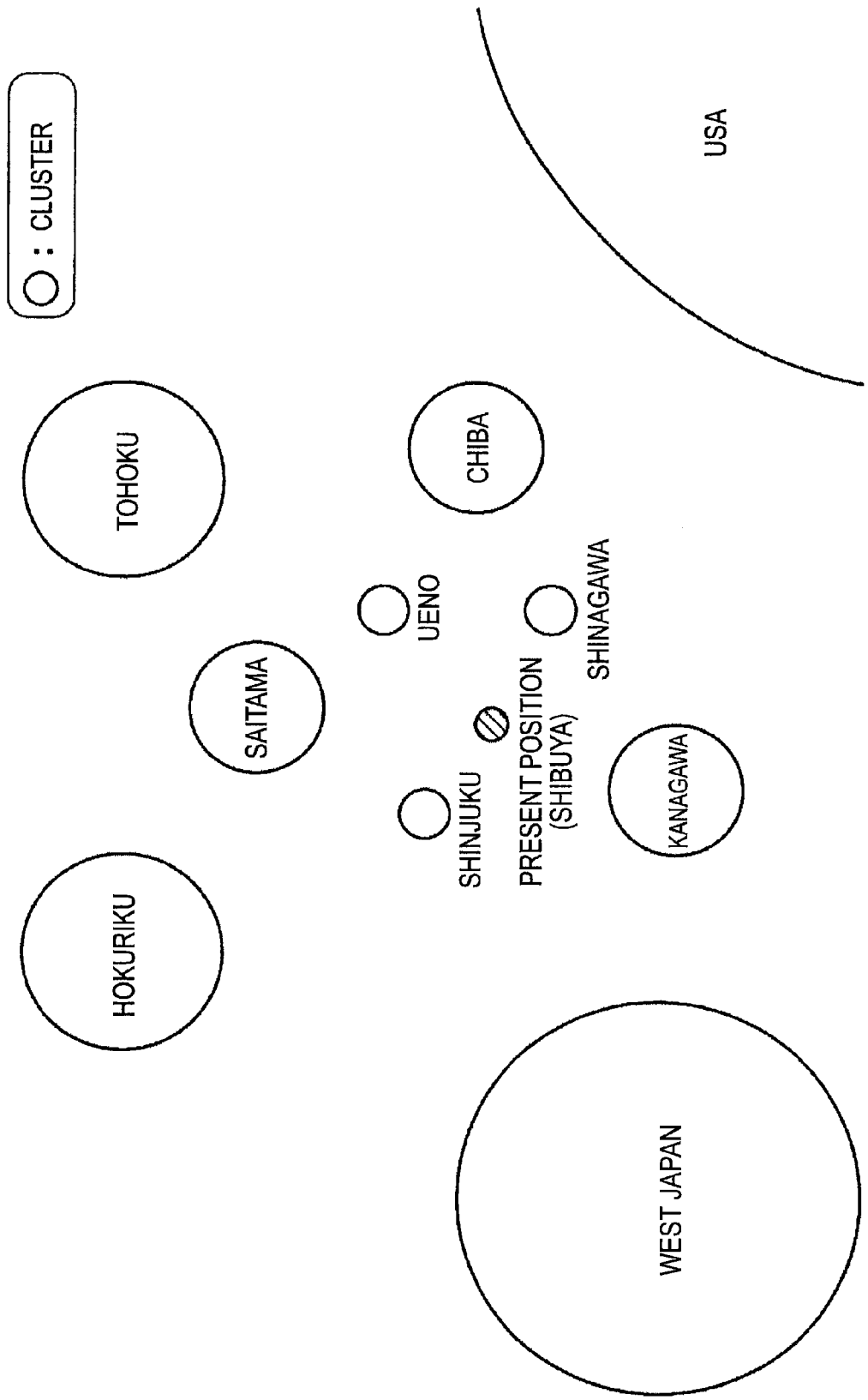
FIG. 2 is an illustration for schematically explaining a clustering used in an information processor according to a first embodiment of the present disclosure.

Then, referring to FIG. 2, outline of the clustering used in the information processor according to a first embodiment of the present disclosure is described.

As described above, when grouping (clustering) data, there may be a case the data is desirably grouped in such a manner that, defining a certain point as a reference, data located near the certain point is divided into a fine granularity, while data located far away from the certain point is grouped into a coarse granularity.

For example, it is assumed a case of an apparatus which displays neighboring recommended spots corresponding to the present position on a map. In this case, it is assumed that spots located near the present position are displayed without being grouped (or, grouping on 1 data=1 group basis). Also, it is assumed that spots located a little away from the present position are displayed being grouped on municipality basis, while spots located far away from the present position are displayed being grouped on country basis.

FIG. 2 shows an example of a grouping result of which when the present position is located in the vicinity of Shibuya in Tokyo, the granularity of the group (i.e. cluster) is changed corresponding to the distance from Shibuya. It is understandable that clusters representing positions of "Shinjuku", "Ueno" and "Shinagawa" which are groups (clusters) located near the present position of Shibuya are displayed in a finer granularity respectively; and the granularity of clusters gets coarser as the distance from the present position increases.

With a display provided on an apparatus as described above, it is possible for a user to easily and roughly comprehend a positional relationship between the clusters displayed. When such apparatus is achieved, user's convenience can be increased as a result.

When it is desired to classify the size of groups based on the distance from a specified position as the above-described example, with this grouping, clustering can be made while considering the distance from the certain point to the data in addition to an absolute position of data on a feature space.

However, in such clustering, especially when the data size is large, the load of operation amount becomes larger. Therefore, If spots are grouped based on the present position as the above example, corresponding to the present position which continuously changes as time passes, when the clustering is executed from the beginning every time as the present position changes, a large load is imposed to a system.

In the case of the clustering based on actual present position, for example in the real world, since extremely high speed movement is not conceivable, such application may be possible that the present position is updated for example, once a minute. However, when it is intended to achieve the same technique in a virtual world, such as in the case where it is hard to predict when and how much a specific position changes, it is difficult to achieve the clustering.

Considering such circumstances, the information processor according to the embodiment described below uses a tree structure representing a cluster structure generated according to the clustering that generates a cluster structure of multi-hierarchy having different granularity of the cluster. Also, in the information processor according to the embodiment, when an area is specified in a feature space prescribing the cluster structure, a desired cluster will be extracted from various hierarchies by using the specified area and the generated cluster structure. With this, the information processor according to the embodiment enables to perform clustering that granularity of the cluster is changed based on the distance from the specific area in the feature space while reducing the load required for the clustering.

<Configuration of the Information Processor>

Now, the configuration of the information processor according to the embodiment is described in detail while referring to FIG. 3-FIG. 15.

[Outline of the Information Processor]

The information processor according to the embodiment uses a tree structure in which various kinds of content data are disposed under a predetermined condition, and the information processor displays a group (i.e. cluster) on the display screen, in which content data or a group of content data is arranged based on a certain rule. The information processor according to the embodiment uses a tree structure in which content data, which are associated with positional information representing a location of a feature space as metadata based on a predetermined feature quantity, are prescribed as leaf nodes; and a set of nodes, in which the distance between the nodes in a feature space satisfies predetermined conditions, is prescribed as a parent node of the nodes which satisfy the predetermined conditions.

As for examples of the content data handled by the information processor according to the embodiment, image contents such as still image contents, motion picture contents, various kinds of character information, image information or the like, which are registered in a server or the like to share various kinds of information among users are given. In addition to above data, the following contents including, for example, mail, music, schedule, electronic money usage record, phone call record, content view record, sightseeing information and local information, news and weather forecast, ring alert mode record or the like are available.

The following description will be made while taking image contents such as still image content or motion picture content as examples. However, when the positional information representing a position in the feature space is data attached as, for example, metadata, the information processor according to the embodiment is able to handle an arbitrary information or content data.

The data representing content data and various kinds of information as described above are preferably stored in the information processor. However, when data main body is stored in an apparatus such as a server which is provided outside of the information processor, the information processor may store metadata corresponding to the data main body. In the following description, an example in which the information processor stores data representing content data and various kinds of information along with metadata, is given.

As for an example of a predetermined feature quantity stored in the metadata, for example, a piece of information on degrees of latitude and longitude for identifying a location where the content is generated, a piece of information on clock time when the content is generated, a piece of information on address representing a location where the content is generated and the like are given. The metadata on the predetermined feature quantity may be stored in, for example, an Exif (exchangeable image file format) tag associated with content data.

The information on degrees of latitude and longitude for identifying location is, for example, information which can be obtained by obtaining or analyzing GPS signal. The positional information like degrees of latitude and longitude is a feature quantity for identifying a position on the surface of a spherical earth (position on the surface of the earth). Therefore, feature space prescribed based on the information on the degrees of latitude and longitude is a space representing a position on a spherical surface of the earth. Needless to say, the position in such feature space may be defined by specifying the degree of latitude and the degree of longitude respectively. Also, the distance between two positions on the feature space can be defined by using a so-called great circle distance.

Also when the information representing a position on the surface of the earth is used as the feature quantity, and when the focused area is a local area, the surface of the earth may be assumed as an approximate plane. Therefore, the feature space may be prescribed by using degree of latitude as x-coordinate, and the degree of longitude as y-coordinate. The feature space in this case is the plane space (Euclidean space) prescribed by two-dimensional vectors like (x, y), and the distance between two positions on the feature space may be defined using so-called Euclidean distance.

When the information on clock time of generation of content is used as the feature quantity, the feature space is prescribed based on the one-dimensional information of time. Therefore, the feature space in this case is defined by the clock time as a scalar quantity, and the distance between two positions on the feature space may be defined by a difference of clock time.

The degree of such feature space is not limited to one-dimension or two-dimension. For example, the feature space may be handled as a three-dimensional space considering a width direction, a height direction and a depth direction, and further a space of four-dimensional or more may be handled as the feature space.

The tree structure representing a clustering result of contents, which is made based on a distribution of contents in the feature space, has the following characteristics.

(1) Content data corresponds to leaf node.
(2) Data which are positioned in a distance close to each other on a feature space are included in a same node.
(3) When a node itself, which includes data positioned in a distance close to each other, is positioned in a distance close to other node, these nodes are included in a same node.
(4) Plural nodes, which are classified in a same hierarchy level, have the similarity in node size.

In addition to the characteristics listed in (1)-(4) above, the tree structure used in the information processor according to the embodiment may further have the following characteristic.

(5) Excepting the nodes which have parent-child relationship, an area in the feature space of one node does not overlap with an area in the feature space of the other node.

The clustering of contents which are associated with metadata of positional information may be made based on a distance in the feature space as described above. However, for example, the clustering may be made based on address hierarchy by focusing administrative district such as prefectural and city governments or municipality, from a view point that the respective nodes are included in a same administrative district, and so on. Further, the clustering may be made by using a metadata different from a view point such as distance in a feature space or administrative district.

Figure 3:
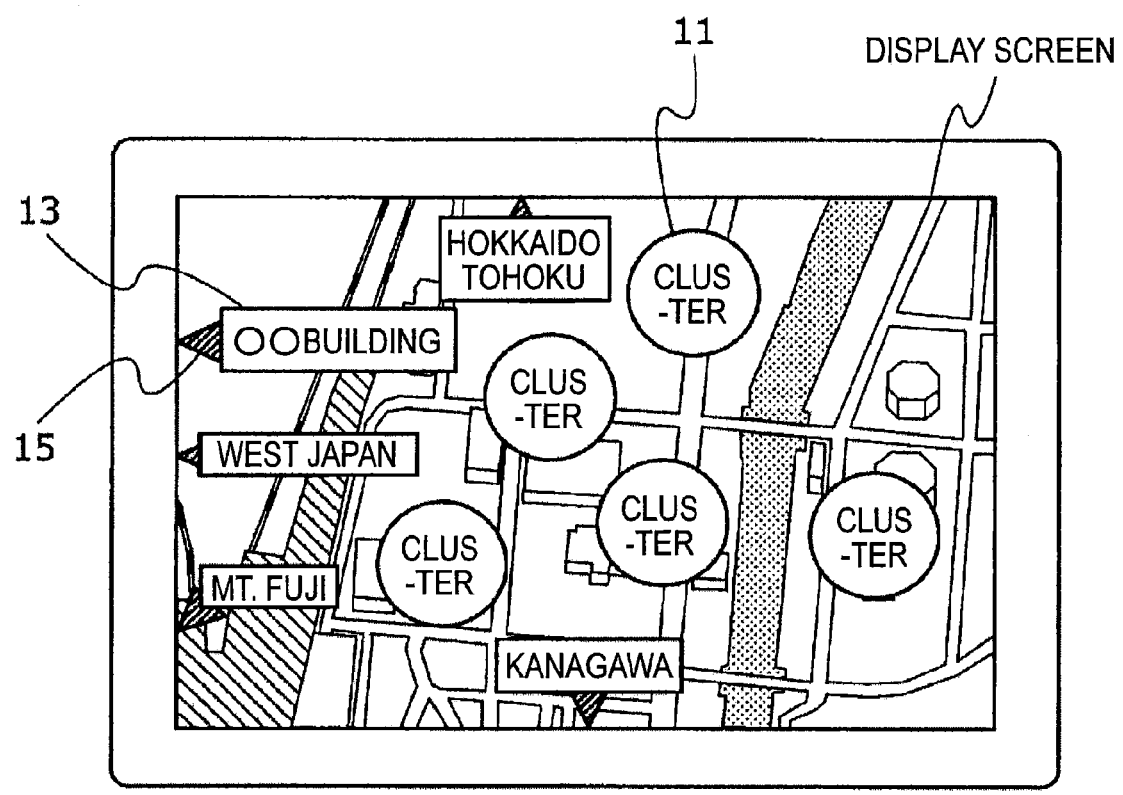
FIG. 3 is an illustration for explaining an information processor according to the embodiment.
Figure 4:
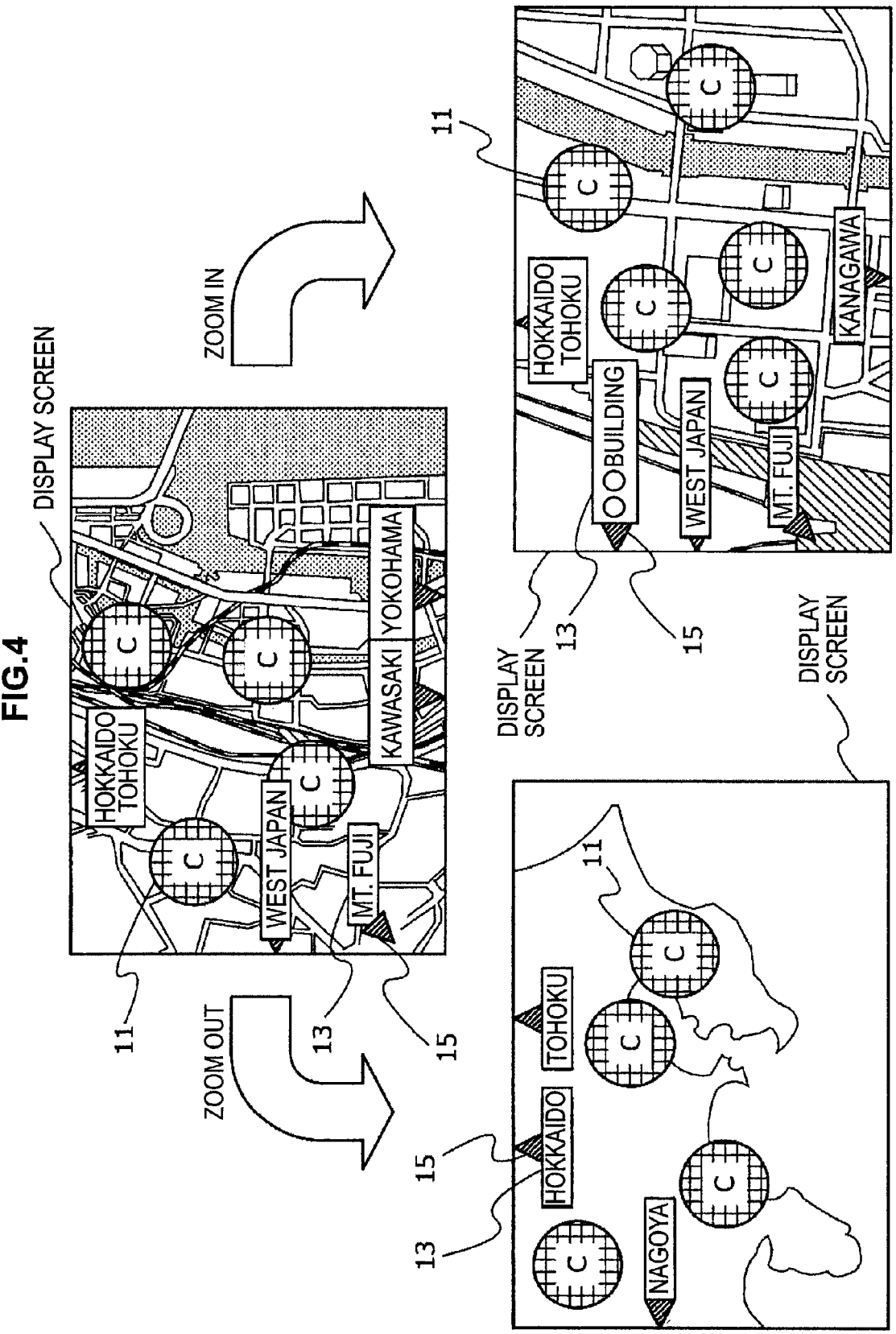
FIG. 4 is an illustration for explaining the information processor according to the embodiment.

FIG. 3 and FIG. 4 illustrate an example of the display screen of the information processor according to the embodiment. In the example shown in FIG. 3, the content data is associated with positional information representing a position on the earth surface, and clusters are displayed along with map information corresponding to the feature space. The information processor according to the embodiment adjusts the granularity of the cluster 11 displayed within the display screen corresponding to the size of the feature space displayed on the display screen, and adjusts the granularity of the clusters which are not displayed within the display screen in accordance with the distance between the cluster and the display screen. After that, the information processor according to the embodiment indicates existence of clusters which are not displayed within the display screen with a label 13 that indicates a name of the cluster and a direction indicator 15 that indicates existing position of the cluster on the display screen to notify the user.

It is assumed that a display screen shown in upper portion in FIG. 4 is displayed on a display device of the information processor at a certain time. Here, when the user makes a zoom-in operation, the scale of the map, which is displayed on the display screen is reduced as shown in right-lower portion in FIG. 4, and accompanying such change, the size (granularity of the cluster) of the cluster 11 displayed within the display screen is also reduced. As a result, in the display screen shown in the upper portion in FIG. 4, for example, assuming that the size of the cluster 11 is 1 km in radius, in the display screen shown in the right-lower portion in FIG. 4, for example, the size of the cluster 11 changes to 200 m in radius. On the other hand, when the user makes a zoom-out operation on the display screen shown in the upper portion in FIG. 4, as shown in the left-lower portion in FIG. 4, the scale of the map displayed on the display screen gets larger, and accompanying such change, the size of the cluster 11 displayed within the display screen also gets larger. As a result, in the display screen shown in the upper portion in FIG. 4, assuming that, for example, the size of the cluster 11 is 1 km in radius, in the display screen shown in the left-lower portion in FIG. 4, for example, the size of the cluster 11 changes to 10 km in radius.

Accompanying the change of the granularity of the cluster displayed on the display screen, the granularity of the clusters existing out of the display screen also changes, and the size of the name on the label 13 displayed within the display screen and the direction indicator 15 also changes. Here, as shown in FIG. 4, for example, by adapting so that an item which exists closer to the display screen among the clusters existing out of the display screen is displayed with a larger label 13, the convenience of the user's operation can be enhanced. The display control method of the label 13 and direction indicator 15 will be described later.

As for particular examples of the information processor according to the embodiment, for example, mobile communication equipment such as personal computer, car navigation system, mobile phone and smart phone; portable content players such as portable game console, portable music player and portable motion picture player; imaging apparatuses such as tablet mobile terminal, digital still camera and digital video camera; various kinds of digital home electronics; content management view service linked with map service on a network are given; but are not limited to the examples above.

[Configuration of the Information Processor]

Figure 5:
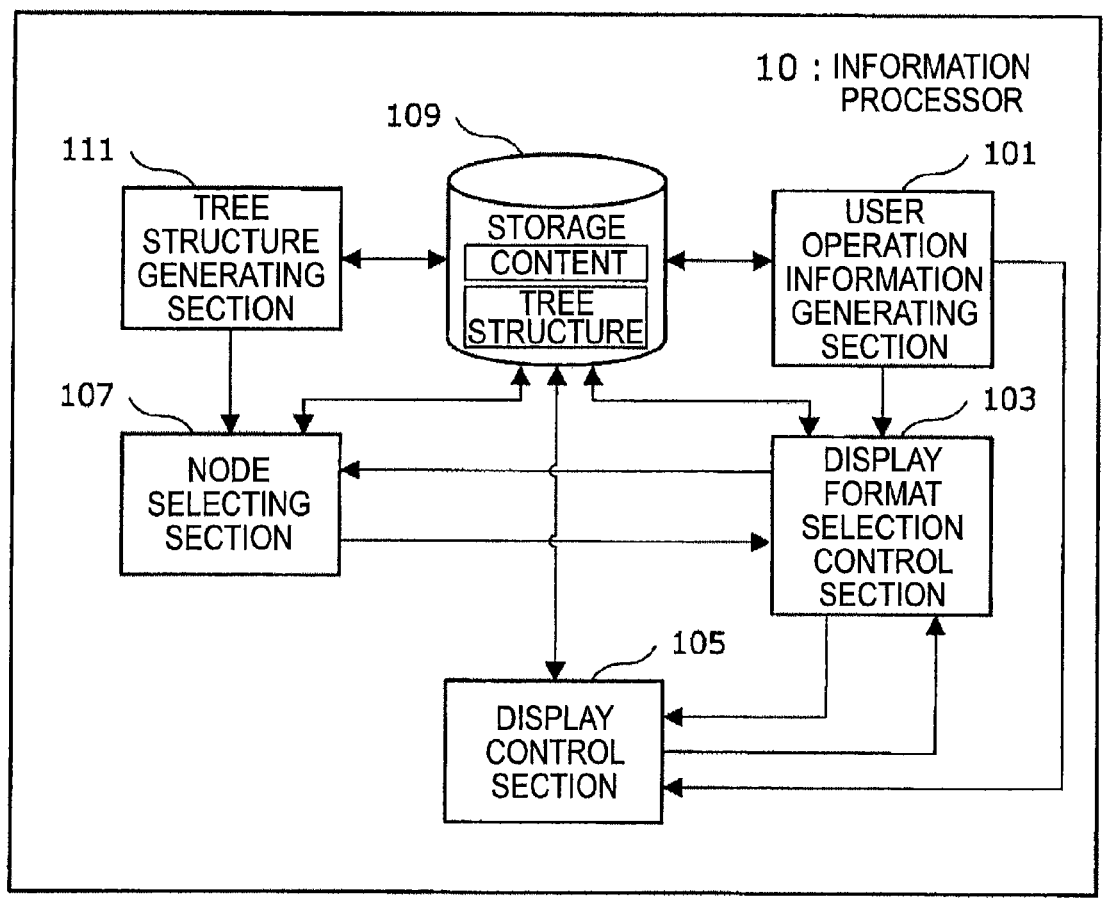
FIG. 5 is a block diagram showing a configuration of the information processor according to the embodiment.

Now, referring to FIG. 5, the configuration of the information processor 10 according to the embodiment will be described in detail. FIG. 5 is a block diagram showing the configuration of the information processor 10 according to the embodiment.

The information processor 10 according to the embodiment includes mainly a user operation information generating section 101, a display format selection control section 103, a display control section 105, a node selecting section 107 and a storage 109 as shown in FIG. 5. In addition to these processing sections, the information processor 10 according to the embodiment may further include a tree structure generating section 111.

The user operation information generating section 101 includes, for example, a CPU (central processing unit), a ROM (read only memory), a RAM (random access memory), an input device and the like. The user operation information generating section 101 generates user's operation information representing operation (user's operation) which is made by a user using an input device including a keyboard, a mouse, various kinds of buttons, a touch panel and the like provided to the information processor 10. After generating the user's operation information representing the user's operation, the user operation information generating section 101 outputs the generated user's operation information to the display format selection control section 103 and the display control section 105 described below.

The display format selection control section 103 includes, for example, a CPU, a ROM, a RAM and the like. The display format selection control section 103 selects a display format for displaying at least a part of feature space, which is prescribed based on a predetermined feature quantity, and content data or a set of content data (cluster) while adjusting the size thereof to the display screen while collaborating with the display control section 105 and the node selecting section 107 described below. The tree structure may be previously generated in the information processor 10 according to the embodiment; or may be previously generated in various kinds of devices (for example, an information processing server or the like existing on a network) capable of communicating with the information processor 10.

For example, when user's operation information requesting to start display of a cluster on the display screen or user's operation information requesting to shift display area displayed on the display screen is notified from the user operation information generating section 101, the display format selection control section 103 refers to an initial setting value or the like stored in the storage 109 or the like described below to specify the size of the feature space to be displayed on the display screen (for example, a map plane representing a position on the earth surface). After that, the display format selection control section 103 determines the granularity (cluster size) of a cluster to be displayed on the display screen in accordance with the size of the specified feature space, and notifies the information on the size of the specified feature space and the granularity of determined cluster to the node selecting section 107 described below. With this, a cluster to be displayed on the display screen is selected by the node selecting section 107 described below. When the information indicating the cluster to be displayed on the display screen is notified from the node selecting section 107, the display format selection control section 103 determines a display format for the cluster to be displayed, and causes the display control section 105 described below to carry out the display control of the cluster.

When the user's operation information requesting change of the size of the feature space displayed on the display screen is notified from the user operation information generating section 101, the display format selection control section 103 specifies the size of the feature space being displayed at that time. After that, the display format selection control section 103 changes the size of the feature space to be displayed on the display screen by responding to the notified user's operation information. The display format selection control section 103 determines the granularity (cluster size) of the cluster to be displayed on the display screen according to the size of the changed feature space, and notifies the information on the size of the changed feature space and granularity of the determined cluster to the node selecting section 107 described below. With this, the cluster to be displayed on the display screen is selected by the node selecting section 107 described below. When the information indicating the cluster to be displayed on the display screen is notified from the node selecting section 107, the display format selection control section 103 determines the display format for the cluster to be displayed, and causes the display control section 105 described below to carry out the display control of the cluster.

Here, it may be adapted so that, the granularity of the cluster displayed within the display screen is preset based on the size (for example, size of selectable map plane, reduction scale of selectable map plane and the like) of the feature space selectable by the display format selection control section 103, and the display format selection control section 103 selects the granularity of the cluster according to the preset value. Also it may be adapted so that the display format selection control section 103 determines the granularity of the cluster based on a predetermined calculating formula using the size of the feature space to be displayed on the display screen. The method with which the display format selection control section 103 determines the granularity of the cluster is not limited to the above example, but the display format selection control section 103 may determine the granularity of the cluster using an arbitrary method.

In the embodiment, each of the clusters corresponding to the nodes respectively of the tree structure is associated with a piece of metadata as shown in FIG. 6. Hereinafter, the metadata is referred to as cluster data.

The cluster data is a piece of information unique to each of the generated clusters. As shown in FIG. 6, the cluster data stores identification information unique to the cluster (cluster ID), information on center position and radius of the cluster, the number of contents included in the cluster, a content list, a list of child clusters and the like.

The cluster ID is a piece of identification information unique to the cluster corresponding to the cluster data, in which, for example, a 4-digit integer value is recorded. The cluster center position is a piece of data indicating the center position of the cluster corresponding to the cluster data, in which a piece of information specifying a position in the feature space (for example, information representing degrees of latitude and longitude corresponding to center position of the cluster) is recorded. The cluster radius is a piece of data indicating the radius of the cluster corresponding to the cluster data, which is recorded with an arbitrary format suitable to represent a feature space prescribing a feature quantity; for example, a value with a unit of meter (m). The cluster name is a piece of data representing a name associated with the cluster. The number of contents is a piece of data representing the number of contents included in an area of the cluster corresponding to the cluster data. The content data list is a data representing an ID of a content included in the area of the cluster corresponding to the cluster data (in FIG. 6, integer value is used), and for example, a list of integer values is recorded as the content ID.

When displaying a selected cluster, in order to allow a user to recognize existence of a cluster positioned out of the display screen (hereinafter, occasionally referred to simply as cluster out of display screen), the display format selection control section 103 is capable of displaying a label 13 and a direction indicator 15 as shown in FIG. 3 and FIG. 4. Hereinafter, the label 13 and the direction indicator 15 may be occasionally referred to as a cluster object.

Here, as shown in FIG. 3 and FIG. 4, there may be a case where a plurality of cluster objects is disposed in the display screen. In such a case, the display format selection control section 103 preferably adjusts the display position so that the cluster objects such as the label 13 and the direction indicator 15 overlap with each other as little as possible.

The direction indicator 15 is displayed on the display screen so that the front end thereof is oriented to a direction of the center position of a cluster out of the display screen. A drawing control method of the direction indicator 15 will be briefly described below referring to FIG. 7A and FIG. 7B. A coordinate system shown in FIG. 7A and FIG. 7B is a coordinate system having an origin at the center of the display screen for representing each position within the display screen.

Figure 7A:
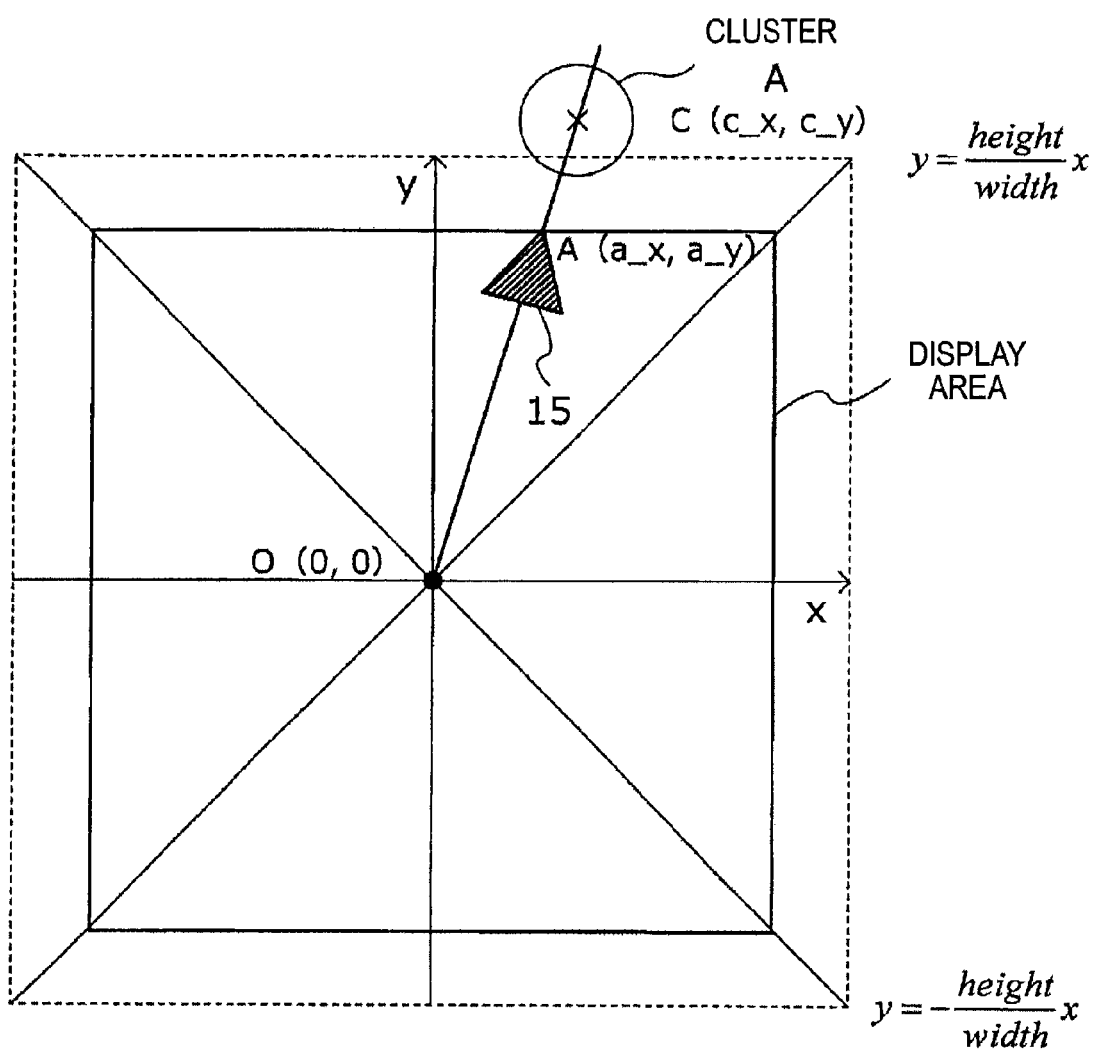
FIG. 7A is a diagram for explaining an example of a control method of a display screen according to the embodiment.

FIG. 7A schematically illustrates a positional relationship between the display area displayed in the display screen and a cluster A corresponding to a cluster out of display screen. When displaying the direction indicator 15 corresponding to the cluster A on the display screen as shown in FIG. 7A, the display format selection control section 103 specifies first a center position C (c_x, c_y) in the coordinate system for the display screen with respect to a cluster area of the cluster A. After that, the display format selection control section 103 assumes a straight line connecting between the origin and the center position C, and positions the direction indicator 15 on the straight line. At this time, the front end of the direction indicator 15 is preferably positioned at a intersection A (a_x, a_y) of the straight line connecting between the origin and the center position C and a boundary line of the display area as shown in FIG. 7A.

Figure 7B:
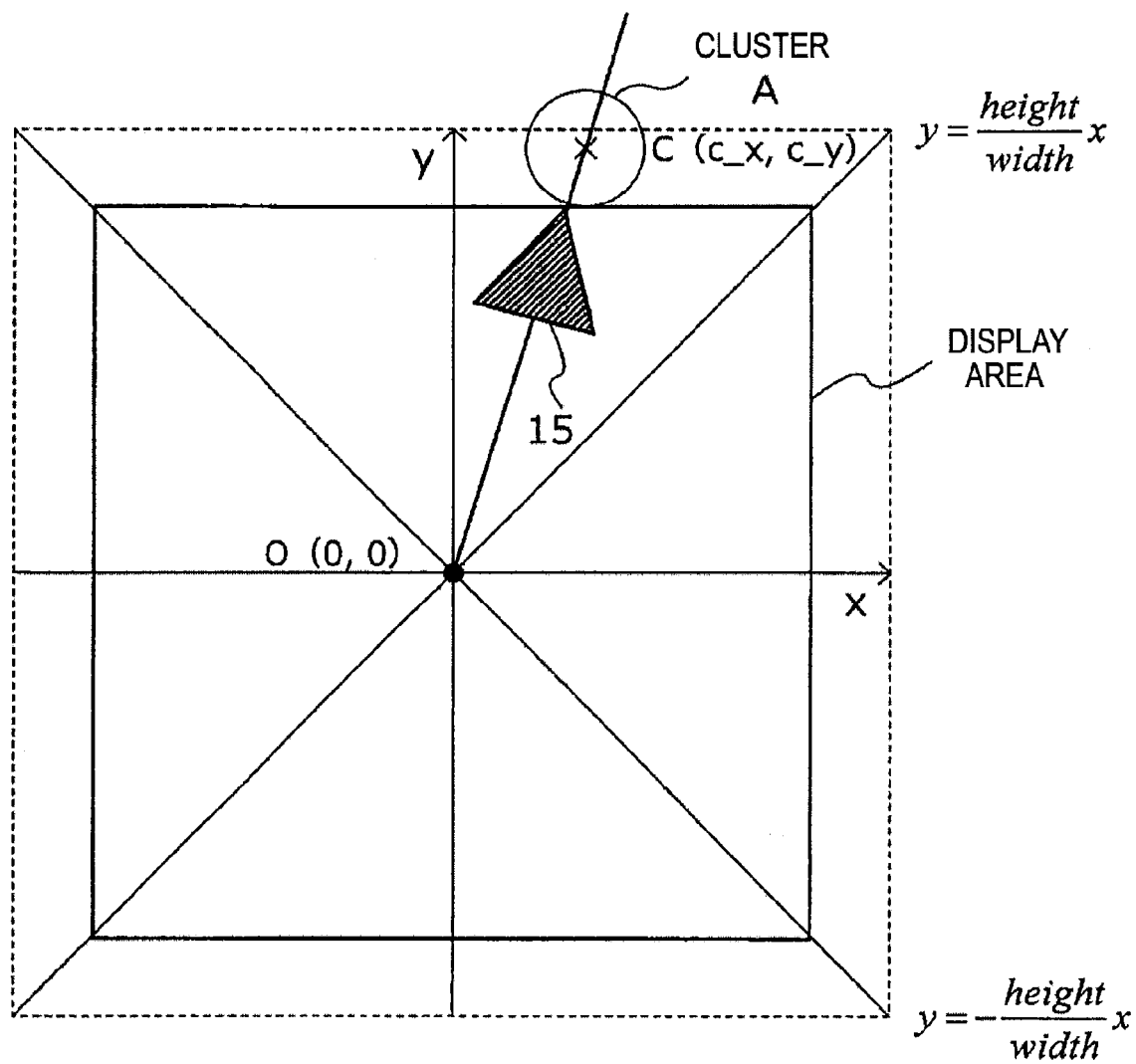
FIG. 7B is a diagram for explaining the example of the control method of the display screen according to the embodiment.

Also, the display format selection control section 103 changes the size of the direction indicator 15 in accordance with the distance between the center position (i.e. origin O) of the display screen and the cluster A as shown in FIG. 7B. In particular, the display format selection control section 103 increases the size of the direction indicator 15 as the distance to the cluster A gets smaller. With such display, the user is allowed to visually comprehend the distance between the cluster out of display screen corresponding to the direction indicator 15 and the center position of the display area.

The display position and the size of the direction indicator 15 are described referring to FIG. 7A and FIG. 7B. The label 13 is also displayed at a position that suggests a direction where the cluster A exists, and is preferably displayed with a size that suggests a distance to the cluster.

The display area is, for example, segmented into four partial areas by two straight lines each representing diagonal lines thereof as shown in FIG. 7A. Here, the cluster objects corresponding to each of the clusters out of display screen (label 13 and direction indicator 15) are desirably positioned within a partial area where the cluster is included. For example, the cluster object corresponding to the cluster A shown in FIG. 7 is preferably disposed in an area represented by y≥(height/width)x, and y≥−(height/width)x.

When displaying the label 13 including a character string as shown in FIG. 3 and FIG. 4, the display format selection control section 103 preferably displays the characters with a size that suggests a distance to the cluster out of the display screen. For example, when the distance to the cluster out of the display screen is large, the display format selection control section 103 preferably reduces the size of the characters, and when the distance to the cluster out of the display screen is small, preferably increases the size of the characters.

The display format selection control section 103 may determine particular size of the label 13 and the direction indicator 15 with an arbitrary method. However, the display format selection control section 103 may determine particular size by using, for example, a function as shown in FIG. 8A.

Figure 8A:
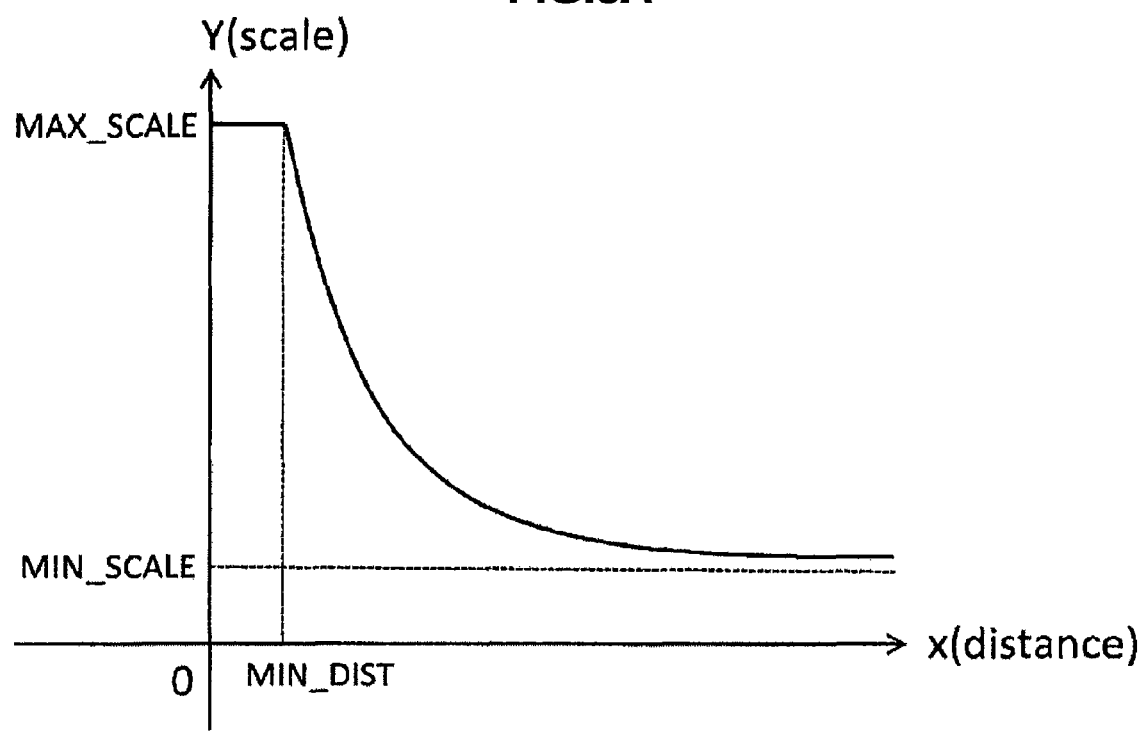
FIG. 8A is a diagram for explaining the example of the control method of the display screen according to the embodiment.

In the function shown in FIG. 8A, X-coordinate represents a pixel distance from the center position of the display screen to the cluster center, while Y-coordinate represents a display magnification of the label 13 and the direction indicator 15.

The display format selection control section 103 determines the display magnification Y using a formula 101 and a formula 102 below.

[Formula 1]

(When $X \geq$ MIN_DIST)  (Formula 101)
$$Y = (\text{MAX\_SCALE} - \text{MIN\_SCALE}) \times \text{MIN\_DIST} \times \frac{1}{X} + \text{MIN\_SCALE}$$

(When $X <$ MIN_DIST)  (Formula 102)
$$Y = \text{MAX\_SCALE}$$

As demonstrated in the above formulas, when the distance to the cluster center is smaller than a predetermined threshold value (MIN_DIST), the display format selection control section 103 changes the display magnification to a maximum value (MAX_SCALE); and when the distance to the cluster center is larger than or equal to a predetermined threshold value, the display format selection control section 103 changes the display magnification to be 1/X of the maximum value.

The display format selection control section 103 may determine particular size of the label 13 and the direction indicator 15 in accordance with the number of contents included in the focused cluster out of the display screen. In this case, the display format selection control section 103 may determine the particular size using the function shown in FIG. 8B.

Figure 8B:
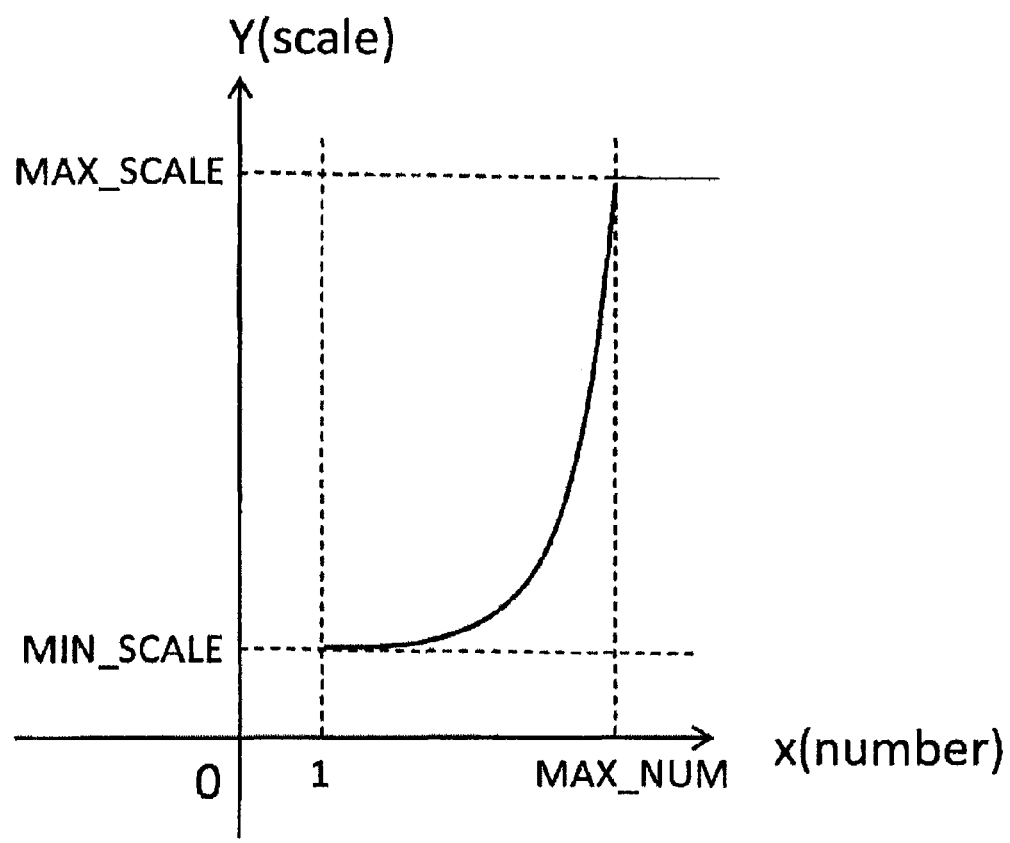
FIG. 8B is a diagram for explaining the example of the control method of the display screen according to the embodiment.

In the function shown in FIG. 8B, X-coordinate represents the number of contents included in the focused cluster out of the display screen, while Y-coordinate represents display magnification of the label 13 and the direction indicator 15.

The display format selection control section 103 determines the display magnification Y using a formula 103 and a formula 104.

[Formula 2]

(When $1 \leq X \leq$ MAX_NUM)  (Formula 103)
$$Y = \frac{(\text{MAX\_SCALE} - \text{MIN\_SCALE})}{(\text{MAX\_NUM} - 1)^k} \times (X - 1)^k + \text{MIN\_SCALE}$$

(When MAX_NUM $< X$)  (Formula 104)
$$Y = \text{MAX\_SCALE}$$

A parameter k in the above formula 103 is a factor which determines a slope of the function, and an arbitrary value may be set depending on the environment where the method is applied. As demonstrated in the above formulas, when the number of contents included in the cluster is 1, the display format selection control section 103 sets the display magnification to a minimum value (MIN_SCALE), and changes the display magnification based on the above formula 103 as the number of contents included in the cluster increases.

The display format selection control section 103 is capable of controlling for switching between display/non-display of the label 13 and direction indicator 15 of cluster shown in FIG. 3 and FIG. 4 in accordance with the preset initial setting value or user's operation and the like. By performing such switching control by the display format selection control section 103, the user is allowed to select a desired display format of the display screen (in more particularly, display format for information on clusters existing out of the display screen). As for the user's operation for switching between display/non-display of the label 13 and the direction indicator 15 may be appropriately set in accordance with the specifications of a particular information processor 10. As for examples of such switching operation, selection of object like icon and buttons, long-press on a touch panel, flick operation on a touch panel and the like are available.

The display format selection control section 103 according to the embodiment may display a distance to a cluster existing out of the display screen (separation distance from the display area) accompanying the label 13 and the direction indicator 15 of the cluster referring to a metadata as shown in FIG. 6 which is associated with a cluster selected by the node selecting section 107 described below. The object representing the distance to the cluster may be switched between display/non-display same as the label 13 and the direction indicator 15 of the cluster.

The above description describes an example in which the granularity of the cluster is determined according to the size of the feature space to be displayed on the display screen (for example, a reduction scale ratio for displaying a feature space or the like). However, the granularity of the cluster may be determined in accordance with, for example, an administrative district in a map displayed on the display screen, or may be determined while considering administrative district and reduction scale ratio respectively.

The display control section 105 includes, for example, a CPU, a ROM, a RAM, a communicating device, an output device and the like. The display control section 105 controls a display on a display screen of a display device such as a display provided to the information processor 10, or a display device such as a display which is externally connected to the information processor 10. The display control section 105 controls the display on a display screen based on user's operation information notified from the user operation information generating section 101 or the information on a display format of the display screen notified from the display format selection control section 103.

The node selecting section 107 includes, for example, a CPU, a ROM, a RAM and the like. The node selecting section 107 uses a previously generated tree structure to select a node which satisfies predetermined conditions from the nodes included in the tree structure in accordance with the size of the displayed feature space which is a feature space displayed on the display screen. In further particular, the node selecting section 107 selects a node (i.e. cluster) which is used for controlling a display format of the display screen based on the information on a feature space to be displayed on the display screen notified from the display format selection control section 103 and the information on the granularity of the cluster to be displayed on the display screen.

The node selecting section 107 selects a node by focusing not to a point but to an area which is displayed on the display screen. In more particularly, the node selecting section 107 adjusts the granularity of the cluster included in the display area to a same hierarchy, and as for the clusters existing out of the display screen, selects the clusters so that the granularity of the clusters gets larger as the distance is separated further away from the display area corresponding to the display screen.

Figure 9:
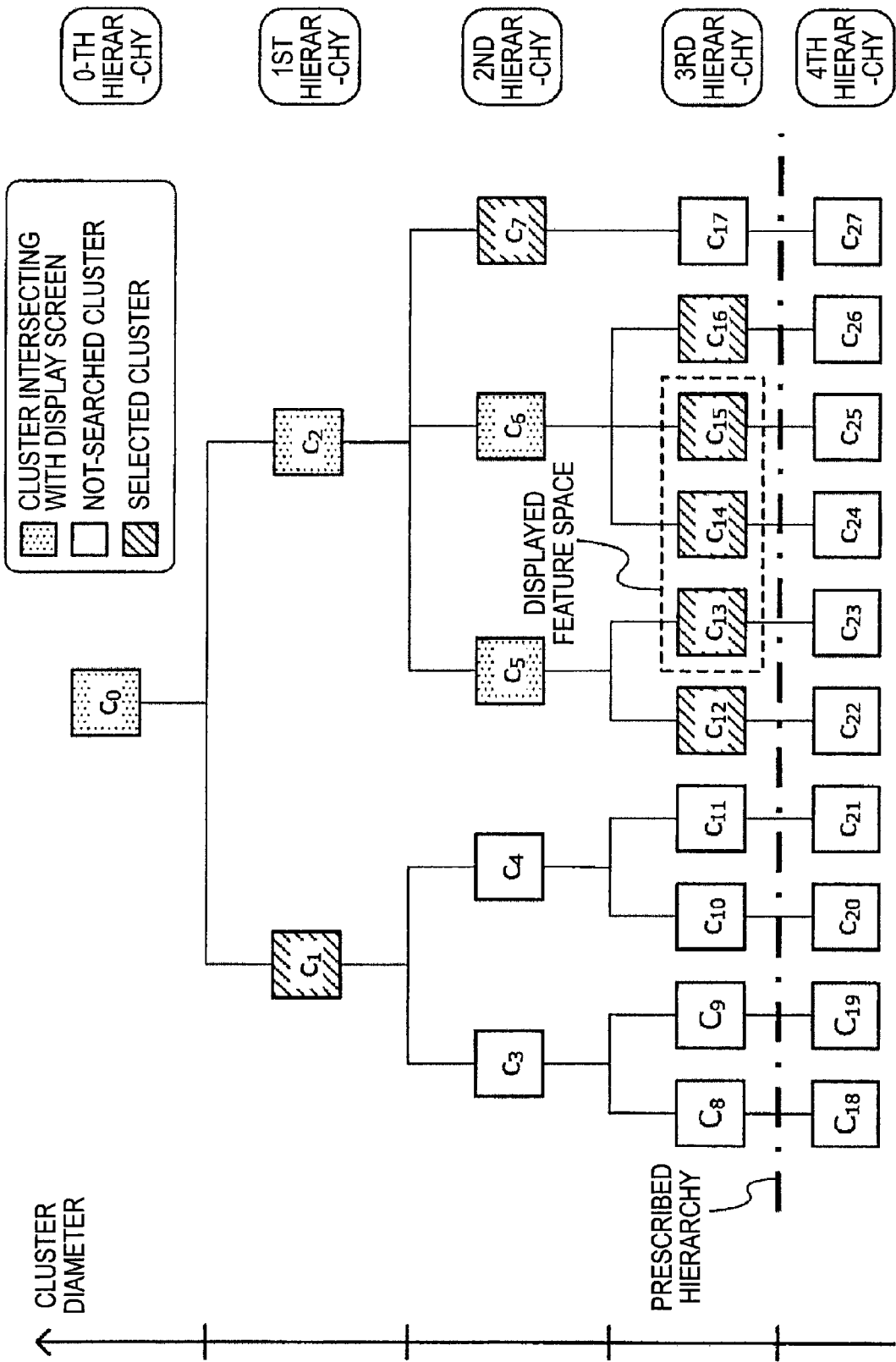
FIG. 9 is an illustration for explaining a processing of cluster selection carried out by the information processor according to the embodiment.

Now, referring to FIG. 9, processing of node selection (processing of cluster selection) in the node selecting section 107 according to the embodiment will be particularly described.

In particular, the node selecting section 107 refers to the information on the feature space to be displayed on the display screen notified from the display format selection control section 103 and specifies the size of the feature space to be displayed on the display screen and the reduction ratio (or magnification ratio) for displaying the feature space on the display screen. If a piece of information with which the size of the feature space to be displayed on the display screen and the reduction ratio can be calculated based on an actual size of the display screen are included, the information on the feature space to be displayed on the display screen may not include both of the information on the size of the feature space to be displayed on the display screen and the reduction ratio.

The tree structure used in the information processor 10 according to the embodiment is configured so that the clusters included in a same hierarchy level have a relationship with respect to the granularity of the clusters (in more particular, to have granularity of the clusters that is similar to one another) as shown in FIG. 9. When the information on the granularity of the clusters to be displayed on the display screen is obtained from the display format selection control section 103, the node selecting section 107 uses the obtained information on the granularity of the cluster to determine the hierarchy in the tree structure at which nodes are searched for. In particular, after specifying the granularity of the notified cluster, the node selecting section 107 determines a range of the hierarchies at which the nodes are searched for from a hierarchy including the route node to a hierarchy relevant to the granularity of the notified cluster (in the case shown in FIG. 9, 0-th hierarchy to third hierarchy).

Then, the node selecting section 107 determines whether any cluster intersects with the feature space corresponding to the display screen from the route node in order using the metadata associated with the cluster as shown in FIG. 6 and known information on the size of the feature area to be displayed on the display screen. When any cluster that does not intersect with the feature space corresponding to the display screen is found, the node selecting section 107 selects the cluster as a cluster to be used by the display format selection control section 103.

When any cluster that intersects with the feature space corresponding to the display screen is found, the process is repeated recursively on the clusters corresponding to the child nodes of the cluster. That is, the node selecting section 107 determines whether any cluster corresponding to the child node of the focused cluster intersects with the feature space corresponding to the display screen.

When the hierarchy of the focused cluster (node) reaches the hierarchy (prescribed hierarchy) corresponding to the granularity of the cluster notified from the display format selection control section 103, the node selecting section 107 selects all focused clusters in the focused hierarchy without searching for the layer (leaf node side) lower than the focused hierarchy as the clusters used by the display format selection control section 103.

Referring to FIG. 9, processing of node selection by the node selecting section 107 will be particularly described below. In the following description, the third hierarchy shown in FIG. 9 is assumed as a prescribed hierarchy.

First of all, the node selecting section 107 refers to a metadata associated with a route node $c_0$ and determines whether the route node $c_0$ intersects with the feature space (hereinafter, referred to also as displayed feature space) corresponding to the display screen. In the example shown in FIG. 9, since the route node $c_0$ intersects with the displayed feature space, the node selecting section 107 selects a node $c_1$ and a node $c_2$ included in the first hierarchy as the objects to be searched for.

In this case, it is assumed that the node $c_1$ does not intersect with the displayed feature space, and the node $c_2$ intersects with the displayed feature space. In this case, the node selecting section 107 selects a cluster corresponding to the node $c_1$ as a cluster to be used by the display format selection control section 103, and selects nodes $c_5$-$c_7$ corresponding to the child node of the node $c_2$ as the objects to be searched for.

Here, it is assumed that the node $c_5$ and the node $c_6$ intersect with the displayed feature space, while a node $c_7$ does not intersect with the displayed feature space. In this case, the node selecting section 107 selects the cluster corresponding to the node $c_7$ as a cluster to be used by the display format selection control section 103, and selects nodes $c_{12}$-$c_{16}$ corresponding to the child node of the node $c_5$ and node $c_6$ as the objects to be searched for.

Although the nodes $c_{12}$-$c_{16}$ are the targets to be processed next, since the nodes $c_{12}$-$c_{16}$ are included in the third hierarchy which is the prescribed hierarchy, the node selecting section 107 selects the nodes $c_{12}$-$c_{16}$ which are all cluster focused in the focused hierarchy as the cluster to be used by the display format selection control section 103.

As a result of the search processing as described above, the nodes $c_1$, $c_7$, and $c_{12}$-$c_{16}$ are finally selected as the clusters to be used by the display format selection control section 103.

Since the prescribed hierarchy is determined based on the granularity of the cluster to be displayed on the display screen, a part of the selected clusters included in the prescribed hierarchy is included in the displayed feature space. In the example shown in FIG. 9, the clusters corresponding to the nodes $c_{13}$-$c_{15}$ are displayed at the substantially same granularity of the cluster in the display screen. As demonstrated in FIG. 9, the clusters which are located out of the display screen are the clusters each corresponding to the node $c_{12}$, node $c_{16}$, node $c_7$, and node $c_1$, the granularity of the clusters thereof gets larger as the location separates further away from the display screen (displayed feature space). When the clusters out of the displayed feature space are intended to display without using the selecting technique of the clusters according to the embodiment, for example, the direction indicators corresponding to the clusters $c_8$-$c_{12}$ and clusters $c_{16}$-$c_{17}$ shown in FIG. 9 are displayed within the display screen and may cause the display screen to be cluttered. However, by using the selecting technique of the clusters as described above, since the clusters located far away from the displayed feature space are grouped into a large granularity of the cluster, the number of the cluster objects (label 13 and direction indicator 15) displayed on the display screen is prevented from increasing.

The node selecting section 107 notifies the information representing the nodes (clusters) which are selected in the above-described processing to the display format selection control section 103.

The storage 109 is an example of a storage device provided to the information processor 10 according to the embodiment. The storage 109 may store various kinds of content data stored in the information processor 10 and metadata associated with the content data or the like. The storage 109 may also store tree structure data corresponding to a tree structure which is generated by the tree structure generating section 111 described below or an external information processor. Further, the storage 109 may store application data corresponding to various kinds of applications which are used by the display format selection control section 103 and the display control section 105 to display various kinds of information on the display screen. Furthermore, the storage 109 appropriately stores various parameters and processing in progress necessary to be stored for the information processor 10 to carry out some kind of processing, or various kinds of database. The storage 109 allows the processing sections included in the information processor 10 according to the embodiment to freely write thereon and read therefrom.

The tree structure generating section 111 includes, for example, a CPU, a ROM, a RAM and the like. The tree structure generating section 111 assumes that a feature space is prescribed by using a feature quantity as described above. A tree structure representing a result of clustering of contents is generated in accordance with the distribution of contents within the feature space.

The tree structure generating section 111 generates a tree structure described above in a manner, for example, as described below.

First of all, the tree structure generating section 111 refers to a piece of metadata in which the information processor 10 is associated with usable content data to arrange the content data on a plane within the feature space based on the positional information prescribed in the metadata. Note that arrangement of the contents is virtual arrangement.

Then, the tree structure generating section 111 calculates the distance among the data with respect to a set of content data included in the plane. Subsequently, the tree structure generating section 111 collects a plurality of data which are included in a close distance into a group (classification). Such grouping processing made by the tree structure generating section 111 is the clustering. Each of the groups collected by the grouping processing (clustering) is the cluster.

The tree structure generating section 111 performs coupling or separating of clusters to classify the contents usable by the information processor 10 into a plurality of clusters and generates a tree structure of multi-hierarchy, in which content data is the leaf node and the clusters are the node respectively.

Referring to FIG. 10-FIG. 15, an example of the clustering method made by the tree structure generating section 111 will be briefly described.

Figure 10:
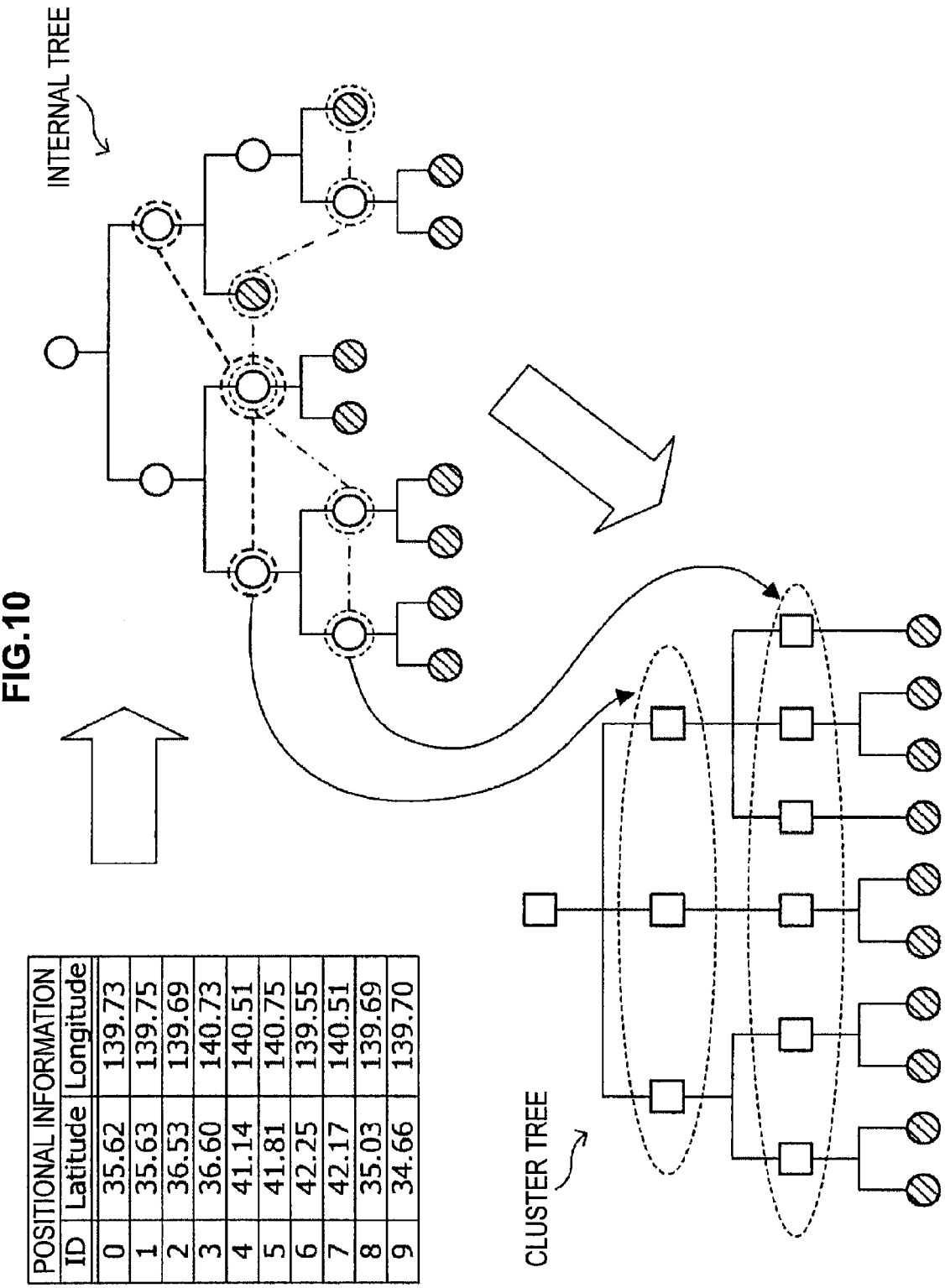
FIG. 10 is an illustration for explaining an example of a cluster generating method.

The tree structure generating section 111 according to the embodiment performs the clustering method according to a flow shown in FIG. 10. The tree structure generating section 111 first refers to the positional information associated with content data to generate a tree structure, which is referred to as internal tree shown upper-right in FIG. 10. Subsequently, the tree structure generating section 111 reconfigures the generated internal tree based on a predetermined condition to generate a cluster tree shown in lower portion in FIG. 10.

In FIG. 10, as an example of the positional information associated with the content data, positional information in which degrees of latitude and longitude are used is given. In FIG. 10, items marked with a shadowed circle correspond to the content data, and the circle represents a node (cluster) in the internal tree. Item marked with a box represents a node of the tree structure generated by the tree structure generating processing of the tree structure generating section 111.

The processing to generate an internal tree will be described first.

Figure 11:
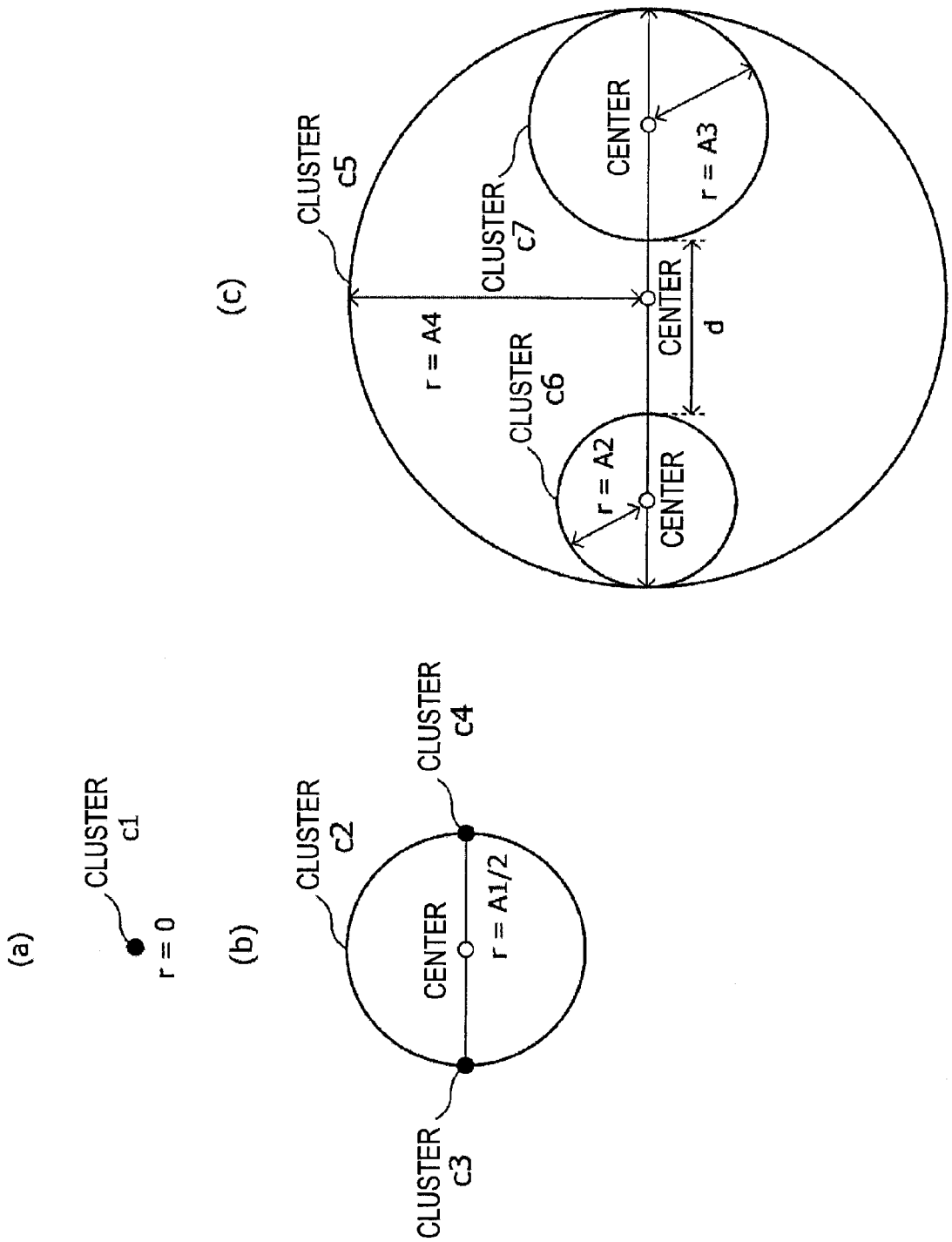
FIG. 11 is an illustration for explaining the example of the cluster generating method.

FIG. 11 is an illustration for explaining the cluster generating method. FIG. 11(a) illustrates a case where a cluster c1 includes one content; FIG. 11(b) illustrates a case where a cluster c2 includes two clusters; and FIG. 11(c) illustrates a case where a cluster c5 includes at least four clusters.

In FIG. 11(b), the cluster c2 is a cluster which includes clusters c3 and c4 each including a single content. In FIG. 11(c), the cluster c5 is a cluster which includes clusters c6 and c7 each having at least two or more contents. In the following description, an example of clustering of contents arranged in a two-dimensional plane is given.

Each of the clusters generated by clustering a plurality of contents has a circular area which has a center position (center) and a radius of the circle as attribute values. Thus, a cluster area which has a circular shape defined by a center and a radius includes contents therein.

For example, in the case where the cluster c1 includes only one content as shown in FIG. 11(a), the center position of the cluster c1 is the position of a content included in the cluster c1. Since the cluster c1 includes only one point, the radius of the cluster c1 is 0 (r=0).

For example, when the cluster c2 includes two contents (cluster c3 and c4) as shown in FIG. 11(b), the center position of the cluster c2 is positioned on a straight line which connects the positions of the two contents, and the precise position is the center of the straight line. The radius of the cluster c2 is a half of the straight line connecting the positions of the two contents. For example, when the distance of the straight line connecting the clusters c3 and c4 corresponding to the two contents is A1, the radius r of the cluster c2 is A1/2.

For clustering, when calculating the distance between the clusters each of which includes only one content, the distance between the contents is calculated. For example, when calculating the distance between the cluster c3 and the cluster c4, the distance between the position of the content included in the cluster c3 and the position of the content included in the cluster c4 is calculated.

Also, it is assumed that, for example, a cluster c5 includes at least four or more contents as shown FIG. 11(c). In this case, the center position of the cluster c5 is on a straight line connecting a center position of a cluster c6 and a center position of a cluster c7 as well as at the center of a straight line connecting a point where a circle of the cluster c5 and a circle of the cluster c6 are in contact with each other and a point where a circle of the cluster c5 and a circle of the cluster c7 are in contact with each other. The radius of the cluster c5 is a half of a value of the straight line connecting the points where the circle of the cluster c5 is in contact with the circles of the clusters c6 and c7.

For clustering, when calculating the distance between clusters including plural contents, a shortest distance between the circumferences of circles of the respective clusters is calculated. For example, the distance between the cluster c6 and the cluster c7 is a distance d shown in FIG. 11(c). Defining the radius of the cluster c6 as A2; the radius of the cluster c7 as A3; and the radius of the cluster c5 as A4, the distance d between the cluster c6 and the cluster c7 is 2 (A4-A2-A3).

The calculation method for the distance between the clusters used by the tree structure generating section 111 according to the embodiment is not limited to the above-described method, and any arbitrary method such as a centroid method, a shortest distance method, a maximum distance method, an inter-group distance method, and a ward method may be used.

Figure 12A:
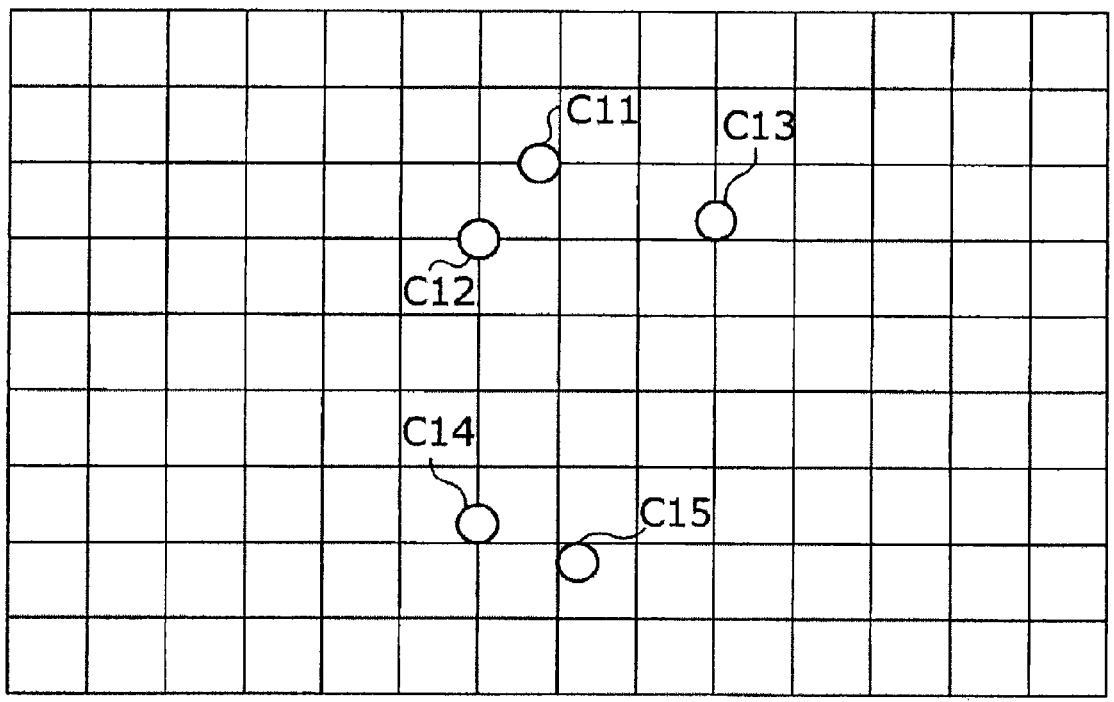
FIG. 12A is a diagram for explaining the example of the cluster generating method.
Figure 12B:
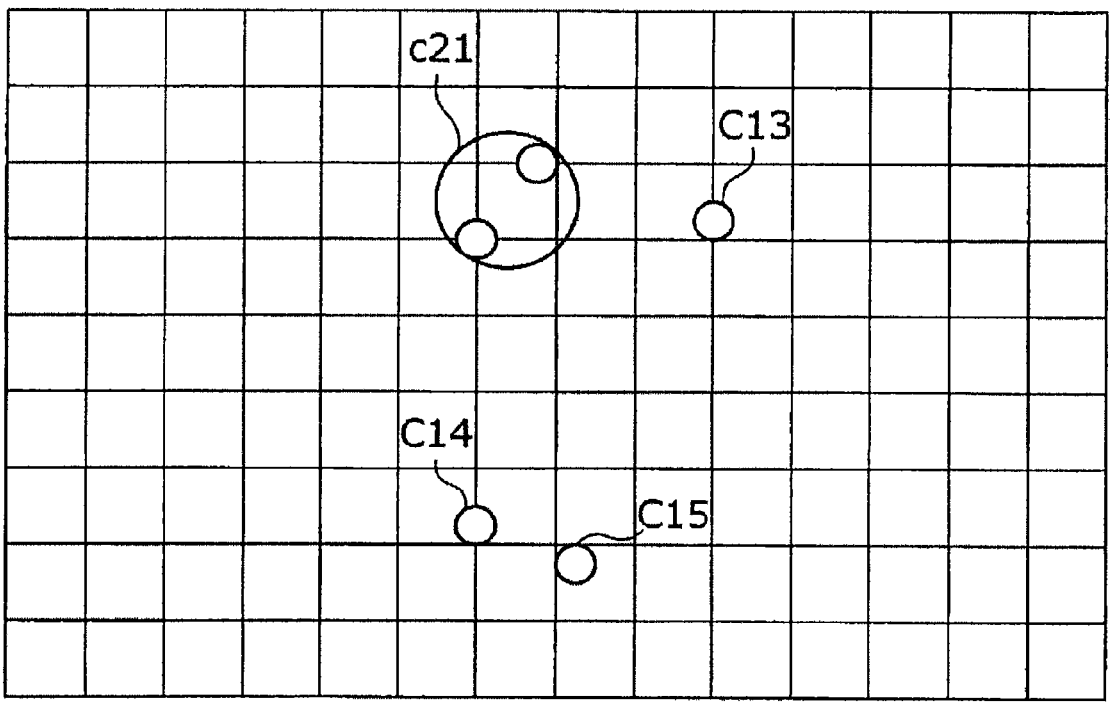
FIG. 12B is a diagram for explaining the example of the cluster generating method.

Subsequently, referring to FIG. 12A-FIG. 13, an illustrative example of a clustering processing made by the tree structure generating section 111 will be described. FIG. 12A-FIG. 13 are illustrations for explaining the cluster generating method (in more particularly, generating method of the internal tree). FIG. 12A-FIG. 13 illustrates a case of clustering of five contents C11-C15.

The tree structure generating section 111 refers to the positional information associated with the five contents C11-C15 first, and arranges the contents in a plane on a feature space (FIG. 12A). Then, the tree structure generating section 111 calculates the distance between the contents. Based on the calculation result, the tree structure generating section 111 integrates a content C11 and a content C12, the distance therebetween is the shortest, into one group of cluster c21 (FIG. 12B). The tree structure generating section 111 determines so that the cluster c21 includes all of the content C11 and the content C12 which are the elements of the cluster c21.

Figure 12C:
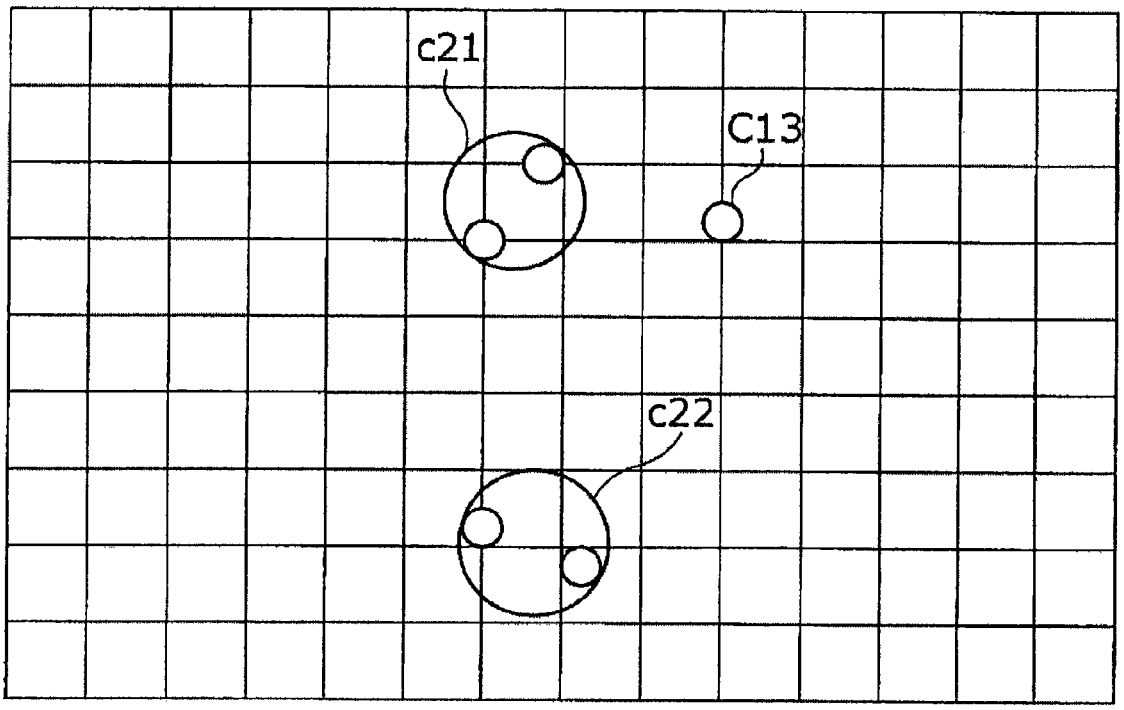
FIG. 12C is a diagram for explaining the example of the cluster generating method.
Figure 13:
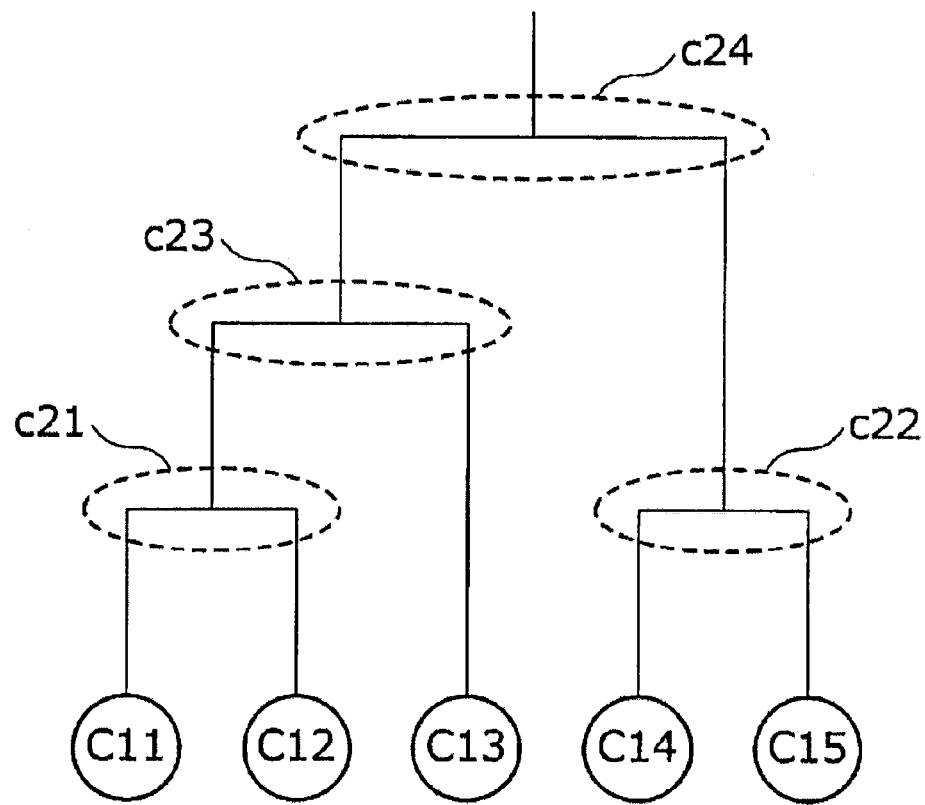
FIG. 13 is an illustration for explaining the example of the cluster generating method.

The tree structure generating section 111 carries out the processing in the same manner to integrate a content C14 and a content C15, since the distance therebetween is the next shortest, into one group of cluster c22 (FIG. 12C). In this case also, the tree structure generating section 111 determines so that the cluster c22 includes all of the content C14 and the content C15 which are the elements of the cluster c22.

Figure 12D:
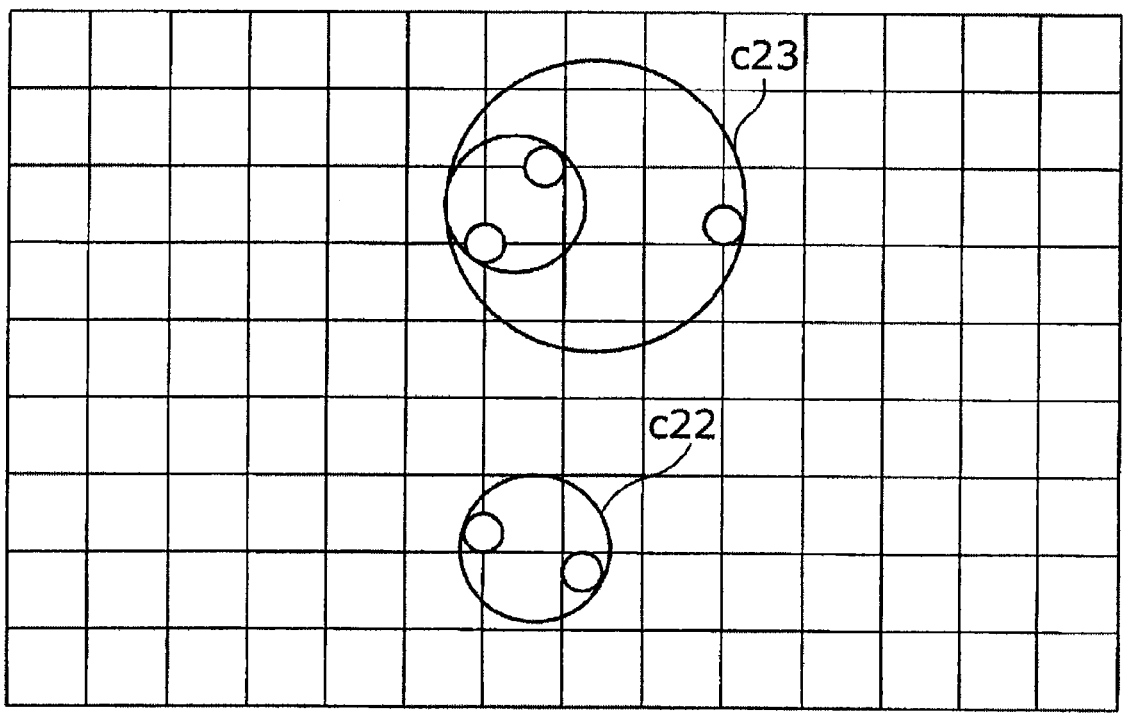
FIG. 12D is a diagram for explaining the example of the cluster generating method.

Subsequently, the tree structure generating section 111 calculates the distances between the generated two clusters c21 and c22 and a remaining content C13 respectively. In the case shown in FIG. 12C, the distance between the cluster c21 and the content C13 is shorter than the distance between the cluster c22 and the content C13. Therefore, the tree structure generating section 111 integrates the cluster c21 and the content C13 into one group of a cluster c23 (FIG. 12D). In this case also, the tree structure generating section 111 determines so that the cluster c23 includes all of the cluster c21 and the content C13.

Figure 12E:
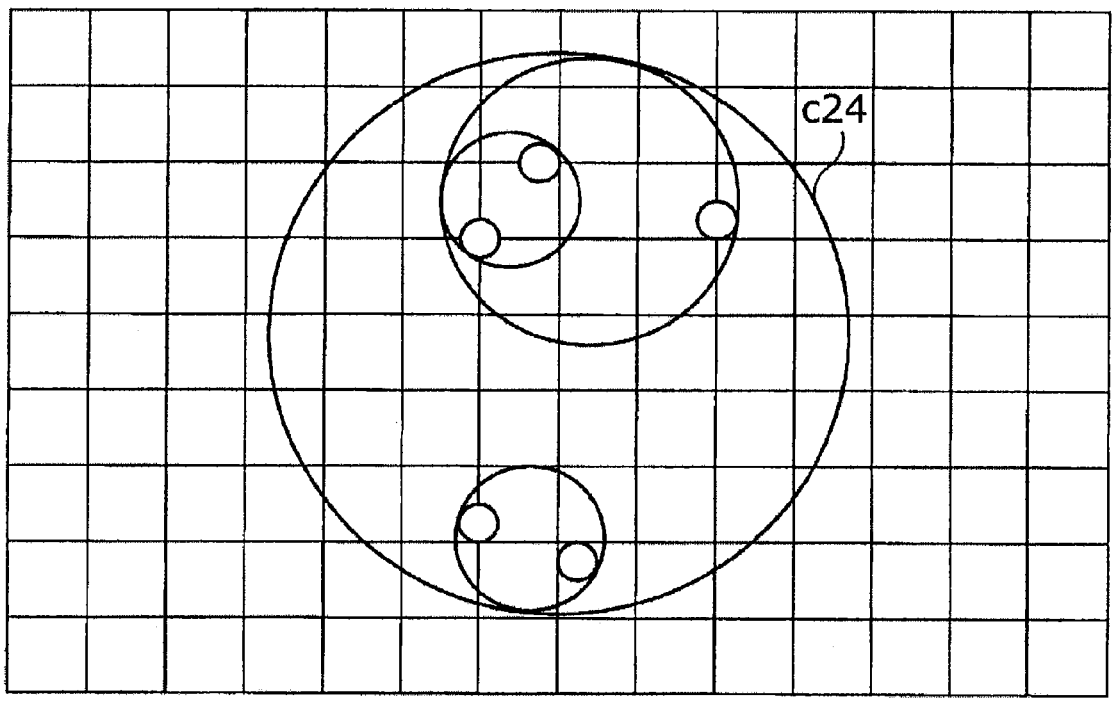
FIG. 12E is a diagram for explaining the example of the cluster generating method.

Finally, the tree structure generating section 111 integrates the remaining two clusters c22 and c23 into one group of a cluster c24 (FIG. 12E). In this case also, the tree structure generating section 111 determines so that the cluster c24 includes all of the cluster c22 and the cluster c23. For example, the tree structure generating section 111 may determine so that the cluster c24 is a circumcircle of the two circles representing the cluster c22 and the c23.

As described above, the tree structure generating section 111 makes the clustering of the contents C11-C15 in order to generate the clusters c21-c24. Also, the tree structure generating section 111 generates a tree structure (clustering tree diagram) based on the generated clusters c21-c24. FIG. 13 shows a tree structure thus generated.

When each of the contents C11-C15 is handled as a leaf node, each of the clusters generated by the tree structure generating section 111 forms a tree structure as shown in FIG. 13. For example, in FIG. 12B, it has been described that the cluster c21 is the cluster that includes all of the content C11 and the content C12. Such inclusion relation corresponds to the fact that, in FIG. 13, two branches extend from the cluster c21, and the content C11 and the content C12 are the child nodes of the cluster c21. Likewise, for example, in FIG. 12E, it has been described that the cluster c24 is the cluster that includes all of the cluster c22 and the cluster c23. Such inclusion relation corresponds to the fact that, in FIG. 13, two branches extend from the cluster c24, and the cluster c22 and the cluster c23 are the child nodes of the cluster c24.

As demonstrated in FIG. 12E and FIG. 13, the finally generated cluster c24 includes all contents (i.e. all leaf nodes) and all clusters (i.e. nodes). Therefore, the cluster c24 is the cluster that corresponds to a route node in the tree structure.

Using the illustrative examples, the generating processing of the internal tree made by the tree structure generating section 111 has been described.

After completing generating processing of the internal tree, the tree structure generating section 111 subsequently carries out generating processing of a cluster tree as described below.

When carrying out the generating processing of the internal tree as shown in FIG. 12A-FIG. 12E and the generating processing of the cluster tree described below, it is preferred to appropriately calculate the center position of the cluster and distance between the clusters. The tree structure generating section 111 according to the embodiment may use arbitrary method to calculate the information; for example, following method may be used.

For example, when there are n of content data, the tree structure generating section 111 sets clusters so that each cluster includes data as one element to create total n of clusters. Each cluster has the center C and the radius r as the attribute values, the initial value of the center C is a coordinate value of the data, and the initial value of the radius r is 0.

Then, the tree structure generating section 111 determines the cluster center C and the radius r so that the distance from the cluster center C to each element is radius r or less on all elements included in the cluster. With this, all elements included in the cluster are included inside a sphere defined by the center C and the radius r.

Subsequently, tree structure generating section 111 determines the distance between the clusters, for example, as described below.

When integrating a cluster i and a cluster j to create a cluster k, the tree structure generating section 111 calculates a distance d(i, j) between the cluster i and the cluster j by using formula 111 and formula 112.

$$d(i,j)=r(k)-r(i)-r(j)(r(k) \geq r(i)+r(j)) \quad \text{(Formula 111)}$$

$$d(i,j)=0(r(k)<r(i)+r(j)) \quad \text{(Formula 112)}$$

In the above formula 111 and formula 112, r(i) represents the radius of the cluster i. As demonstrated by the above formula 101 and formula 102, the distance d between the clusters is equivalent to an increase of the radius when the clusters are integrated.

Figure 14A:
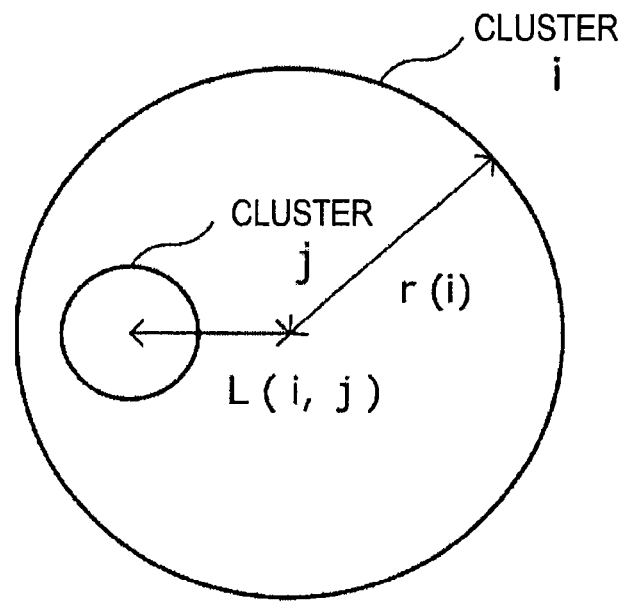
FIG. 14A is an illustration for explaining a distance between the clusters.
Figure 14B:
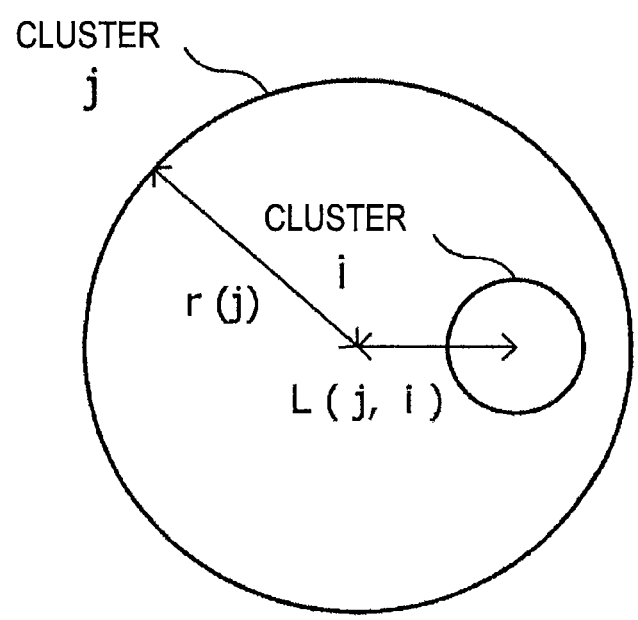
FIG. 14B is an illustration for explaining the distance between the clusters.
Figure 14C:
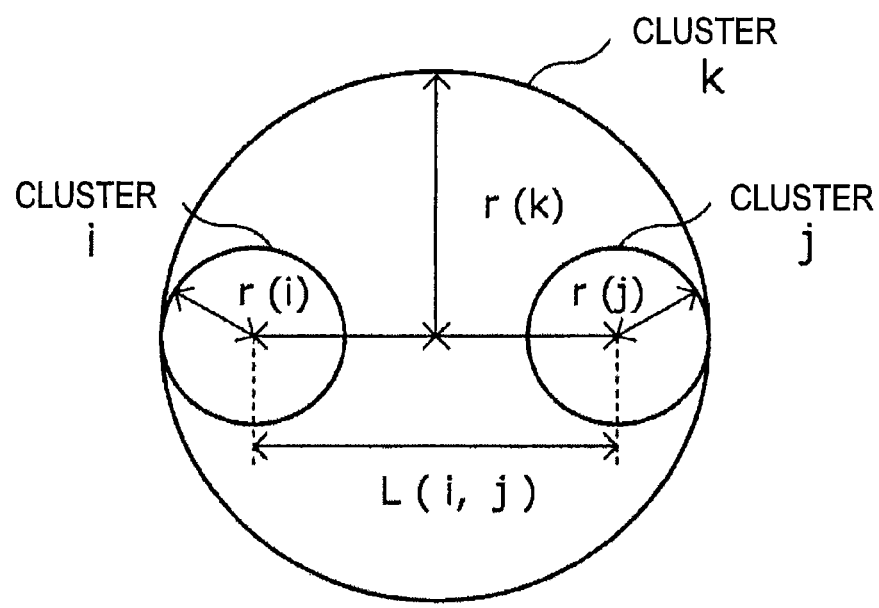
FIG. 14C is an illustration for explaining the distance between the clusters.

Subsequently, referring to FIG. 14A-FIG. 14C, a method to calculate the center and radius of a cluster after two clusters are integrated will be briefly described. FIG. 14A-FIG. 14C illustrate an inclusion relation of elements included in each cluster when two clusters are integrated.

When integrating two clusters, the tree structure generating section 111 classifies into three patterns (1)-(3) below depending on the inclusion relation of elements included in the clusters.

(a) $m(i) \supset m(j)$
(b) $m(j) \supset m(i)$
(c) Otherwise

Here, m(i) represents a set of all elements included in the cluster i; and m(j) represents a set of all elements included in the cluster j.

A case of (a) above is a state that all elements included in the cluster j are included in the cluster i as shown in FIG. 14A. A case of (b) above is a state that all elements included in the cluster i are included in the cluster j as shown in FIG. 14B. A case of (c) above is a state other than case (a) and case (b); for example, inclusion relation of the cluster i and the cluster j is a state shown in FIG. 14C.

The tree structure generating section 111 determines the respective cases of (a)-(c) based on the coordinate of the center and the radius of the cluster i and the cluster j respectively.

For example, when a sphere of the cluster i, the radius of which from the coordinate C(i) of the center is r(i), includes all of the cluster j of a sphere having the coordinate C(j) of the center and the radius r(j), the tree structure generating section 111 determines that the case (a) shown in FIG. 14A is established.

In other word, when r(i)≥r(j)+l(i, j), the tree structure generating section 111 determines that the case (a) above is established. Here, l(i, j) represents a Euclidean distance between the centers of the cluster i and the cluster j as expressed by formula 113 below.

$$l(i,j)=|C(i)-C(j)|  \quad \text{(Formula 113)}$$

Defining the dimension of the data as dim, l(i, j) is expressed by formula 114 below. Here, in the formula 114 below, c(i, k) indicates a value of the k-th attribute representing center value of the cluster i.

[Formula 3]

$$l(i,j) = \sqrt{\sum_{k=1}^{dim} (c(i,k) - c(j,k))^2}  \quad \text{(Formula 114)}$$

When the case (a) above is established, the tree structure generating section 111 uses the cluster i as it is as the center and the radius of the cluster k after integration.

The case (b) above is equivalent to the case (a) in which index "i" and "j" are exchanged with each other; the tree structure generating section 111 carries out the processing in the same manner as the case (a) above.

When the case (c) above is established, the tree structure generating section 111 generates a cluster k as a minimum sphere that includes a sphere of the cluster i and a sphere of the cluster j as shown in FIG. 14C. The tree structure generating section 111 calculates the radius of the cluster k using formula 115 below. Also, the tree structure generating section 111 calculates the center of the cluster k using formula 116 below. Here, the center of the cluster k is positioned on a straight line which connects between the center C(i) of the cluster i and the center C(j) of the cluster j.

$$r(k)=(l(i,j)+r(i)+r(j))/2  \quad \text{(Formula 115)}$$

$$C(k)=[(r(i)-r(j)+l(i,j))*C(i)+(r(j)-r(i)+l(i,j))*C(j)]/(2*l(i,j))  \quad \text{(Formula 116)}$$

The tree structure generating section 111 determines the distance between the clusters and the center of the cluster by using the method described above.

The tree structure generating section 111 determines the center (center position) and the radius of the cluster, which are calculated as describe above, as the attribute values unique to the cluster included in the cluster data shown in FIG. 6. The tree structure generating section 111 carries out the generating processing of a cluster tree described below by using the attribute values unique to the respective clusters included in the internal tree. Also, the node selecting section 107 can easily determine whether the cluster intersects with the displayed feature space by comparing the attribute values of the clusters included in the cluster tree with the positional information corresponding to an arbitrary point. If all of certain cluster area is included in the cluster area of its parent cluster, the attribute values (center position and radius) of the parent cluster indicate a range of all elements included in the cluster. Therefore, the display format selection control section 103 and the node selecting section 107 can easily associate the clusters with the elements displayed on the display screen.

Figure 15:
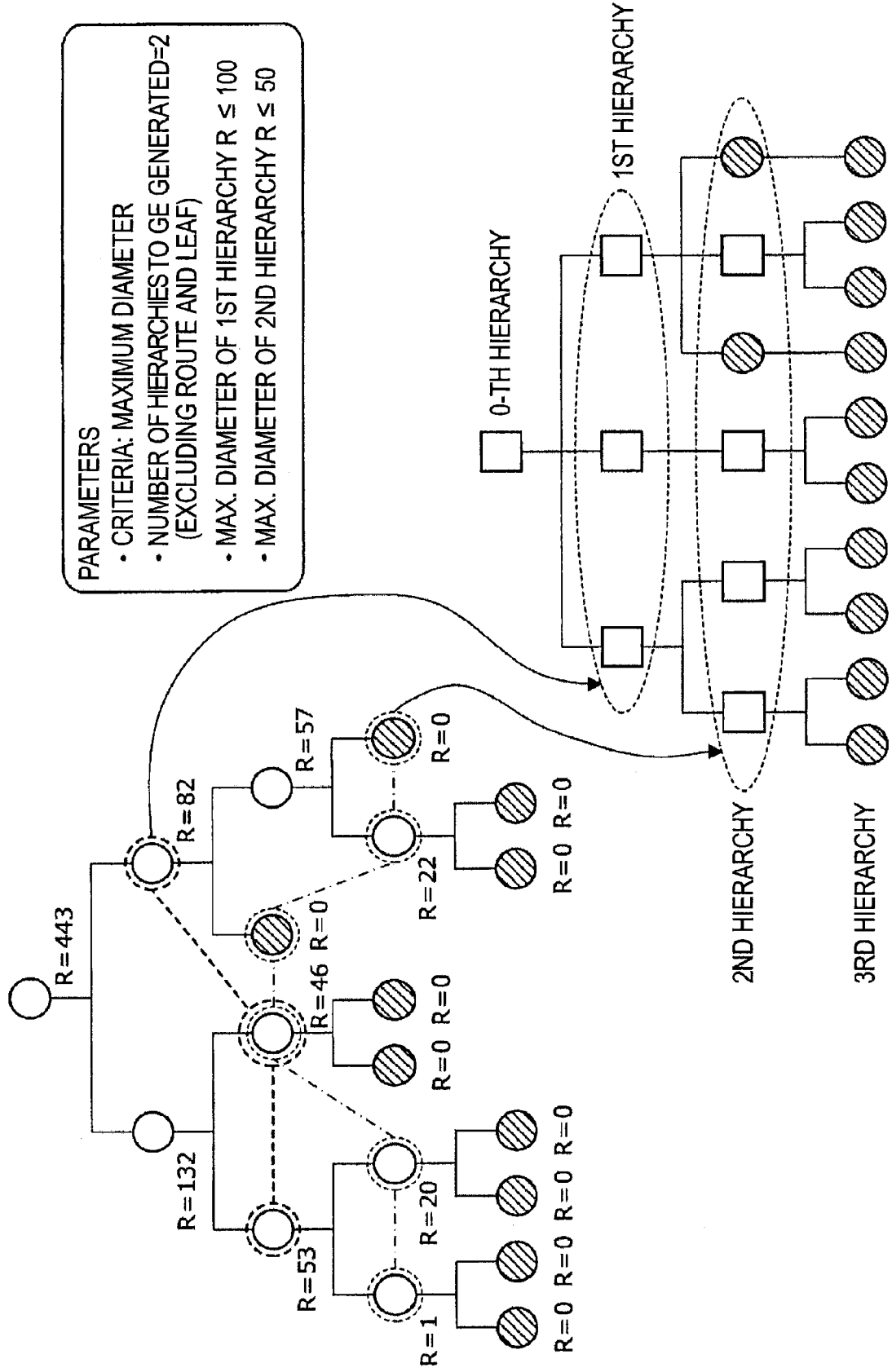
FIG. 15 is an illustration for explaining an example of the cluster generating method.

Subsequently, referring to FIG. 15, the generating processing of the cluster tree made by the tree structure generating section 111 will be briefly described. FIG. 15 is an illustration for explaining the cluster generating method (in more particularly, generating method of cluster tree).

The generating processing of a cluster tree based on the internal tree is made based on the parameter shown in FIG. 15. In FIG. 15, as the parameters used for the generating processing of the cluster tree, the following parameters are set: (A) feature quantity of the cluster to be focused; (B) a number of hierarchies to be generated in addition to the hierarchy to which the route node is included and the hierarchy to which the leaf nodes are included; and (C) conditions of the granularity of the cluster for each hierarchy. In particular, in FIG. 15, (A) based on the maximum diameter of the cluster; (B) two hierarchies are to be generated between the hierarchy to which the route node is included and the hierarchy to which the leaf nodes are included; and (C) maximum diameter R≤100 for the first hierarchy and maximum diameter R≤50 for the second hierarchy are set.

The tree structure generating section 111 traces the tree structure in order from the route node of the generated internal tree, and specifies a node which satisfies the conditions with respect to the first hierarchy. Then, with respect to the respective branches to which the specified node is included, the tree structure generating section 111 determines the uppermost node that satisfies the conditions as the node included in the first hierarchy. As a result, in the example shown in FIG. 15, three nodes which are connected to each other with a thick dot line (from the left in order, a node of R=53, a node of R=46 and a node of R=82) are selected as the nodes included in the first hierarchy.

Likewise, the tree structure generating section 111 traces the tree structure from the route node of the generated internal tree in order, and specifies the nodes that satisfy the conditions with respect to the second hierarchy. Then, with respect to the respective branches to which the specified node is included, the tree structure generating section 111 determines the uppermost node that satisfies the conditions as the node included in the second hierarchy. As a result, in the example shown in FIG. 15, six nodes which are connected to each other with a thin dot line (from the left in order, a node of R=1, a node of R=20, a node of R=46, 7-th content data from the left, a node of R=22, content data at rightmost) are selected as the nodes included in the second hierarchy.

By carrying out the processing as described above, the tree structure generating section 111 generates the cluster tree shown at the right in FIG. 15.

After generating the cluster tree of usable contents for the information processor 10, the tree structure generating section 111 associates the generated clusters with metadata as shown in FIG. 6. The tree structure generating section 111 terminates the clustering processing, and stores the generated tree structure data and the cluster data representing the tree structure in the storage 109 or the like while associating the cluster data with the generated clusters.

The tree structure generating section 111, which the information processor 10 according to the embodiment may include therein, has been described.

An example of function of the information processor 10 according to the embodiment has been described above. The above-described component elements may include a general purpose unit or circuit, or hardware each specialized to the functions of the component elements. Or a CPU or the like may perform every function of the component elements. Therefore, the applied configuration may be appropriately changed in accordance with the technical art at the point when the embodiment is implemented.

A computer program for achieving the functions of the above-described information processor according to the embodiment may be created and mounted on a personal computer or the like. A computer readable record medium which stores such computer program may be provided. For example, a magnetic disk, an optical disk, a magnetic optical disk, a flash memory and the like are available for the record medium. The above-described computer program may be delivered via, for example, a network without using any record medium.

In the above description, an example is given, in which, as a feature quantity which characterizes the feature space, degrees of latitude and longitude are used to specify a position on the earth surface, and a map plane on which the earth surface is extended in two-dimensional plane is displayed on the display screen. Therefore, in the above description, the displayed feature space has a generally a rectangular shape as a map range which is included in the display screen. However, for example, when considering a case where a three-dimensional feature space having a width direction, a height direction and a depth direction is displayed on the display screen, it is clear when considering, for example, a picture drawn using perspective method, that a three-dimensional image which has values in the width direction and the height direction being substantially the same size as those of the display screen and unlimited depth, is displayed in the display screen. In such case, the displayed feature space may be appropriately prescribed. For example, three-dimensional object, which has a predetermined length from the display screen toward the depth direction (in other word, a limited length in which a position far away in the depth direction is not considered), may be preferably used as a displayed feature space.

<Flow of Information Processing Method>

Figure 16:
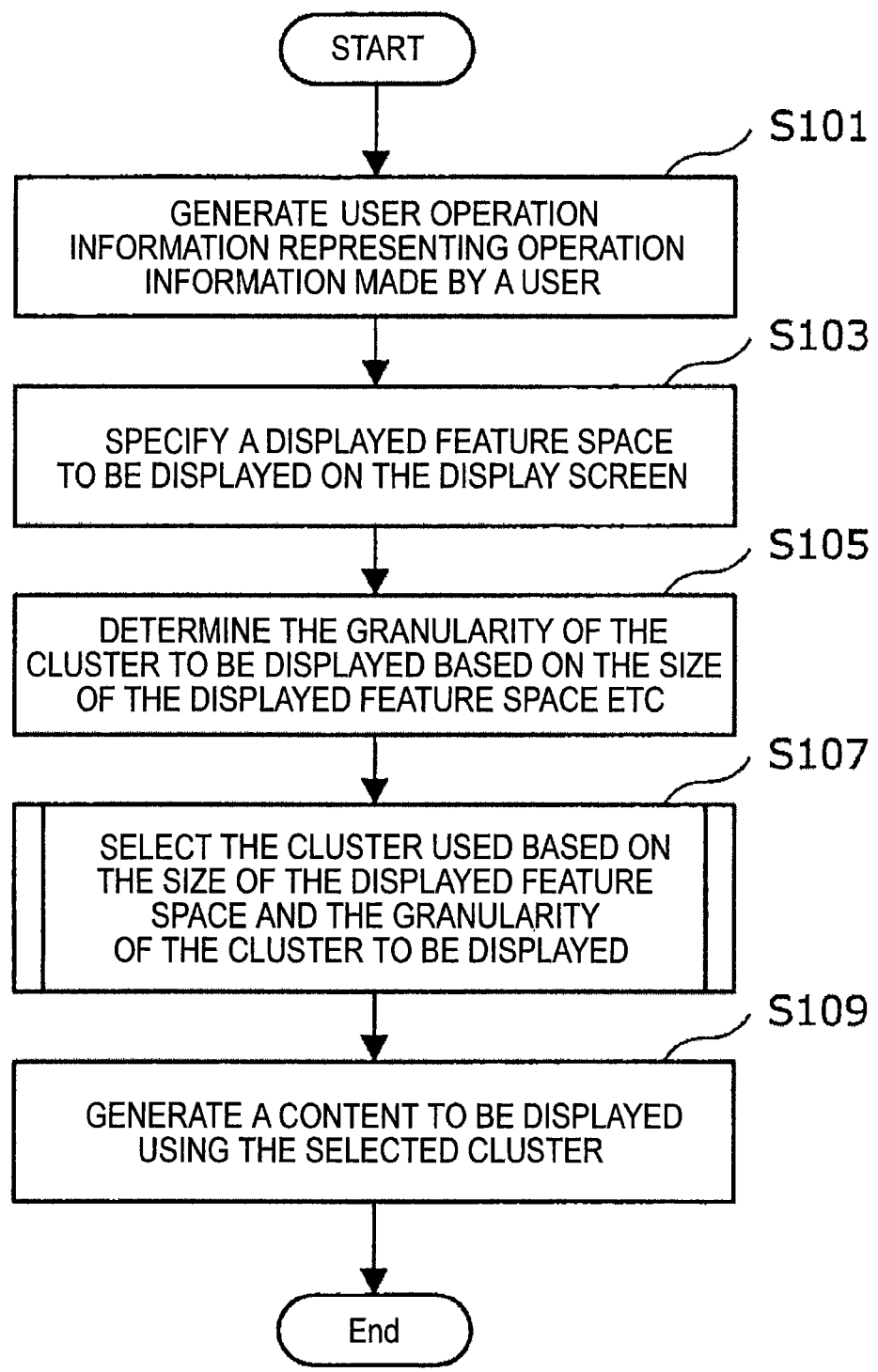
FIG. 16 is a flow diagram illustrating an entire flow of the information processing method according to the embodiment.
Figure 17:
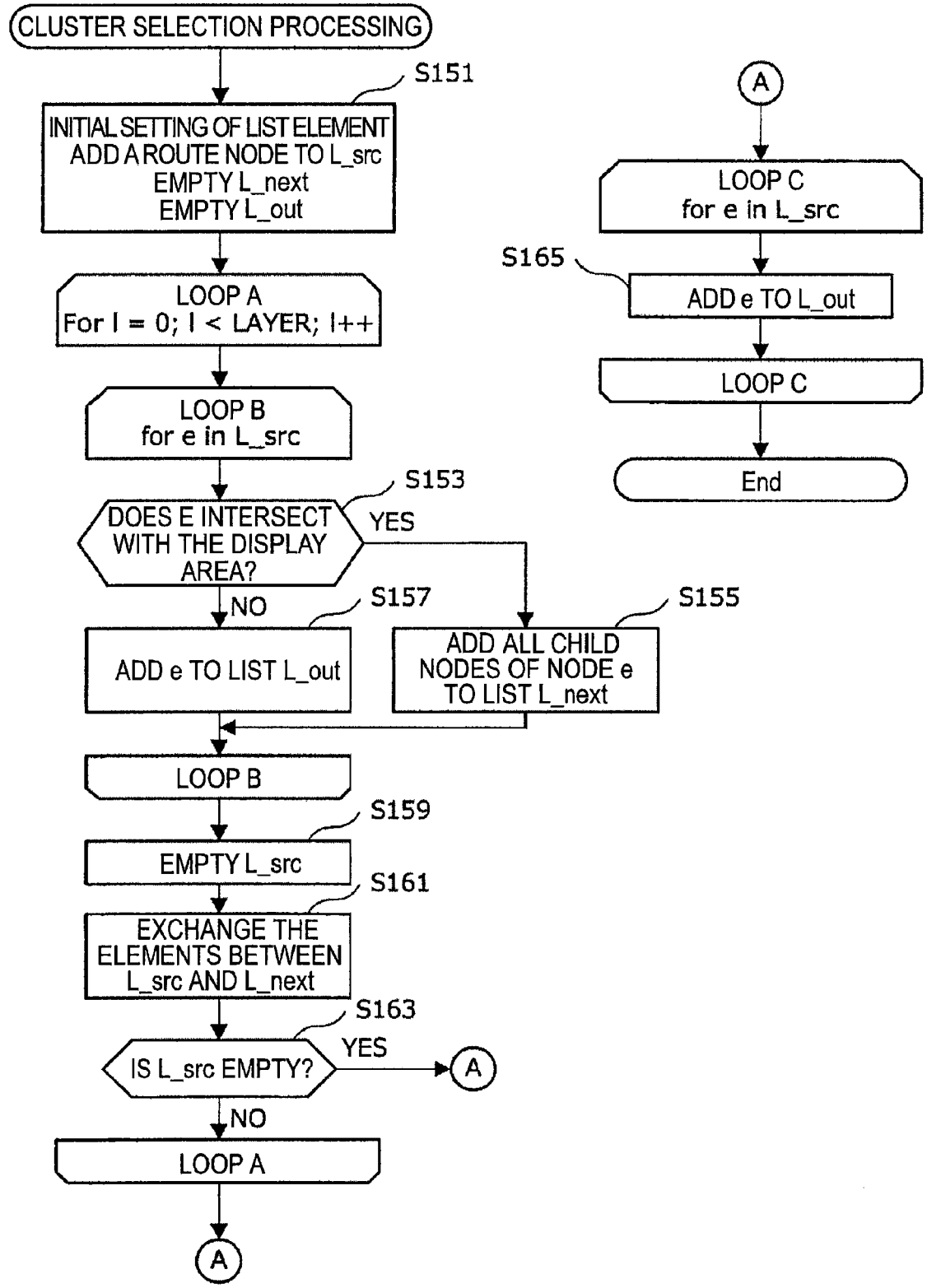
FIG. 17 is a flow diagram illustrating a flow of processing of cluster selection in the information processing method according to the embodiment.

Now, referring to FIG. 16 and FIG. 17, a flow of an information processing method according to the embodiment will be described. FIG. 16 and FIG. 17 are flow diagrams each showing an example of a flow of the information processing method according to the embodiment.

[Entire Flow]

Referring to FIG. 16, entire flow of the information processing method according to the embodiment will be described first.

First, the user operation information generating section 101 of the information processor 10 obtains a signal made by user's operation from various kinds of input devices, and generates user's operation information representing operation information made by a user (step S101), and outputs the signal to the display format selection control section 103 and the display control section 105.

Based on the user's operation information notified from the user operation information generating section 101, the display format selection control section 103 specifies a feature space to be displayed on the display screen (displayed feature space) (step S103). With this, the size of the displayed feature space and a reduction scale ratio (or magnification ratio) for displaying the displayed feature space on the display screen are specified.

Subsequently, the display format selection control section 103 determines the granularity of the cluster to be displayed on the display screen based on the size of the specified displayed feature space and the reduction scale ratio (step S105). Then, the display format selection control section 103 outputs various kinds of information on the displayed feature space and the information on the granularity of the cluster to be displayed in the display screen to the node selecting section 107.

The node selecting section 107 refers to the previously generated tree structure and the metadata associated with the cluster, and selects the cluster used for processing by the display format selection control section 103 based on the size of the displayed feature space, the reduction scale ratio and the granularity of the cluster to be displayed (step S107). After the display format selection control section 103 selects the cluster used for processing, the node selecting section 107 outputs the information on the selected cluster to the display format selection control section 103.

The display format selection control section 103 refers to the information on the cluster notified from the node selecting section 107, and generates a content to be displayed using the selected cluster (step S109). In particular, the display format selection control section 103 causes the cluster positioned within the display screen among the selected clusters to be displayed within the display screen. Also, as for the cluster positioned out of the display screen among the selected cluster, the display format selection control section 103 causes the cluster object such as the label 13 and the direction indicator 15 to be displayed within the display screen. With this, the granularity of the clusters existing within the display screen is adjusted to a same level, and as for the clusters positioning out of the display screen, cluster objects which suggest the existence of the clusters positioning out of the display screen are displayed within the display screen.

[Flow of Processing of Cluster Selection]

Now, referring to FIG. 17, a flow of the processing of cluster selection according to the embodiment will be described below.

When the display format selection control section 103 requests start of processing of node (i.e. cluster) selection, the node selecting section 107 sets the values of parameters (parameter LAYER in FIG. 17) that prescribe the hierarchy to be searched for in the tree structure first based on the information on the granularity of the cluster notified from the display format selection control section 103. Also, the node selecting section 107 sets the values of the parameters prescribing the displayed feature space (hereinafter, simply referred to as display area) based on the information on the displayed feature space notified from the display format selection control section 103.

Subsequently, the node selecting section 107 sets initial setting of elements in the list used for processing of node selection (step S151).

In particular, the node selecting section 107 makes initial setting of three kinds of lists of L_src, L_next and L_out. Here, the list L_src is a list which stores values indicating the node focused in the node search processing as elements; the list L_next is a list which stores values indicating the node to be focused in the following series of processing as elements; and the list L_out is the list which stores values indicating the selected node as elements. The node selecting section 107 adds a route node to the list L_src and eliminates the information from the lists L_next and L_out.

In a repetitive processing of "loop A" shown in FIG. 17, the node selecting section 107 sets 0 to the value of parameter 1 representing the hierarchy of the focused tree structure, and during parameter 1<LAYER is established, repeats the processing step S153 to step S163 described below. The repetitive processing represented by "loop A" includes a repetitive processing "loop B" of step S153 to step S157 and processing of step S159 to step S163.

In the repetitive processing "loop B" shown in FIG. 17, the node selecting section 107 carries out the processing described below on a node (represented by parameter e) stored in the list L_src. That is, the node selecting section 107 determines whether the relevant node intersects with the display area on the node (focused node) represented by the parameter e (step S153). When the focused node represented by the parameter e intersects with the display area, the node selecting section 107 adds all child nodes of the node e to the list L_next (step S155). When the focused node represented by the parameter e does not intersect with the display area, the node selecting section 107 adds the node e to the list L_out (step S157).

When the processing on every node e stored in the list L_src has completed, the node selecting section 107 terminates the repetitive processing "loop B", and deletes the content (element) of the list L_src (step S159). Subsequently, the node selecting section 107 exchanges the elements of the list L_src and the elements of the list L_next (step S161). Then, the node selecting section 107 determines whether the elements of the list L_src is empty (step S163).

When the element of the list L_src is empty, the node selecting section 107 suspends the repetitive processing of "loop A", and carries out the repetitive processing "loop C" described below. When the element of the list L_src is not empty, the node selecting section 107 increases the value of the parameter LAYER by 1, and continues the repetitive processing of "loop A".

In step S153, when the value of the list L_src is empty, or when the repetitive conditions of "loop A" is not satisfied, the node selecting section 107 carries out the repetitive processing "loop C". The repetitive recessing "loop C" is carried out on every node e stored as the elements of the list L_src.

In particular, the node selecting section 107 adds a value representing the focused node e as an element of the list L_out (step S165). After carrying out the processing at step S165 on every node e stored as the elements of the list L_src, the node selecting section 107 terminates the repetitive processing represented by "loop C", and terminates the processing of node selection.

By carrying out the processing of node selection in the flow as described above, the node selecting section 107 selects, for example, nodes shown in FIG. 9 as the nodes (clusters) used by the display format selection control section 103 for processing.

The flow of the information processing method according to the embodiment has been described above while referring to FIG. 16 and FIG. 17.

First Modification

Figure 18:
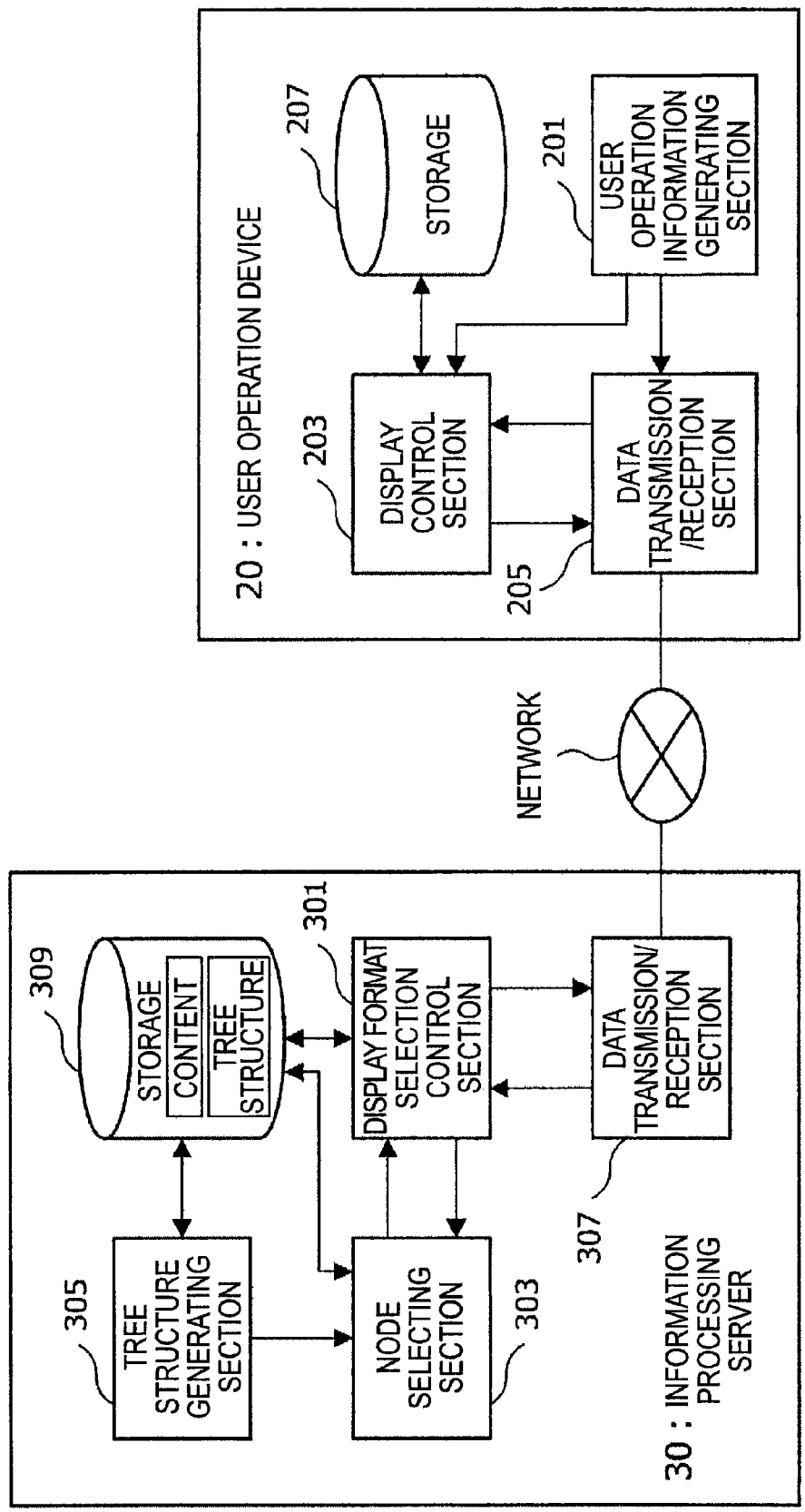
FIG. 18 is a block diagram for explaining a first example of a modification of the information processor according to the embodiment.
Figure 19:
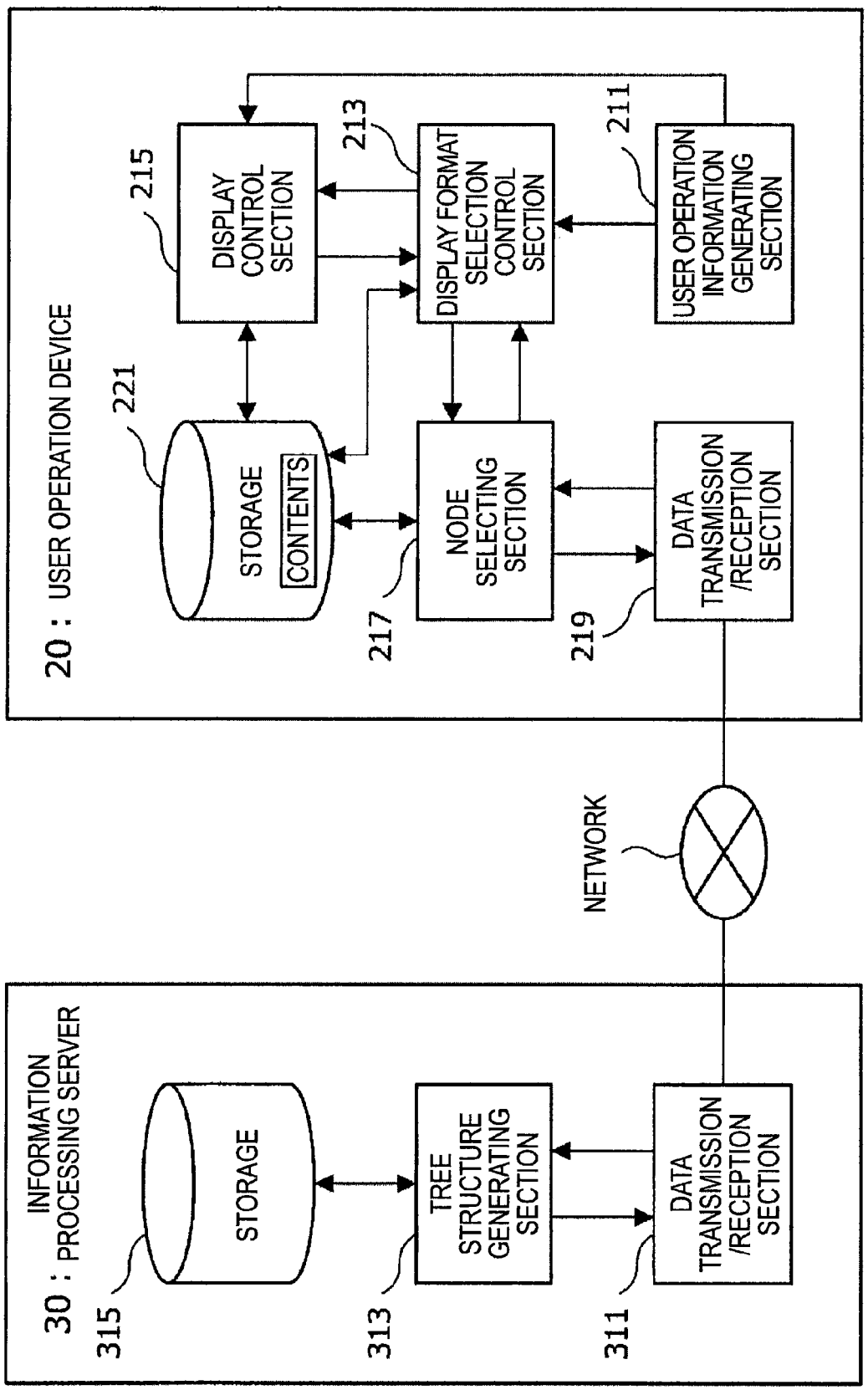
FIG. 19 is a block diagram for explaining the first example of the modification of the information processor according to the embodiment

Now, a first modification of the information processor 10 according to the embodiment will be briefly described referring to FIG. 18 and FIG. 19. FIG. 18 and FIG. 19 are block diagrams each showing an example of the configuration of an information processing system which is capable of achieving the functions of the information processor 10 according to the embodiment.

FIG. 5 shows an example in which the function of the information processor 10 according to the embodiment is achieved within a certain apparatus. However, for example, as shown in FIG. 18, the function of the information processor 10 according to the embodiment described referring to FIG. 3-FIG. 15 may be achieved by a collaboration with a plurality of devices connected with each other via various kinds of network, or a plurality of devices connected directly to each other.

An information processing system according to the modification achieves the functions of the information processor 10 according to the embodiment by a user operation device 20 and an information processing server 30 which are connected to each other via a network as shown in FIG. 18 and collaborate with each other.

The user operation device 20 includes mainly a user operation information generating section 201, a display control section 203, a data transmission/reception section 205 and storage 207 as shown in FIG. 18 as an example.

The user operation information generating section 201 has the same function as that of the user operation information generating section 101 included in the information processor 10 according to the embodiment shown in FIG. 5 excepting a point that the generated user's operation information is outputted to the information processing server 30 via a data transmission/reception section 205 described below. Since the same effect is obtained, detailed description is omitted here.

The display control section 203 controls the display using information outputted from the information processing server 30 received by the data transmission/reception section 205 described below. The display control section 203 outputs the information used for specifying the size of the feature space to be displayed on the display screen such as the size of the display screen to the information processing server 30 via data transmission/reception section 205 described below. As for other points, the display control section 203 according to the modification has the same function as that of the display control section 105 included in the information processor 10 according to the embodiment shown in FIG. 5. Since the same effect is obtained, detailed description is omitted here.

The data transmission/reception section 205 includes a CPU, a ROM, a RAM, a communicating device and the like. The data transmission/reception section 205 transmits various kinds of information outputted from the user operation information generating section 201 and the display control section 203 to the information processing server 30 via a network. The data transmission/reception section 205 also receives various kinds of information outputted from the information processing server 30 via a network, and outputs the same to the display control section 203.

The storage 207 is an example of a storage device included in the user operation device 20 according to the modification. The storage 207 may store application data corresponding to various kinds of application which the display control section 203 uses for displaying various kinds of information on the display screen. Furthermore, the storage 207 appropriately stores various parameters and processing in progress necessary to be stored for the user operation device 20 to carry out some kind of processing, or various kinds of database. The storage 207 allows the processing sections included in the user operation device 20 according to the modification to freely write thereon and read therefrom.

In the example of the modification, a case, in which the information processing server 30 stores various kinds of content data, metadata corresponding to content data and the like, is described. However, these content data and metadata may be stored in the storage 207.

An example of the function of the user operation device 20 according to the modification has been described above. The above-described component elements may include a general purpose unit or circuit, or hardware each specialized to the functions of the component elements. Or a CPU or the like may perform every function of the component elements. Therefore, the applied configuration may be appropriately changed in accordance with the technical art at the point when the embodiment is implemented.

A computer program for achieving the functions of above-described user operation device according to the modification may be created and mounted on a personal computer or the like. A computer readable record medium which stores such computer program may be provided. For example, a magnetic disk, an optical disk, a magnetic optical disk, a flash memory and the like are available for the record medium. The above-described computer program may be delivered via, for example, a network without using any record medium.

The information processing server 30 according to the modification includes mainly a display format selection control section 301, a node selecting section 303, a tree structure generating section 305, a data transmission/reception section 307, and a storage 309 as shown in FIG. 18 as an example.

The display format selection control section 301 according to the modification has the same function as that of the display format selection control section 103 included in the information processor 10 according to the embodiment shown in FIG. 5 excepting a point that various kinds of information transmitted from the user operation device 20 via a network are used. Since the same effect is obtained, detailed description is omitted here.

The node selecting section 303 and the tree structure generating section 305 also have the same configuration as that of the node selecting section 107 and the tree structure generating section 111 included in the information processor 10 according to the embodiment shown in FIG. 5. Since the same effect is obtained, detailed description is omitted here.

The data transmission/reception section 307 includes, for example, a CPU, a ROM, a RAM, a communicating device and the like. The data transmission/reception section 307 receives various kinds of information transmitted from the user operation device 20 via a network, and transmits various kinds of information outputted from the display format selection control section 301 to the user operation device 20 via a network.

The storage 309 is an example of the storage device included in the information processing server 30 according to the modification. The storage 309 stores various kinds of content data owned by a user operating the user operation device 20 and metadata or the like associated with the content data. The storage 309 may also store tree structure data corresponding to the tree structure generated by the tree structure generating section 305 or an external information processor. Furthermore, the storage 309 appropriately stores various parameters and processing in progress necessary to be stored for the information processing server 30 to carry out some kind of processing, or various kinds of database. The storage 309 allows the processing sections included in the information processing server 30 according to the modification to freely write thereon and read therefrom.

An example of the functions of the information processing server 30 according to the modification has been described above. The above-described component elements may include a general purpose unit or circuit, or hardware each specialized to the functions of the component elements. Or a CPU or the like may perform every function of the component elements. Therefore, the applied configuration may be appropriately changed in accordance with the technical art at the point when the embodiment is implemented.

A computer program for achieving the functions of the above-described information processing server according to the modification may be created and mounted on a personal computer or the like. A computer readable record medium which stores such computer program may be provided. For example, a magnetic disk, an optical disk, a magnetic optical disk, a flash memory and the like are available for the record medium. The above-described computer program may be delivered via, for example, a network without using any record medium.

FIG. 18 shows an example in which the function of the display format selection control section, the function of the node selecting section, the function of the tree structure generating section, and the storage management functions of the content data and the metadata are achieved by a single server. However, these functions may be achieved by a plurality of servers separately.

In the example shown in FIG. 18, the functions of the user operation information generating section and the display control section in the functions of the information processor 10 according to the embodiment are achieved by the user operation device 20; and the functions of the display format selection control section, the node selecting section and the tree structure generating section are achieved by the information processing server 30. However, in the plurality of processing sections included in the information processor 10 according to the embodiment shown in FIG. 5, it is changeable which of the user operation device 20 or the information processing server 30 achieves the function of which processing section accordingly.

In an example shown in FIG. 19, the user operation device 20 achieves the functions of the user operation information generating section, the display format selection control section, the display control section and the node selecting section in the functions of the information processor 10 according to the embodiment, and the information processing server 30 achieves the function of the tree structure generating section. In this example, the tree structure used for the processing of node selection may be generated or updated at arbitrary timing by the information processing server 30.

In this example, the user operation device 20 includes mainly a user operation information generating section 211, a display format selection control section 213, a display control section 215, a node selecting section 217, a data transmission/reception section 219 and a storage 221.

Here, the user operation information generating section 211, the display format selection control section 213, the display control section 215 and the storage 221 have the same configuration as those of the user operation information generating section 101, the display format selection control section 103, the display control section 105 and the storage 109 in the information processor 10 according to the embodiment respectively. Since the same effect is obtained, detailed description is omitted here.

Excepting a point that the node selecting section 217 requests the information processing server 30 to provide the tree structure generated by the information processing server 30 based on the contents managed by the user operation device 20, and performs the processing of node selection using the tree structure, the node selecting section 217 has the same configuration and obtains the like effects as the node selecting section 107 included in the information processor 10 according to the embodiment. Therefore, detailed description will be omitted here.

The data transmission/reception section 219 includes a CPU, a ROM, a RAM, a communicating device and the like. The data transmission/reception section 219 transmits the information requesting to provide the tree structure outputted from the node selecting section 217 to the information processing server 30 via a network. The data transmission/reception section 219 also receives the information on the generated tree structure, which is outputted from the information processing server 30 via network, and outputs to the node selecting section 217.

An example of the function of the user operation device 20 according to the modification has been described above. The above-described component elements may include a general purpose unit or circuit, or hardware each specialized to the functions of the component elements. Or a CPU or the like may perform every function of the component elements. Therefore, the applied configuration may be appropriately changed in accordance with the technical art at the point when the embodiment is implemented.

A computer program for achieving the functions of the above-described user operation device according to the modification may be created and mounted on a personal computer or the like. A computer readable record medium which stores such computer program may be provided. For example, a magnetic disk, an optical disk, a magnetic optical disk, a flash memory and the like are available for the record medium. The above-described computer program may be delivered via, for example, a network without using any record medium.

The information processing server 30 includes mainly a data transmission/reception section 311, a tree structure generating section 313 and a storage 315.

The data transmission/reception section 311 includes, for example, a CPU, a ROM, a RAM, a communicating device and the like. The data transmission/reception section 311 receives a request to provide the tree structure transmitted from the user operation device 20 via a network, and transmits the information on tree structure generated by the tree structure generating section 313 described below to the user operation device 20 via a network.

The tree structure generating section 313 according to the modification is a processing section that carries out the clustering processing of contents based on the contents managed by the user operation device 20 to generate a tree structure representing a clustering result. The tree structure generating section 313 has the same configuration and same effect as that of the tree structure generating section 111 included in the information processor 10 according to the embodiment. Therefore, detailed description is omitted here.

The storage 315 is an example of the storage device included in the information processing server 30 according to the modification. Furthermore, the storage 315 appropriately stores various parameters and processing in progress necessary to be stored for the information processing server 30 to carry out some kind of processing, or various kinds of database. The storage 315 allows the processing sections included in the information processing server 30 according to the modification to freely write thereon and read therefrom.

An example of the function of the information processing server 30 according to the modification has been described above. The above-described component elements may include a general purpose unit or circuit, or hardware each specialized to the functions of the component elements. Or a CPU or the like may perform every function of the component elements. Therefore, the applied configuration may be appropriately changed in accordance with the technical art at the point when the embodiment is implemented.

A computer program for achieving the functions of the above-described information processing server according to the modification may be created and mounted on a personal computer or the like. A computer readable record medium which stores such computer program may be provided. For example, a magnetic disk, an optical disk, a magnetic optical disk, a flash memory and the like are available for the record medium. The above-described computer program may be delivered via, for example, a network without using any record medium.

A first modification of the information processor 10 according to the embodiment has been described above referring to FIG. 18 and FIG. 19.

Second Embodiment

Display Screen

Now, a consideration is made on a case where content data and cluster which are associated with a piece of positional information are subjected to a selection processing based on an arbitrary position on the display screen (for example, present position etc) or a range of a displayed feature space corresponding to the display screen, and a selection result is displayed on the display screen, which is explained in the first embodiment. In the following description, an example of a case is given, in which a cluster of a set of content data or a cluster and the like including a set of the relevant cluster itself is selected in accordance with various kinds of well-known methods, and the selected cluster and the like is displayed on the display screen using the display format described in the first embodiment.

Figure 20:
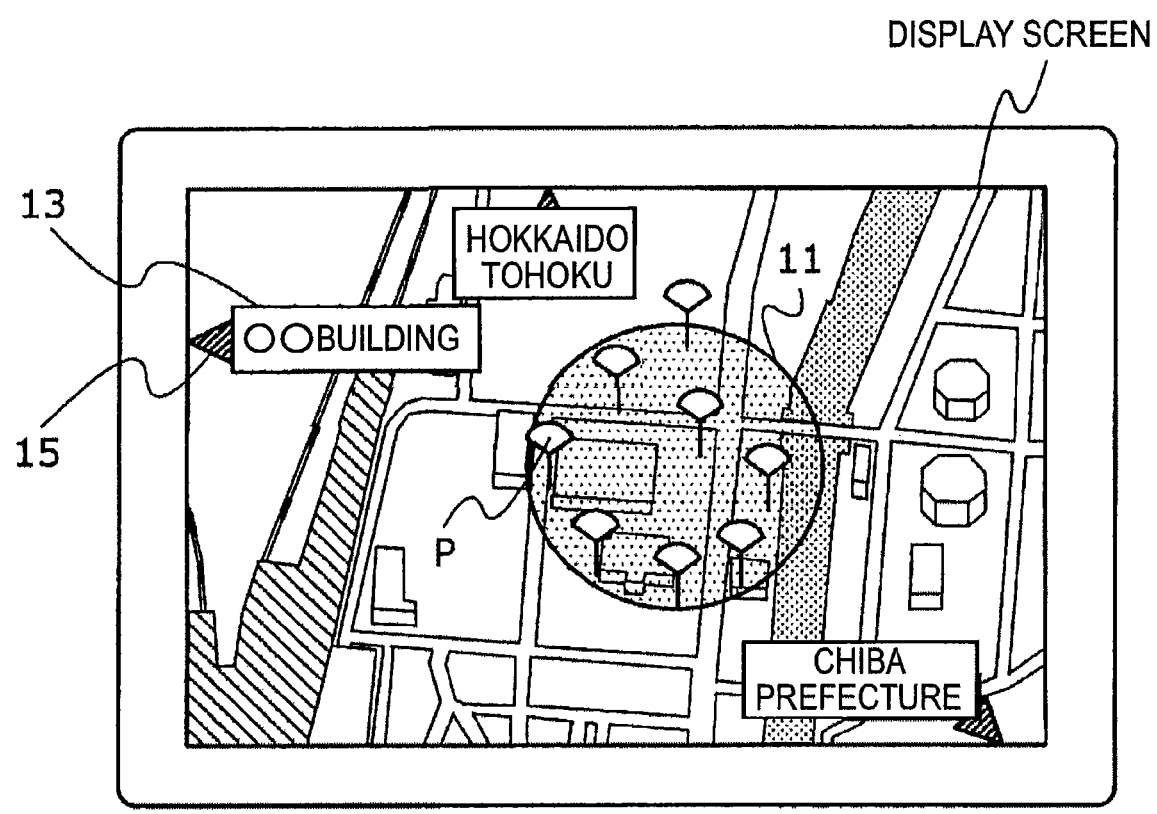
FIG. 20 is an illustration showing an example of a display screen.
Figure 21:
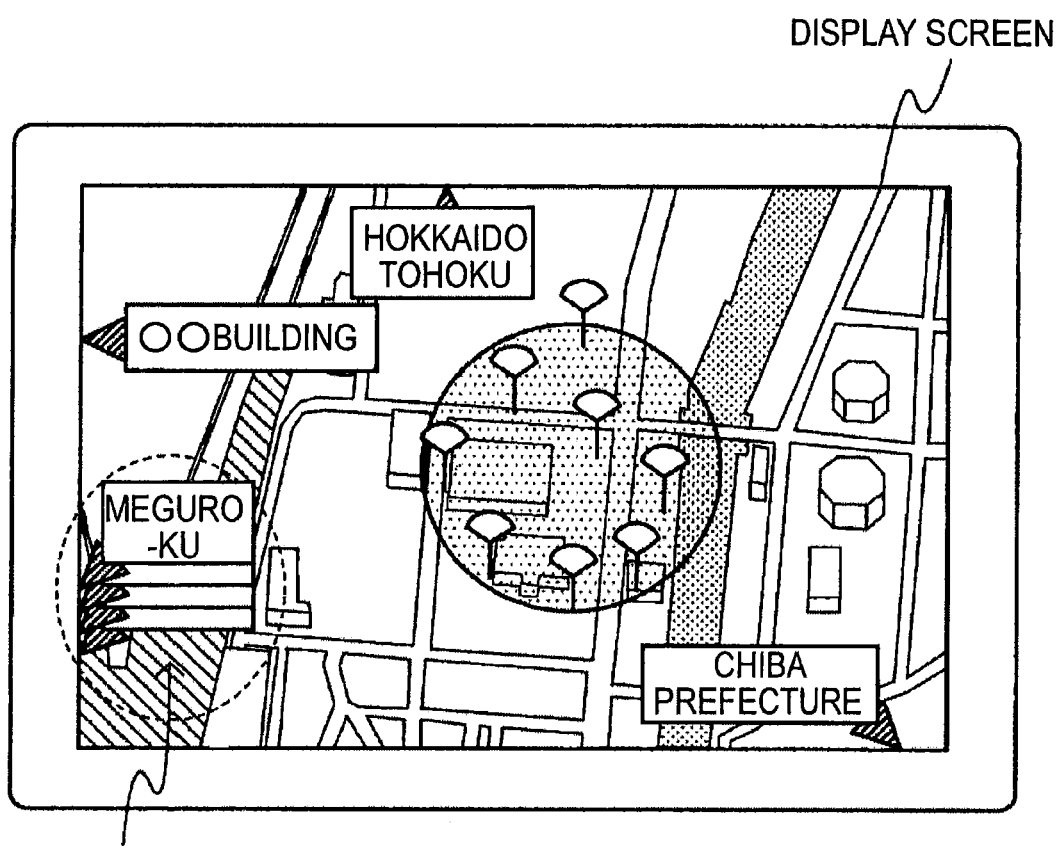
FIG. 21 is an illustration showing an example of a display screen.

FIG. 20 and FIG. 21 are illustrations each showing an example of the display screen.

In the above case, a cluster 11 which exists within a feature space (displayed feature space) corresponding to the display screen is displayed by using a shape which represents a range of the cluster (for example, circular shape shown in FIG. 20). Also, within the cluster 11 displayed on the display screen, a pin object P which represents a position of a content data existing within the cluster 11 may be displayed as shown in FIG. 20.

As for a cluster (exo-display screen cluster) which is not included in the displayed feature space (i.e. which exists outside the displayed feature space), as have been described in the first embodiment, a label 13 indicated with a name of a relevant cluster and a direction indicator 15 indicating a direction where a relevant cluster exists are displayed on the display screen as shown in FIG. 20 to suggest the existence of the exo-display screen cluster to a user.

The direction indicator 15 as shown in FIG. 20 is given so as to orient to a direction of a vector which extends from an arbitrary point within the display screen (for example, the center of the display screen) to a cluster center of the exo-display screen cluster. Therefore, when plural exo-display screen clusters exist collectively in a direction, it is conceivable that plural labels 13 and/or direction indicators 15 are displayed being overlapped with each other as marked with a dotted line in FIG. 21.

Therefore, in an information processor according to a second embodiment of the present disclosure described below, the display format is selected and the display screen is controlled to prevent the display screen from getting cluttered by the objects suggesting the existence of clusters which are located outside the display screen.

<Configuration of Information Processor>

Figure 22:
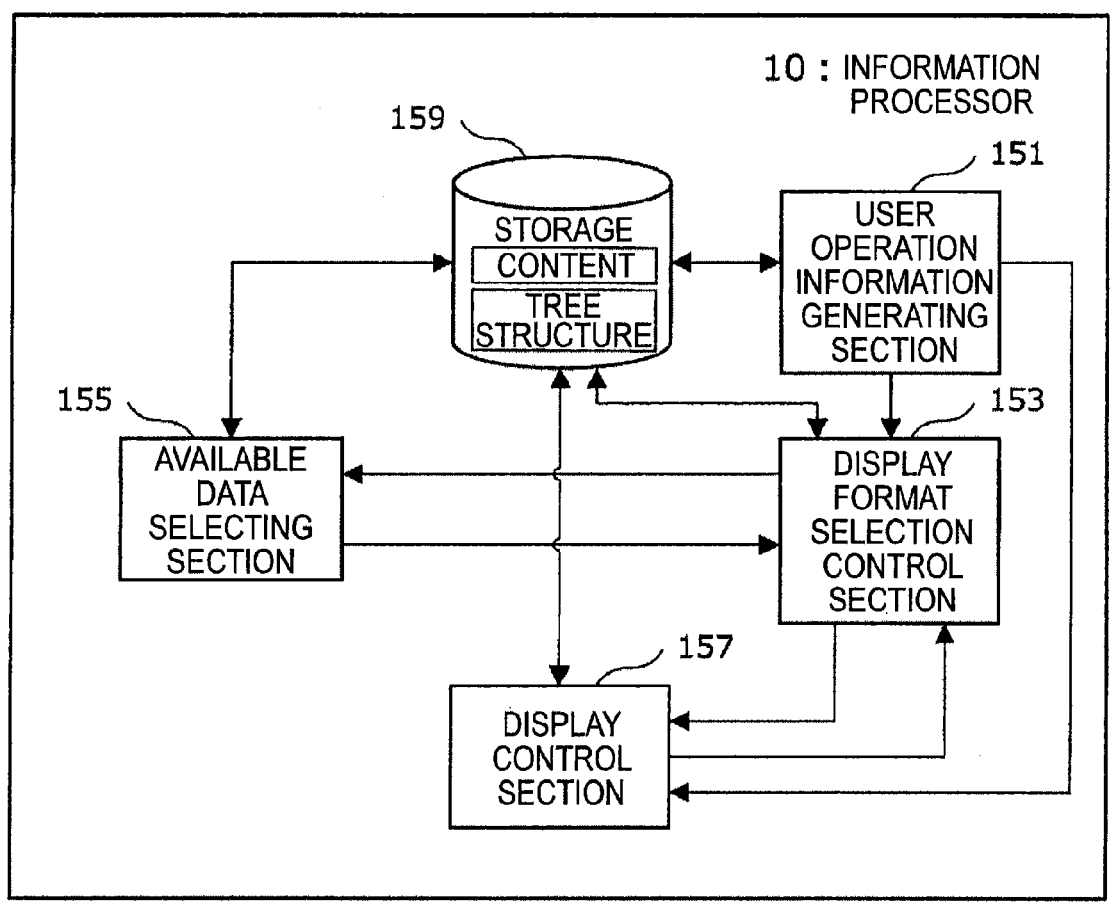
FIG. 22 is a block diagram showing a configuration of an information processor according to a second embodiment of the present disclosure.

Referring to FIG. 22, a configuration of the information processor 10 according to the embodiment is described below. FIG. 22 is a block diagram illustrating the configuration of the information processor 10 according to the embodiment.

The information processor 10 according to the embodiment includes mainly a user operation information generating section 151, a display format selection control section 153, an available data selecting section 155, a display control section 157 and a storage 159 as shown in FIG. 22.

The user operation information generating section 151 includes, for example, a CPU, a ROM, a RAM, an input device and the like. The user operation information generating section 151 generates user operation information which represents operation made by a user (user operation) using an input device such as a keyboard, a mouse, various buttons, a touch panel and the like provided to the information processor 10. After generating the user operation information representing the user's operation, the user operation information generating section 151 outputs the generated user operation information to the display format selection control section 153 and the display control section 157 described below.

The display format selection control section 153 includes, for example, a CPU, a ROM, a RAM and the like. The display format selection control section 153 collaborates with the available data selecting section 155 and the display control section 157 described below to select a display format for displaying at least a part of a feature space which is prescribed based on a predetermined feature amount and a piece of content data or a set (cluster) of content data in accordance with the display screen.

In particular, the display format selection control section 153 controls an available data selecting section 155 described below to display the selected content data and cluster within the display screen using the selected content data and cluster as well as cluster objects (label 13, direction indicator 15 and the like) which suggests clusters and the like located outside the display screen. The display format of the cluster object is identical to that described in the first embodiment.

As for the clusters located outside the display screen, when plural direction indicators 15 are displayed being overlapped with each other as shown in FIG. 21, the display format selection control section 153 according to the embodiment carries out a control method of the display screen as described below. With this, the cluster objects displayed on the display screen are rearranged to enhance user's convenience.

The processing to control the display of cluster objects by selecting the display format of the display screen will be described below while giving illustrative examples.

The available data selecting section 155, which is an example of the selection section, includes, for example, a CPU, a ROM, a RAM and the like. The available data selecting section 155 selects a set of content data satisfying predetermined conditions from content data and clusters of content data so as to have a granularity corresponding to the separation distance from the displayed feature space. The set of content data here may include a single piece of content data as an element or may include plural pieces of content data as elements. In particular, the available data selecting section 155 selects data on the content and cluster used by the display format selection control section 153 based on a method in which an arbitrary position within the display screen is focused using a previously generated tree structure, the method in which the feature space and the size displayed on the display screen are focused, which has been described in the first embodiment, or the like. The method with which the available data selecting section 155 selects the data on the content and cluster is not limited to the above-described example, but any method may be used. The available data selecting section 155 outputs the information on the selected content and cluster to the display format selection control section 153.

The display control section 157 includes, for example, a CPU, a ROM, a RAM, a communicating device, an output device and the like. The display control section 157 controls the display on a display screen of a display device such as a display provided to the information processor 10 or of a display device such as a display externally provided to the information processor 10. The display control section 157 controls the display of the display screen based on the user operation information notified from the user operation information generating section 151, the information on the display format of the display screen notified from the display format selection control section 153, and the like.

The storage 159 is an example of the storage device provided to the information processor 10 according to the embodiment. The storage 159 may store various kinds of content data stored in the information processor 10 and metadata corresponding to the content data and the like. The storage 159 may also store tree structure data corresponding to the tree structure representing a clustering result of the content data. Further, the storage 159 may store application data corresponding to various kinds of applications which are used by the display format selection control section 153 and the display control section 157 for displaying various kinds of information on the display screen. Moreover, the storage 159 stores various kinds of database and the like and parameters, which are generated by the information processor 10 during carrying out some processing, or suspended processing to be stored accordingly. The storage 159 allows the processing sections included in the information processor 10 according to the embodiment to write thereon and read therefrom at any time.

An example of the functions of the information processor 10 according to the embodiment has been described above. For the component elements described above, general purpose units or circuits or hardware dedicated to a specific function of a component element may be included. Furthermore, every function of the respective component elements may be carried out by a CPU or the like. Accordingly, applied configuration may be appropriately changed in accordance with the technical art at the point when the embodiment is implemented.

It is possible to create a computer program for achieving the above-described functions of the information processor according to the embodiment to be mounted to a personal computer or the like. Also, a computer readable recording medium which stores a computer program as above may be provided. As for the record medium, for example, a magnetic disk, an optical disk, a magnetic optical disk, a flash memory and the like are available. The above computer program may be delivered via, for example, a network, without using any recording medium.

<Example of Control Method of Display Screen>

Now referring to FIG. 23A-FIG. 40B, an example of a display control method of a display screen executed by the display format selection control section 153 according to the embodiment will be described in detail below. FIG. 23A-FIG. 40B are illustrations each showing an example of a display control method of a display screen according to the embodiment.

Figure 23A:
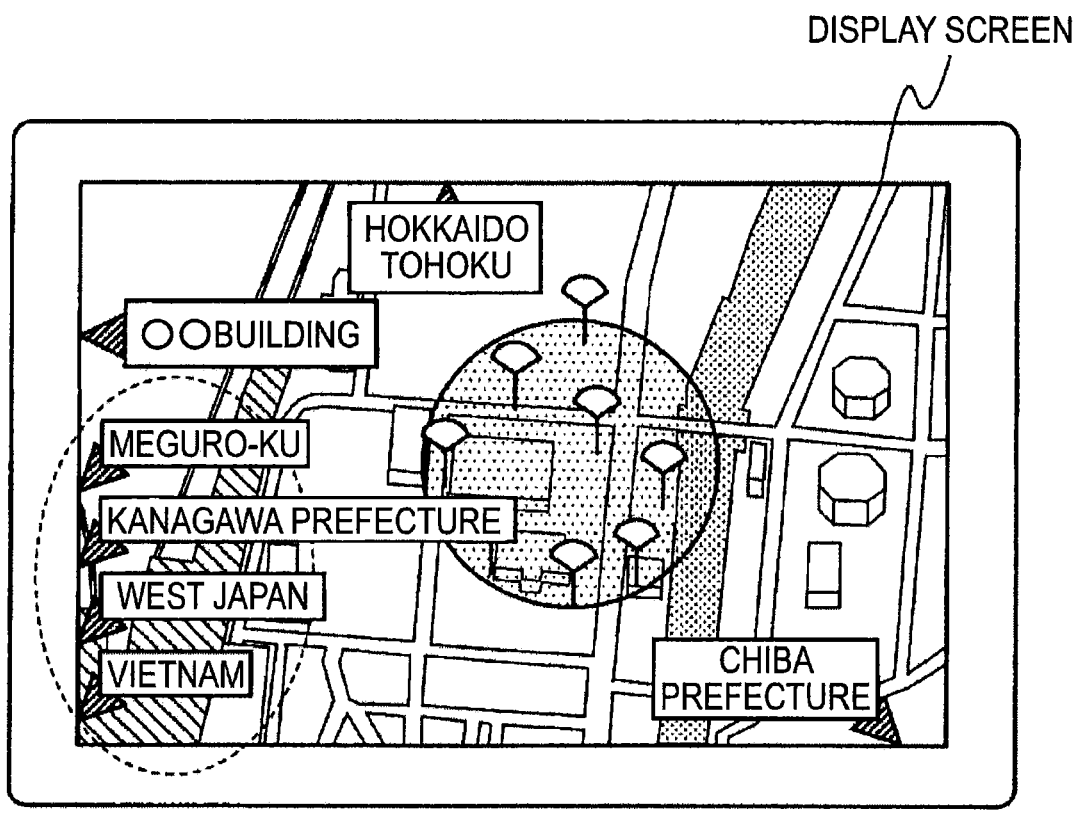
FIG. 23A is an illustration showing an example of a display screen control method according to the embodiment.

When a plurality of labels 13 and direction indicators 15 of clusters are overlapped with each other as shown in FIG. 21, the display format selection control section 153 may select a display format so that the labels 13 and the direction indicators 15 are displayed being separate as far as possible from each other while maintaining the direction of the direction indicators 15 as an example shown in FIG. 23A. When the direction indicators 15 may not be arranged on a straight line connecting between the center of the display screen and the cluster center, the labels 13 and the direction indicators 15 can be freely arranged by carrying out the above display control.

When a touch panel is mounted as the input device for the information processor 10, the display control may be made so that, for example, each of the labels 13 and the direction indicators 15 which are displayed being overlapped with each other are temporally moved in an arbitrary position by dragging them using a finger or an input device like a stylus as shown in FIG. 23B. In this case, the labels 13 and the direction indicators 15 are preferably arranged so that the ones located closer to the display screen come to the upper in order. The user is allowed to select any of the labels 13 and the direction indicators 15 by performing an operation of tapping, clicking or the like, and to move the displayed feature space to a position of the selected cluster. And by repeating the dragging operation on any of the labels 13 and the direction indicators 15 which are displayed being overlapped with each other, the user can move the labels 13 and the direction indicators 15 to select a desired cluster. When carrying out the control of the cluster objects as described above, the display format selection control section 153 preferably controls so as not to record the movement of the cluster object so as, when the contents of the display screen is updated due to the movement or the like, to display the cluster object at the previous position. For example, in an example shown in FIG. 23B, the user intends to temporally move a direction indicator appended with a label of "Meguro-ku". For example, when an area on a map displayed on the display screen is once moved to another area and then return to the area shown in FIG. 23B again, not a state of the direction indicator 15 shown in lower portion of FIG. 23B, but a state shown in upper portion of FIG. 23B is displayed on the display screen. With this, the user is allowed to instinctively operate the cluster objects; thus the convenience of the user can be enhanced.

Figure 24:
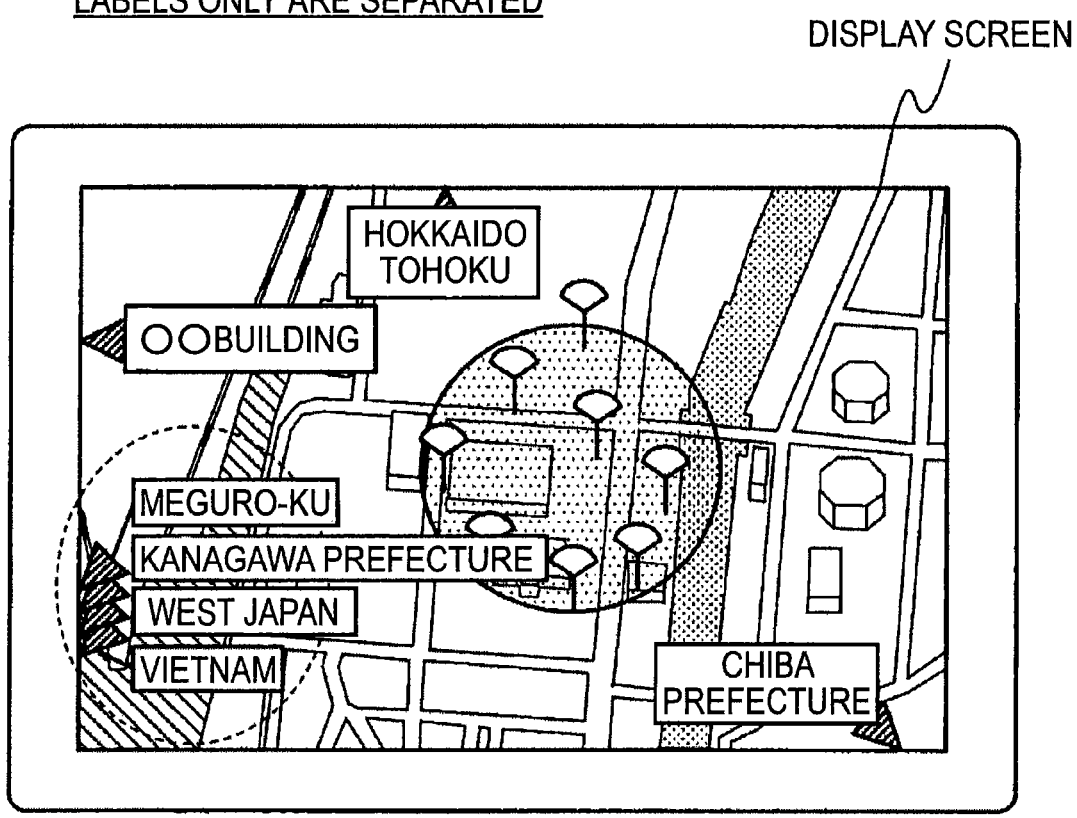
FIG. 24 is an illustration showing an example of the display screen control method according to the embodiment.

The display format selection control section 153 may control the display format so that the direction indicators 15 are left being overlapped with each other, but only the labels 13 are separated from each other as shown in FIG. 24. By displaying a line connecting between the label 13 and the direction indicator 15 as shown in FIG. 24, since the labels 13 each indicated with a name of the cluster may be separated from the direction indicator 15, the degree of freedom of the display screen can be further enhanced.

Figure 25:
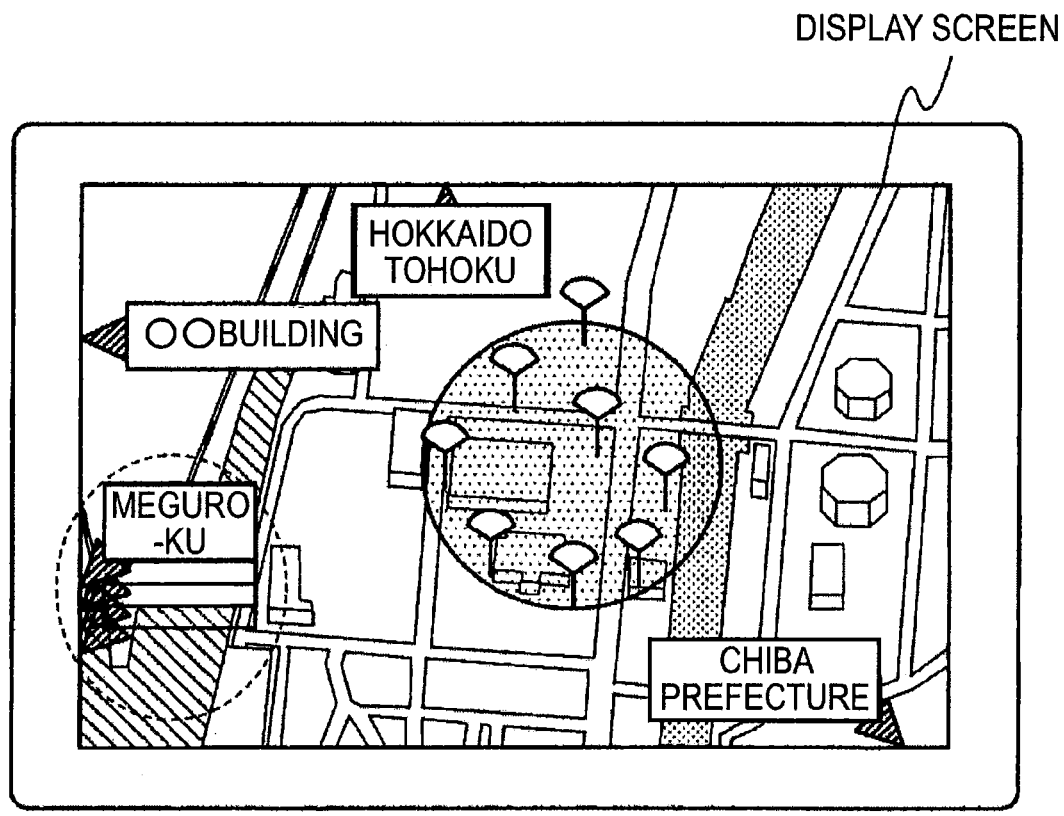
FIG. 25 is an illustration showing an example of the display screen control method according to the embodiment.

The display format selection control section 153 may control to arrange the labels 13 and the direction indicators 15 displayed being overlapped with each other so that the ones located closer to the display screen come upper in order as shown in FIG. 25, and then to apply a blur to the labels 13 and direction indicators 15 other than those displayed on the top to inhibit from being selected.

Figure 26:
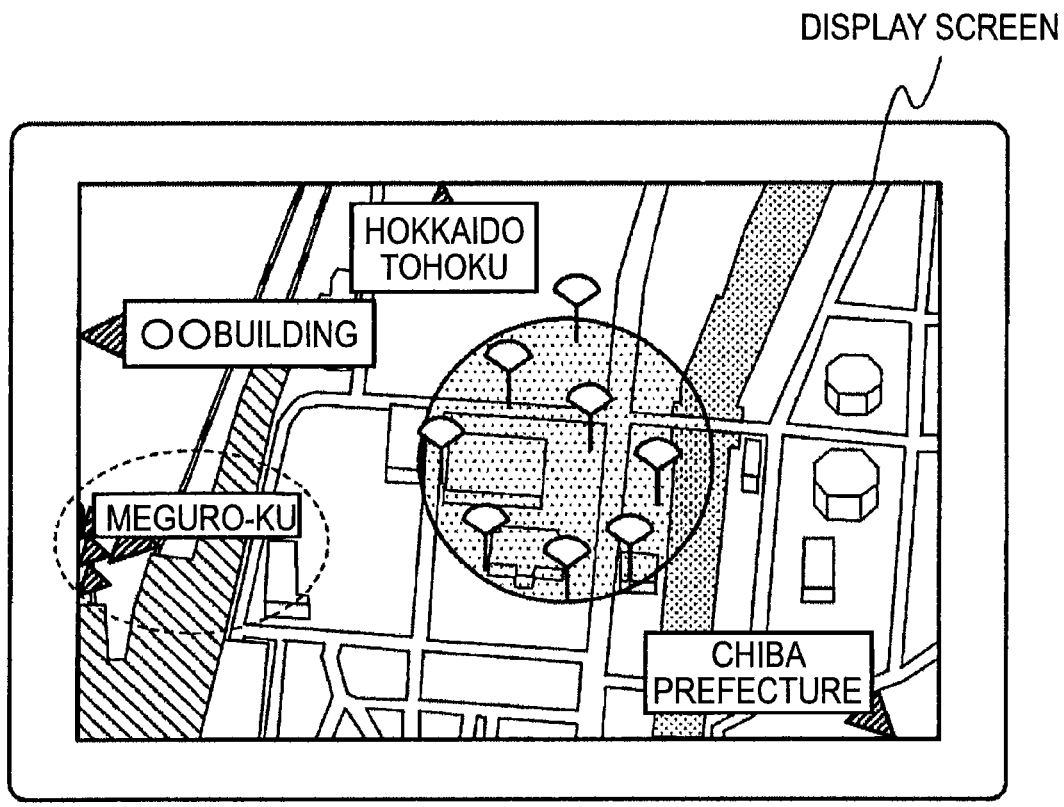
FIG. 26 is an illustration showing an example of the display screen control method according to the embodiment.

The display format selection control section 153 may control not to display the labels 13 of the clusters which are located far away from the display screen but to display the direction indicators 15 to be relatively smaller as shown in FIG. 26 to thereby simply suggest the existence thereof to the user. With this, the display screen can be prevented from getting cluttered.

Figure 27:
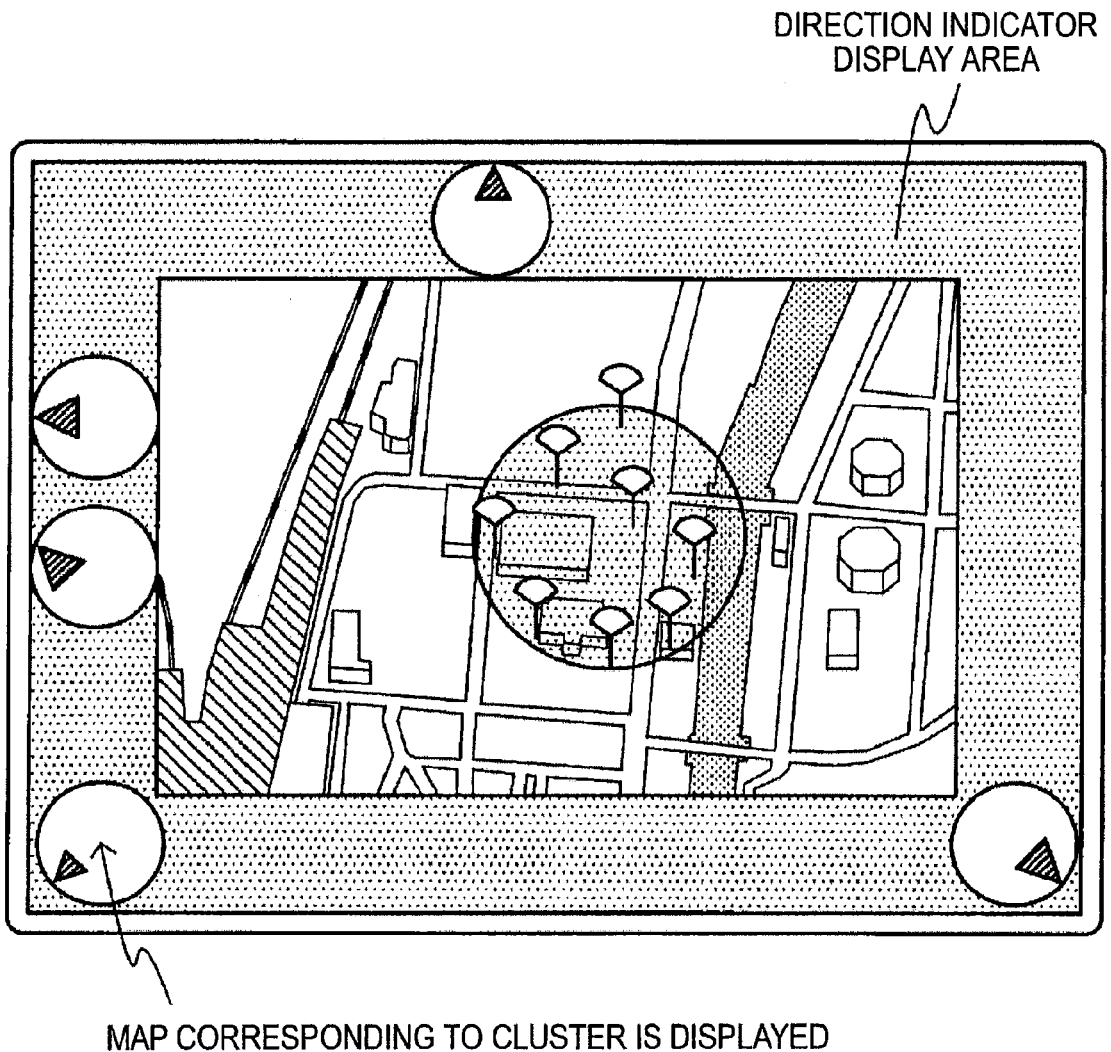
FIG. 27 is an illustration showing an example of the display screen control method according to the embodiment.
Figure 28:
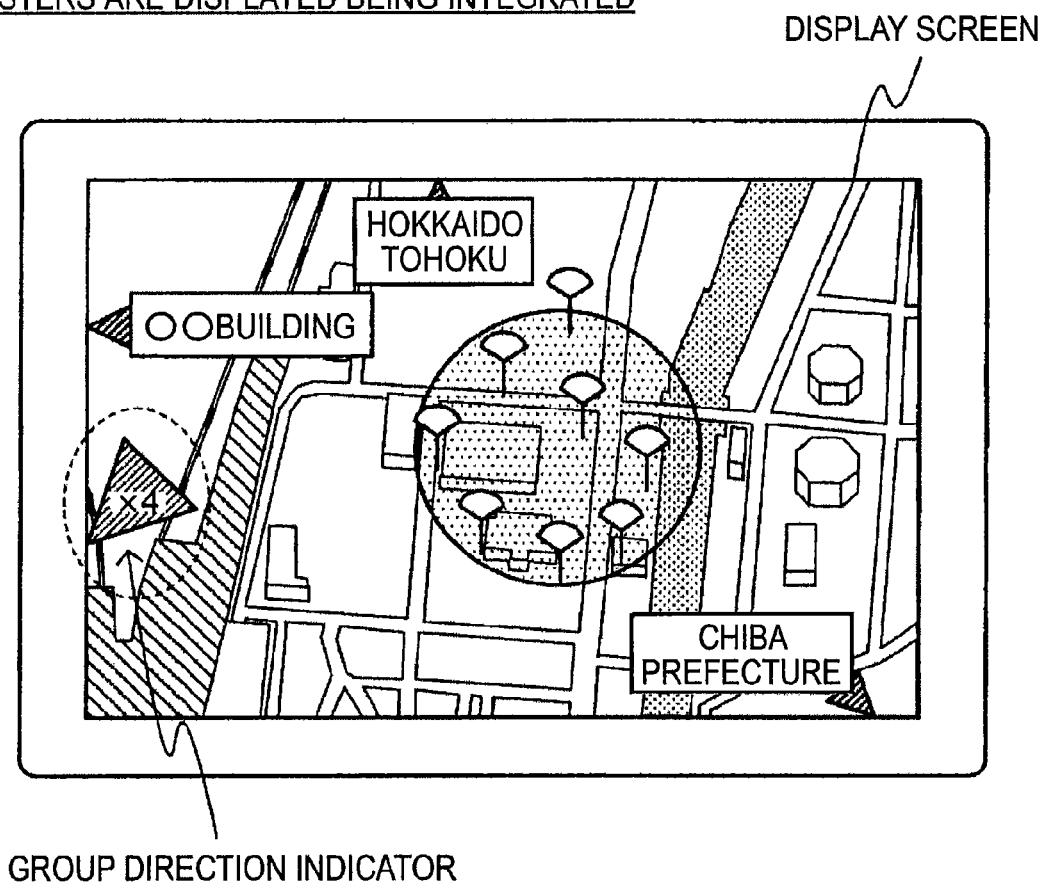
FIG. 28 is an illustration showing an example of the display screen control method according to the embodiment.

The display format selection control section 153 may control so that an area for displaying direction indicators 15 (direction indicator display area) is set being separated from a map display area on which a map is displayed as shown in FIG. 27, and the direction indicators 15 corresponding to the respective clusters are displayed in the direction indicator display area. At this time, the display format selection control section 153 may control to display a map representing a position of a cluster corresponding to the direction indicator 15 along with the direction indicator 15 in a predetermined shape (in FIG. 27, in a circle) to indicate the cluster correspond to which location to the user. Not only the map representing the location of the cluster but also various kinds of information such as name of the cluster and a distance to the cluster may be displayed in the direction indicator display area. When a character string indicating the point of the relevant map is displayed on the map corresponding to the cluster, the display format selection control section 153 may control so as not to display the label indicating the name of the cluster. It is selectable by user operation or initial setting made by the user that what information should be displayed along with the direction indicator 15 in the direction indicator display area.

As described above, the display format selection control section 153 is capable to control the display of the cluster object which suggests a cluster located outside the display screen in various display formats. The display format selection control section 153 may integrate the cluster objects which are overlapped with each other as shown in FIG. 21 into another new object to display the same. In an example shown in FIG. 28, the display format selection control section 153 selects a display format in which four cluster objects which are overlapped with each other are integrated into a new single arrow to display the same. Hereinafter, the direction indicator which is generated by integrating clusters being overlapped with each other will be referred to as group direction indicator.

Also, the display format selection control section 153 may select the display format so that not only the cluster object overlapped with each other, but also, for example, plural sets of clusters each having an angle, which is formed by a straight line connecting between the center of the display screen and the cluster center and is equal to or smaller than a predetermined threshold value, are displayed being integrated into a group direction indicator. With this, even cluster objects, which are not being overlapped with each other, can be displayed being represented by a group direction indicator; thereby the display screen can be prevented from getting cluttered.

When a group direction indicator displayed on the display screen is selected by the user, the display format selection control section 153 may control to display the content of the clusters, which are integrated in a group direction indicator, on the display screen to present the content of the clusters to the user.

Figure 29:
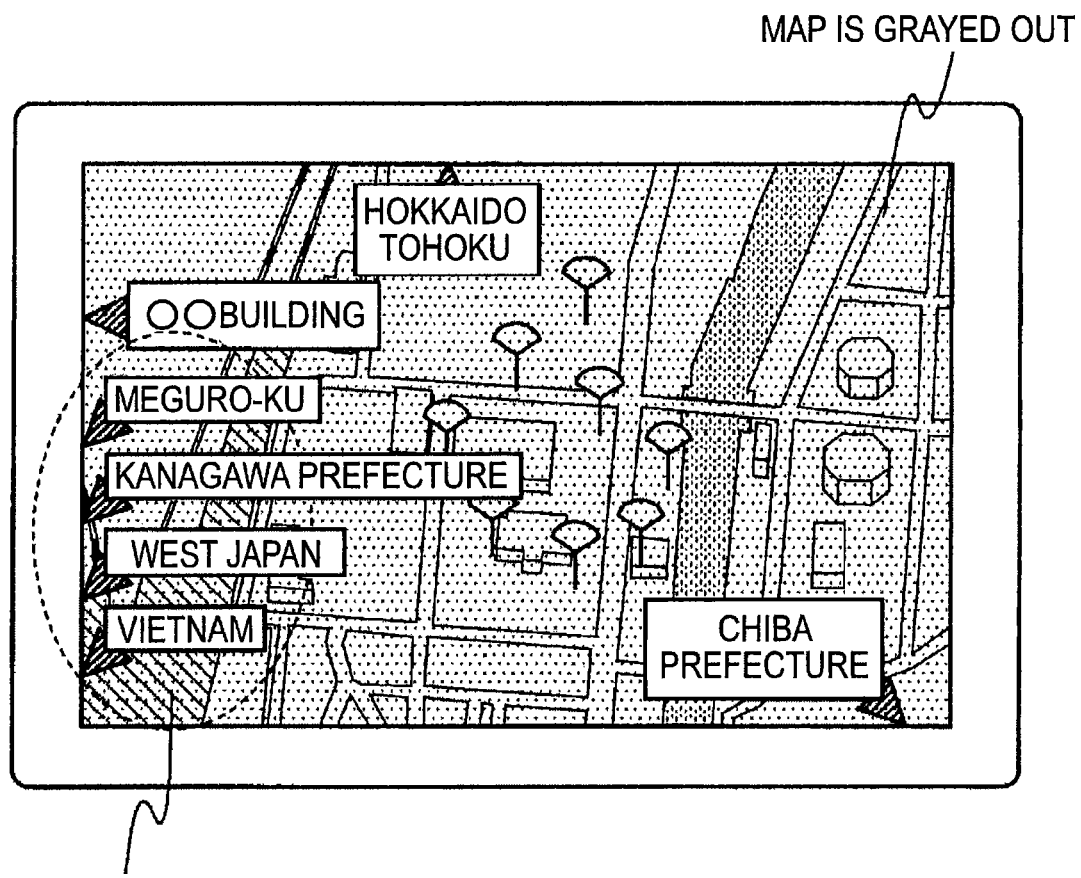
FIG. 29 is an illustration showing an example of the display screen control method according to the embodiment.

For example, in an example shown in FIG. 29, the display format selection control section 153 controls so as, when a group direction indicator is selected by the user, to gray out the map displayed on the display screen to display a new layer for displaying the contents of the group direction indicator on the display screen. By selecting the display format as described above, the display format selection control section 153 can present the content of the clusters included in the group direction indicator to the user. Also, since the new layer is displayed on the display screen after graying out the map, the cluster objects of the clusters included in the group direction indicator can be arranged freely on the display screen; thus the degree of freedom of the display format can be increased.

The display format selection control section 153 controls so as, when the group direction indicator is selected, to display the contents of the group direction indicator while reflecting the separation distance to the cluster corresponding to the group direction indicator. In particular, the display format selection control section 153 may control to move the group direction indicator in a predetermined direction as shown in FIG. 30, then to display a straight line according to a direction indicated by the group direction indicator, and then to expand contents of the group direction indicator on the straight line or in the vicinity of the straight line. At this time, the display format selection control section 153 controls to display the contents along a width direction (horizontal direction) or a height direction (vertical direction) of the display screen in accordance with a direction indicated by the group direction indicator. In an example shown in FIG. 30, the display format selection control section 153 controls so as, when a group direction indicator positioned at the left end of the display screen is selected, to gray out the map, to move the group direction indicator to the right end of the display screen, and then to display a straight line horizontally from the right edge toward the left edge. The information on the clusters included in the group direction indicator is displayed on the straight line at uniform intervals. Since the clusters included in the group direction indicator are sorted based on the separation distance from the displayed feature space, the display allows the user to instinctively comprehend that the clusters included in the group direction indicator exist in what positional relationship.

In the example shown in FIG. 30, names of the clusters and separation distances corresponding to clusters are displayed as the information on the clusters included in the group direction indicator. The display format selection control section 153 may control to display only the names of the clusters or the separation distances to the clusters or not to display the information on the clusters.

Figure 31A:
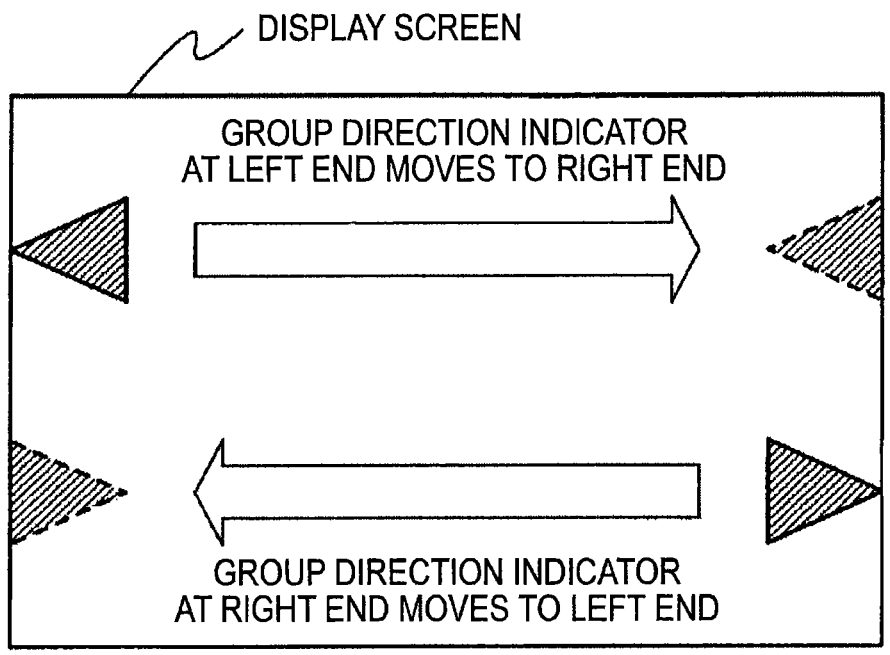
FIG. 31A is an illustration showing an example of the display screen control method according to the embodiment.
Figure 31B:
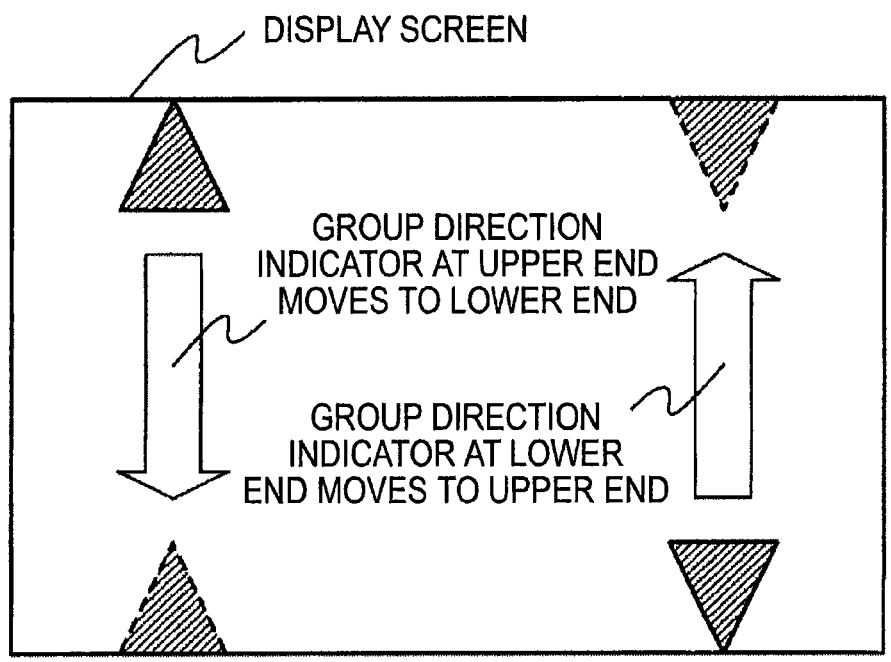
FIG. 31B is an illustration showing an example of the display screen control method according to the embodiment.

The display format selection control section 153 controls so as, when moving the group direction indicator, to move the group direction indicator in accordance with a rule as shown in FIG. 31A and FIG. 31B. That is, when the group direction indicator is positioned at the left end as shown in FIG. 31A, the display format selection control section 153 controls to move the group direction indicator to the right end and then to display a straight line extending from the right end toward the left end. Likewise, when the group direction indicator is positioned at the right end, the display format selection control section 153 controls to move the group direction indicator to the left end and then to display a straight line extending from the left end toward the right end.

When the group direction indicator is positioned at the upper end as shown in FIG. 31B, the display format selection control section 153 controls to move the group direction indicator to the lower end and then to display a straight line extending from the lower end toward the upper end. Likewise, when the group direction indicator is positioned at the lower end, the display format selection control section 153 controls to move the group direction indicator to the upper end and then to display a straight line extending from the upper end toward the lower end.

When displaying the contents of the group direction indicator on the straight line over the grayed out map, there may be a case where the contents of the group direction indicator cannot be displayed within a screen. In this case, the display format selection control section 153 may control to display an object like an icon which suggests the user that the contents of the group direction indicator remain as shown in FIG. 32 on the display screen. When the user selects the object or flicks the display screen, the display format selection control section 153 controls to display the remaining contents on the display screen as shown in the lower part in FIG. 32.

Figure 33:
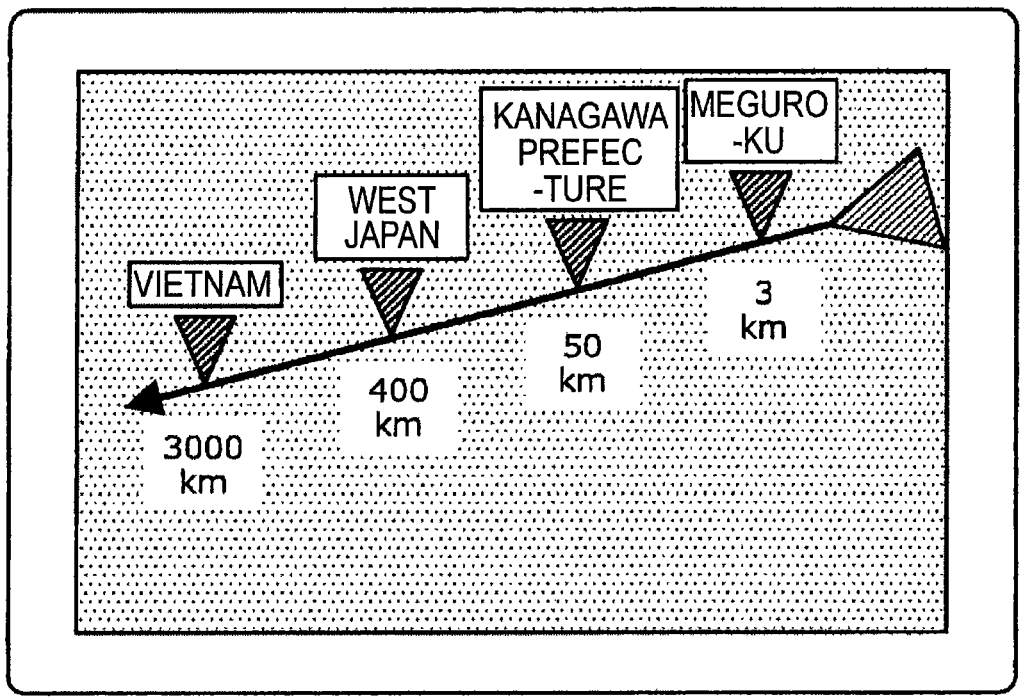
FIG. 33 is an illustration showing an example of the display screen control method according to the embodiment.
Figure 34:
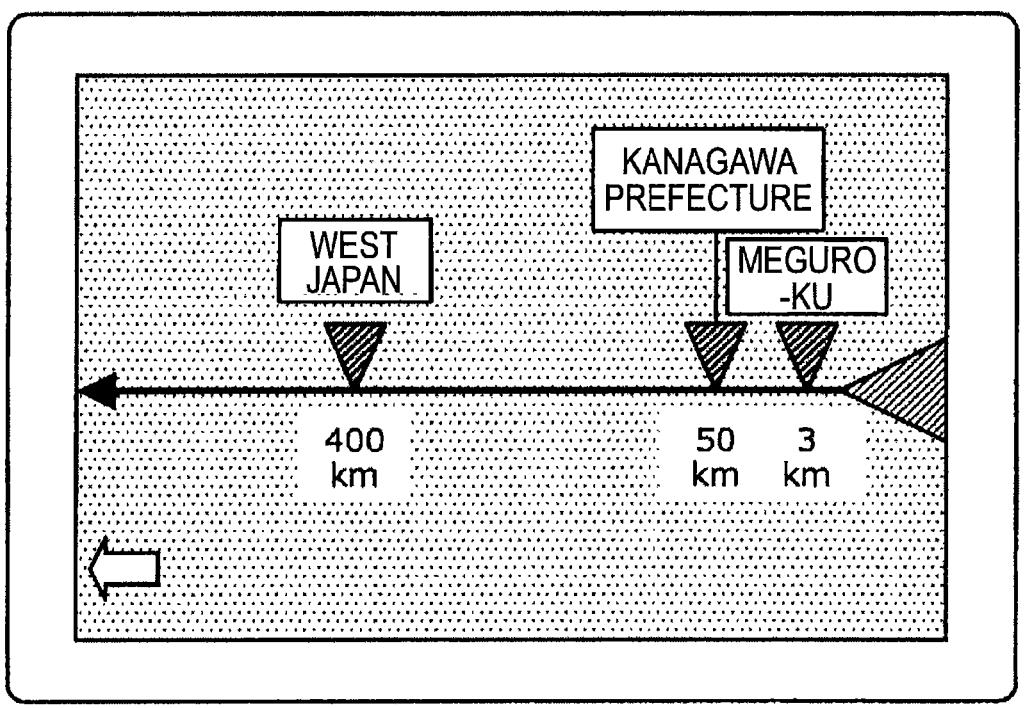
FIG. 34 is an illustration showing an example of the display screen control method according to the embodiment.

When displaying the contents of the group direction indicator over the grayed out map, the display format selection control section 153 may control to display the straight line while maintaining the direction indicated by the group direction indicator as shown in FIG. 33. Also, when displaying the contents of the group direction indicator on the straight line, the display format selection control section 153 may determine the display position of the information like the cluster's name or a separation distance to the cluster corresponding to the distance to the cluster as shown in FIG. 34. With this, the user can more instinctively comprehend that the clusters included in the group direction indicator exist in what positional relationship thereamong.

When displaying the clusters included in the group direction indicator on the straight line, the display format selection control section 153 may control to display not only the object representing the cluster labels and the separation distances of the clusters but also to display objects corresponding to the shape and size of the clusters. With this, the user can instinctively comprehend the size of the clusters (for example, cluster radius).

Figure 35A:
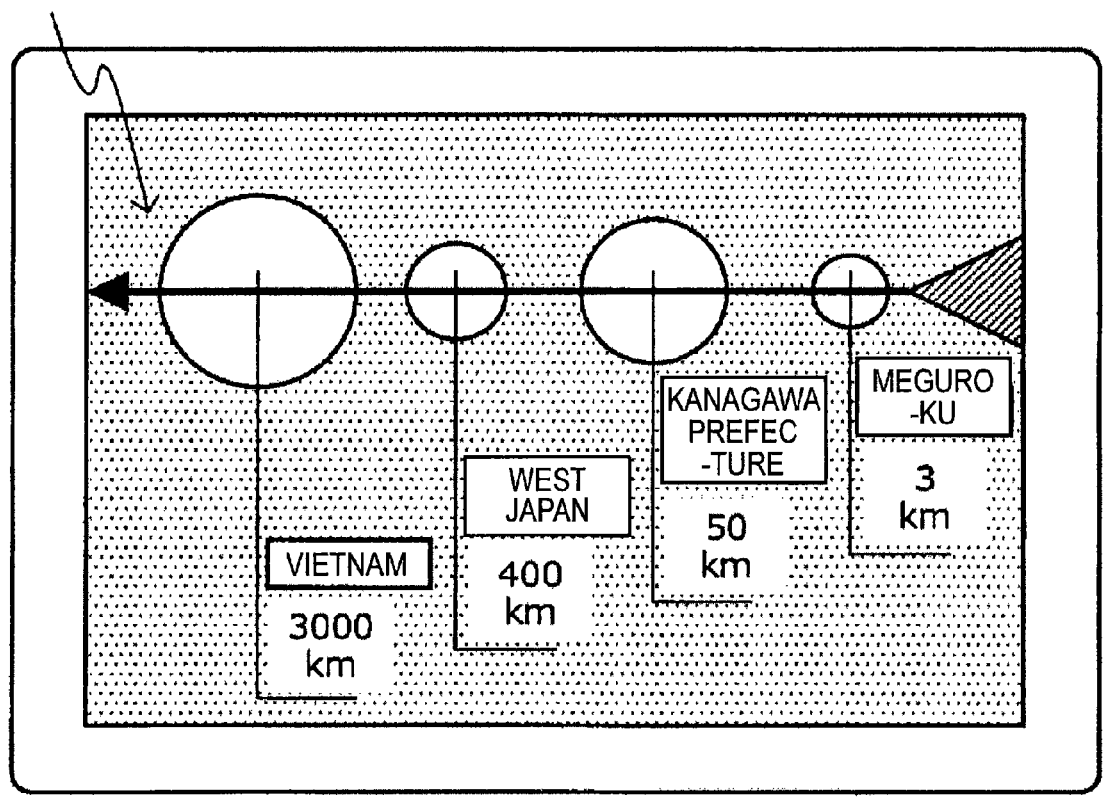
FIG. 35A is an illustration showing an example of the display screen control method according to the embodiment.
Figure 35B:
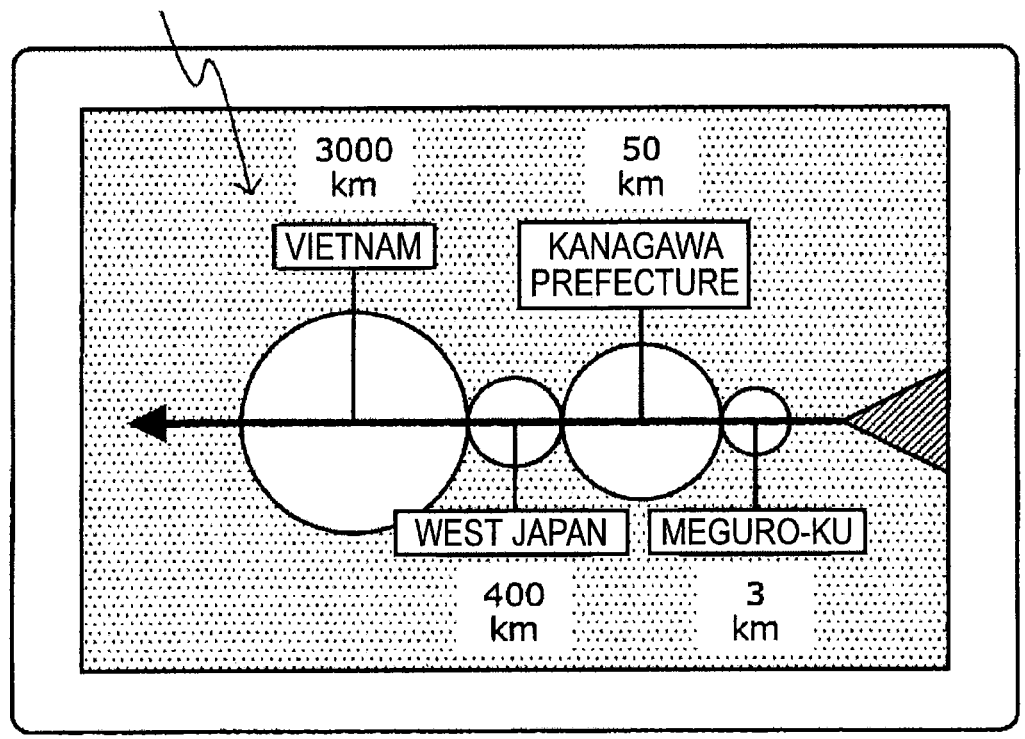
FIG. 35B is an illustration showing an example of the display screen control method according to the embodiment.

In examples shown in FIG. 35A and FIG. 35B, in order to suggest the cluster size to the user, the display format selection control section 153 controls to display object each having circular shape corresponding to the shape of the clusters along with a label indicated with cluster name and the separation distance of the cluster. At this time, in order to prevent the labels indicated with cluster name and separation distance from being overlapped with each other, these labels are preferably displayed, for example, being displaced in a vertical direction or in an L-like shape.

Here, the granularity of the cluster displayed on the display screen (i.e. the size of circle in FIG. 35A, FIG. 35B) may be set so as, for example, to be substantially same granularity of the cluster in the map displayed before being grayed out, or to be the granularity of the cluster different therefrom. In this case, since the size of the object which can be displayed on the display screen is limited, upper limit value and lower limit value of the size of the object are preferably set appropriately.

The display format selection control section 153 may determine the size of the circular object in accordance with the granularity of the cluster included in a group direction indicator so that, in the integrated clusters, a cluster having maximum granularity is the upper limit value of the size of the object, and a cluster having minimum granularity is the lower limit value of the size of the object.

Figure 37:
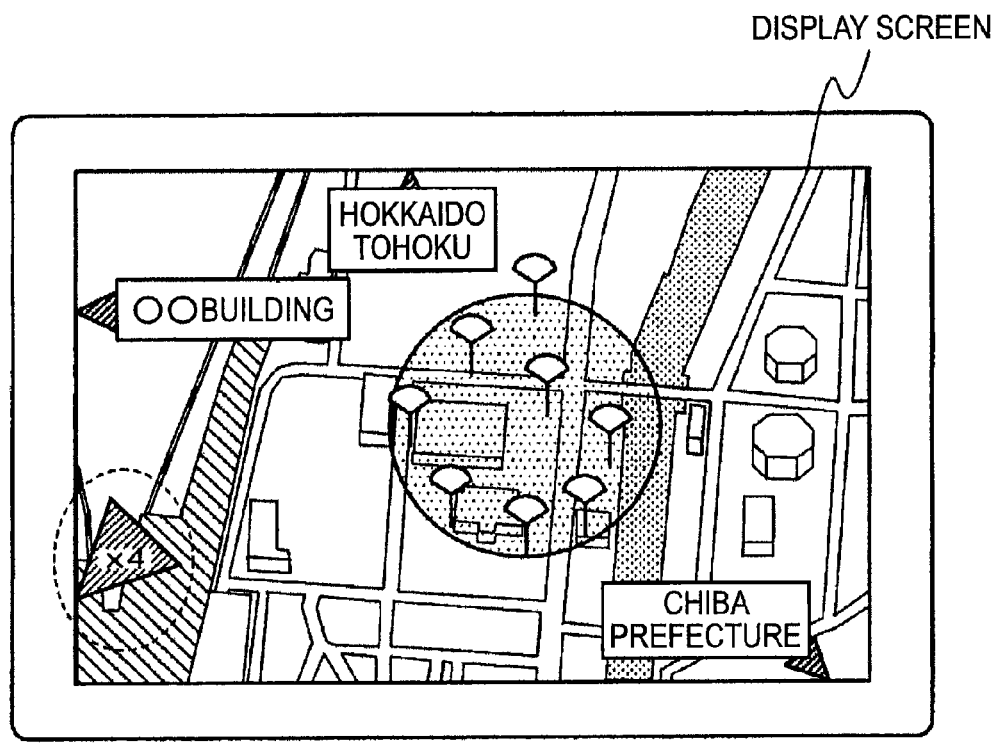
FIG. 37 is an illustration showing an example of the display screen control method according to the embodiment.

The display format selection control section 153 is capable of appropriately changing a graphical user interface (GUI) on the display screen. For example, the display format selection control section 153 may control so as, when a group direction indicator is selected, not to gray out the map but to slide the map along with the group direction indicator to display only a part of the map where the group direction indicator is positioned as shown in FIG. 36. Also, the display format selection control section 153 may control so as, when a group direction indicator is selected, to adjust the reduction ratio of the displayed feature space so that all of the clusters included in the group direction indicator is displayed within the display screen. Also, the display format selection control section 153 may control so as, when a group direction indicator is selected, for example, to display a list of information on the clusters included in the group direction indicator as shown in FIG. 37.

As described above, the display format selection control section 153 according to the embodiment is capable of controlling the display screen by using various kinds of display formats to suggest the existence of clusters or the like located outside the display screen to the user.

Figure 38A:
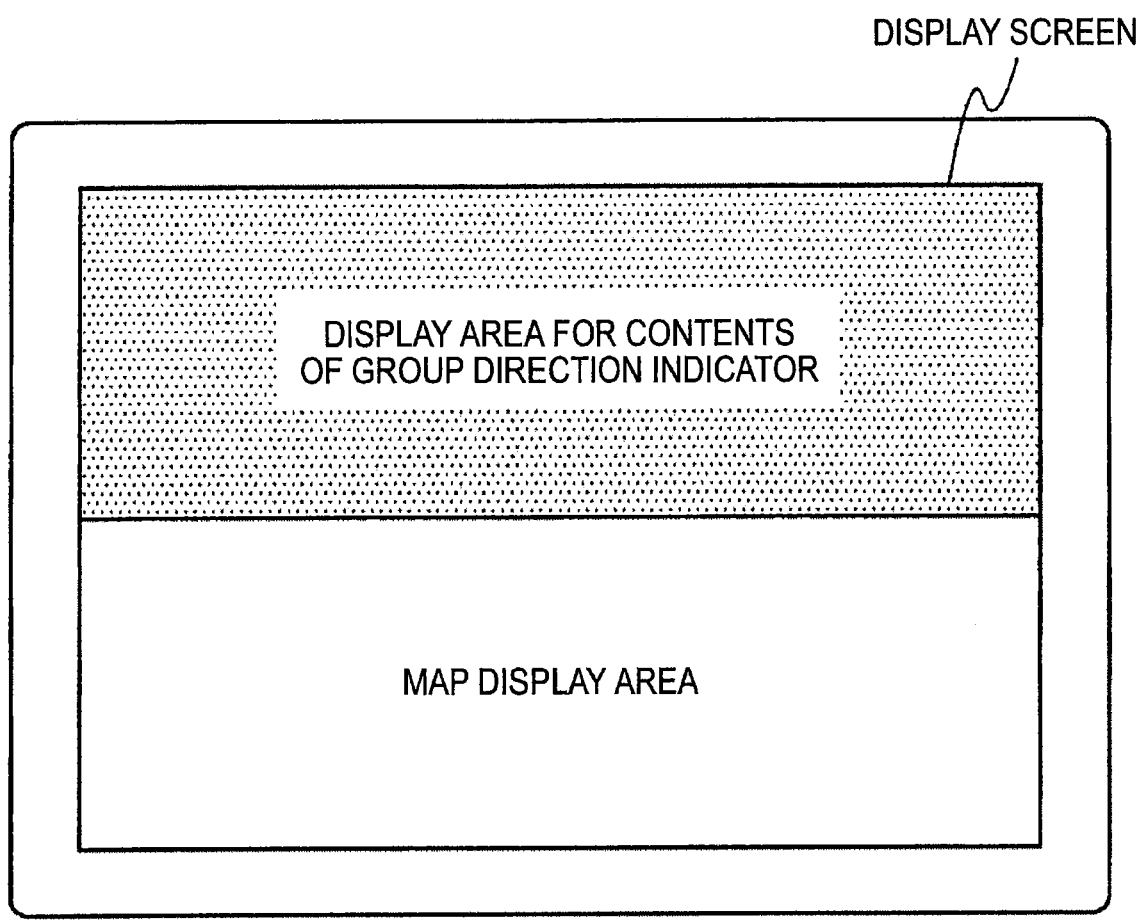
FIG. 38A is an illustration for explaining the display screen control method according to the embodiment.
Figure 38B:
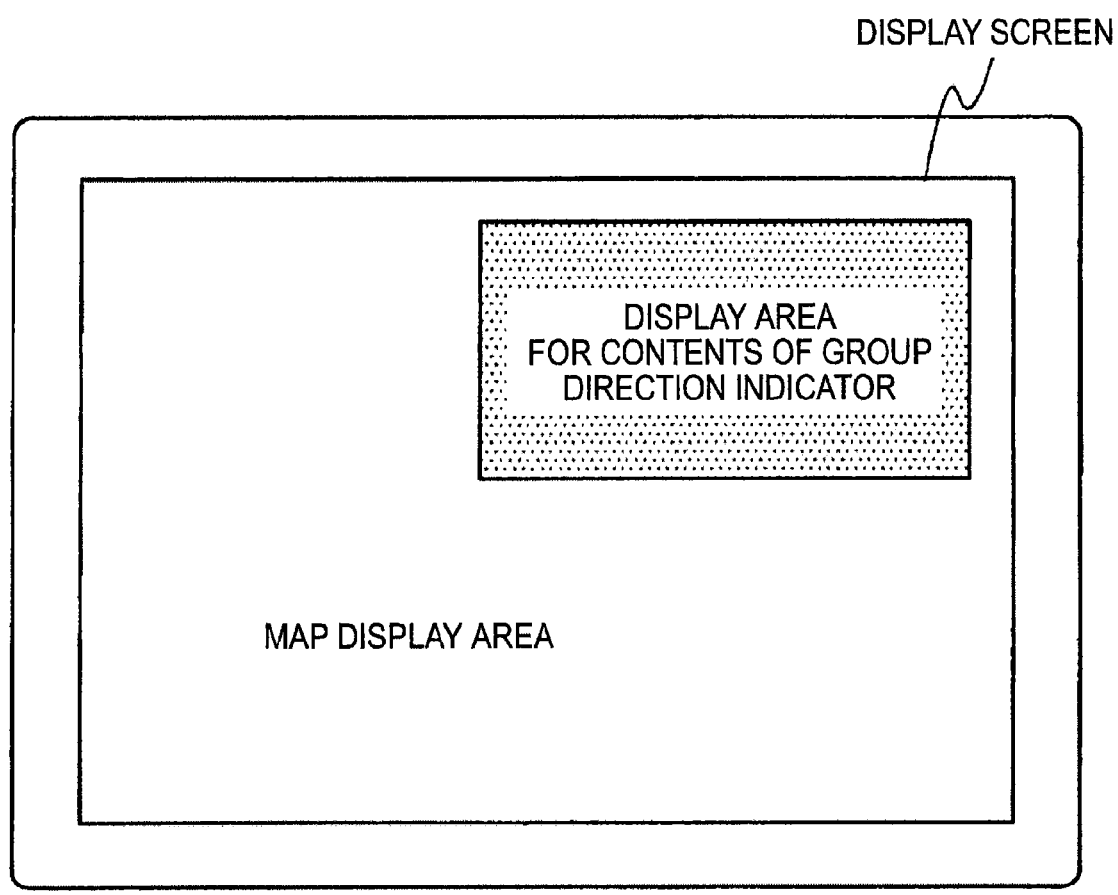
FIG. 38B is an illustration for explaining the display screen control method according to the embodiment.
Figure 39:
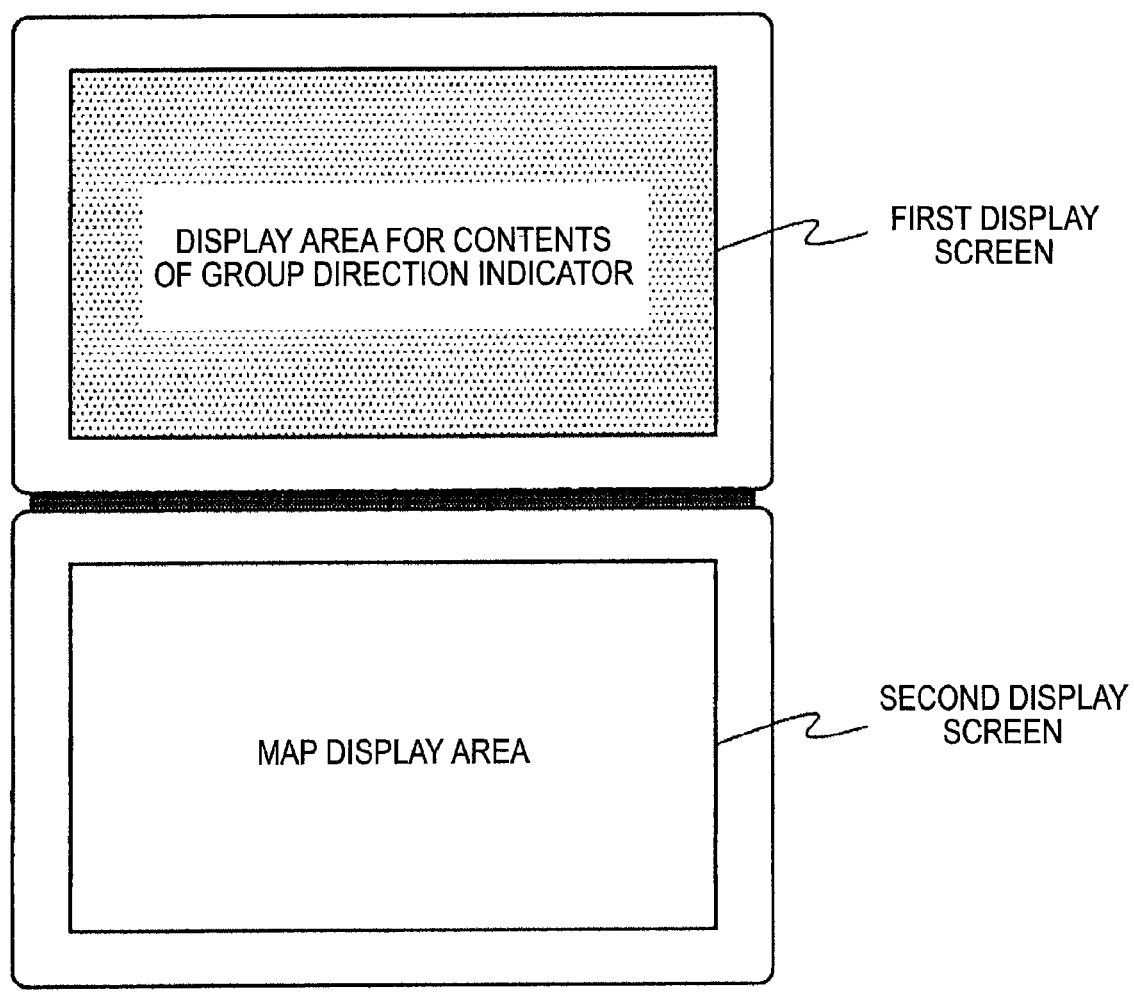
FIG. 39 is an illustration for explaining the display screen control method according to the embodiment.

In the above description, the cases in which when the contents of the group direction indicator are expanded by a user's operation, the display screen is made grayed out once, and the contents of the group direction indicator are displayed using a new layer have been described. However, the embodiment is not limited to the above-described examples. For example, one display screen may be divided into two display areas as shown in FIG. 38A; one for a map display area and the other for group direction indicator content display area. Or, a window may be provided in map display area corresponding to group direction indicator content display area as shown in FIG. 38B. When the information processor 10 according to the embodiment has two display screens, for example, one may be used as a display screen (first display screen) for a group direction indicator content display area and the other for a display screen (second display screen) for map display area as shown in FIG. 39.

In the above description, the case in which a map of two-dimensional plane is displayed on the display screen, and the contents of the group direction indicator are displayed on a straight line has been described. In the case where a three-dimensional space is displayed on the display screen, the displaying method for the contents of the group direction indicator may be set in accordance with the space. For example, when a group direction indicator is selected while a three-dimensional space is displayed on the display screen as shown in FIG. 40, the display screen may be switched to display an overhead view to view a positional relationship of the clusters included in the group direction indicator.

The selection processing (control processing of the display screen) of the display format carried out by the information processor 10 according to the embodiment has been described in particular.

Third Embodiment

The selection processing of the display format according to the second embodiment described above is applicable to the information processor according to the first embodiment. Accordingly, a third embodiment according to the present disclosure below briefly describes a configuration of an information processor which is capable of implementing both of the selection processing of the node (cluster) and the display method of cluster described in the first embodiment and the selection processing of the display format described in the second embodiment.

<Configuration of Information Processor>

Figure 41:
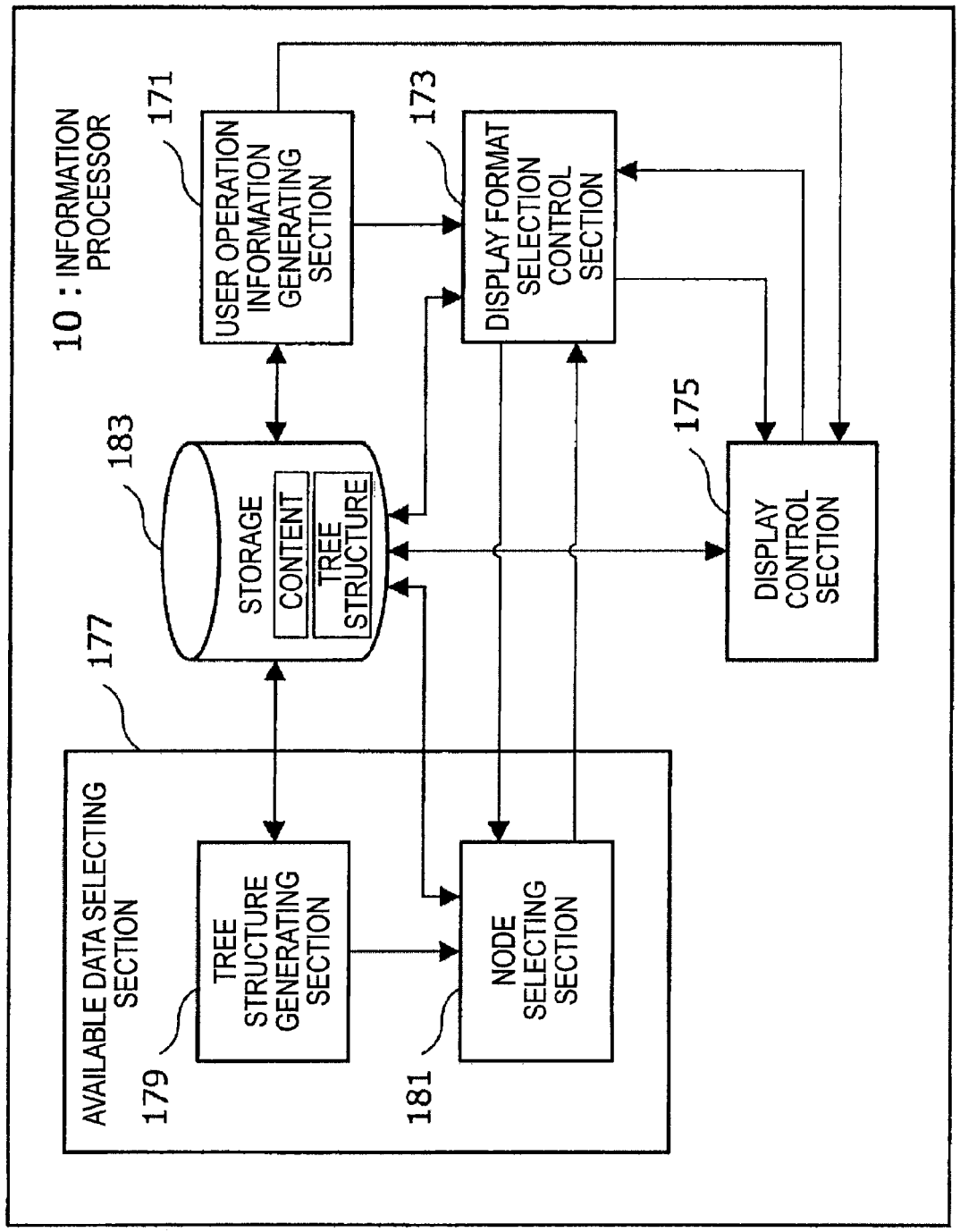
FIG. 41 is a block diagram showing a configuration of an information processor according to a third embodiment of the present disclosure.

FIG. 41 is a block diagram illustrating an example of a configuration of the information processor according to the embodiment.

The information processor 10 according to the embodiment mainly includes a user operation information generating section 171, a display format selection control section 173, a display control section 175, an available data selecting section 177 and a storage 183 as shown in FIG. 41 as an example.

The user operation information generating section 171 includes, for example, a CPU, a ROM, a RAM, an input device and the like. The user operation information generating section 171 generates user operation information which represents operation made by a user (user operation) using an input device such as a keyboard, a mouse, various buttons, a touch panel and the like provided to the information processor 10. After generating the user operation information representing the user's operation, the user operation information generating section 171 outputs the generated user operation information to the display format selection control section 173 and the display control section 175 described below.

The display format selection control section 173 includes, for example, a CPU, a ROM, a RAM and the like. The display format selection control section 173 collaborates with the display control section 175 and the available data selecting section 177 described below to select a display format for displaying at least a part of a feature space which is prescribed based on a predetermined feature amount and a piece of content data or a set (cluster) of content data in accordance with the display screen.

More particularly, the display format selection control section 173 according to the embodiment uses the data (data on node/cluster) selected by the available data selecting section 177 described below to display a cluster included within a display feature area at a generally same granularity of cluster on the display screen as described in the first embodiment. As for an exo-display screen cluster in the clusters selected by the available data selecting section 177, the display format selection control section 173 uses a cluster object as described in the first embodiment to suggest the existence of the exo-display screen cluster to a user. After that, as for exo-display screen clusters which exist in a generally same direction, the display format selection control section 173 displays a group direction indicator on the display screen as described in the second embodiment to prevent the display screen from getting cluttered.

The detailed functions of the display format selection control section 173 according to the embodiment are identical to those described in the first embodiment and the second embodiment. Thus, detailed description is omitted here.

The display control section 175 includes, for example, a CPU, a ROM, a RAM, a communicating device, an output device and the like. The display control section 175 controls the display of the display screen of a display device such as a display provided to the information processor 10 or of a display device such as a display externally provided to the information processor 10. The display control section 175 controls the display of the display screen based on the user operation information notified from the user operation information generating section 171, the information on the display format of the display screen notified from the display format selection control section 173, and the like.

The available data selecting section 177, which is an example of the selection section, includes, for example, a CPU, a ROM, a RAM and the like. The available data selecting section 177 selects data on the contents and clusters to be used by the display format selection control section 173 based on the method described in the first embodiment, in which the feature space and the size displayed on the display screen are focused by using the previously generated tree structure. The available data selecting section 177 further includes a tree structure generating section 179 and a node selecting section 181 as shown in FIG. 41.

The tree structure generating section 179 and the node selecting section 181 have the same configuration and effect as the tree structure generating section 111 and the node selecting section 107 according to the first embodiment of the present disclosure. Therefore, detailed description is omitted here.

The storage 183 is an example of the storage device provided to the information processor 10 according to the embodiment. The storage 183 may store various kinds of content data stored in the information processor 10 and metadata corresponding to the content data and the like. The storage 183 also may store tree structure data corresponding to the tree structure generated by the tree structure generating section 179 or an external information processor. Further, the storage 183 may store application data corresponding to various kinds of application which are used by the display format selection control section 173 and the display control section 175 for displaying various kinds of information on the display screen. Moreover, the storage 183 stores various kinds of database and the like and parameters, which are generated by the information processor 10 during carrying out some processing, or suspended processing to be stored accordingly. The storage 183 allows the processing sections included in the information processor 10 according to the embodiment to write thereon and read therefrom at any time.

An example of the functions of the information processor 10 according to the embodiment has been described above. For the component elements described above, general purpose units or circuits or hardware dedicated to a specific function of a component element may be included. Furthermore, every function of the respective component elements may be carried out by a CPU or the like. Accordingly, applied configuration may be appropriately changed in accordance with the technical art at the point when the embodiment is implemented.

It is possible to create a computer program for achieving the above-described functions of the information processor according to the embodiment to be mounted to a personal computer or the like. Also, a computer readable record medium which stores a computer program as above may be provided. As for the record medium, for example, a magnetic disk, an optical disk, a magnetic optical disk, a flash memory and the like are available. The above computer program may be delivered via, for example, a network, without using any recording medium.

The functions of the information processor 10 according to the embodiment may be achieved by a plurality of devices which are connected to each other via various kinds of network, or by a plurality of devices which are directly connected to each other to collaborate with each other.

(Hardware Configuration)

Figure 42:
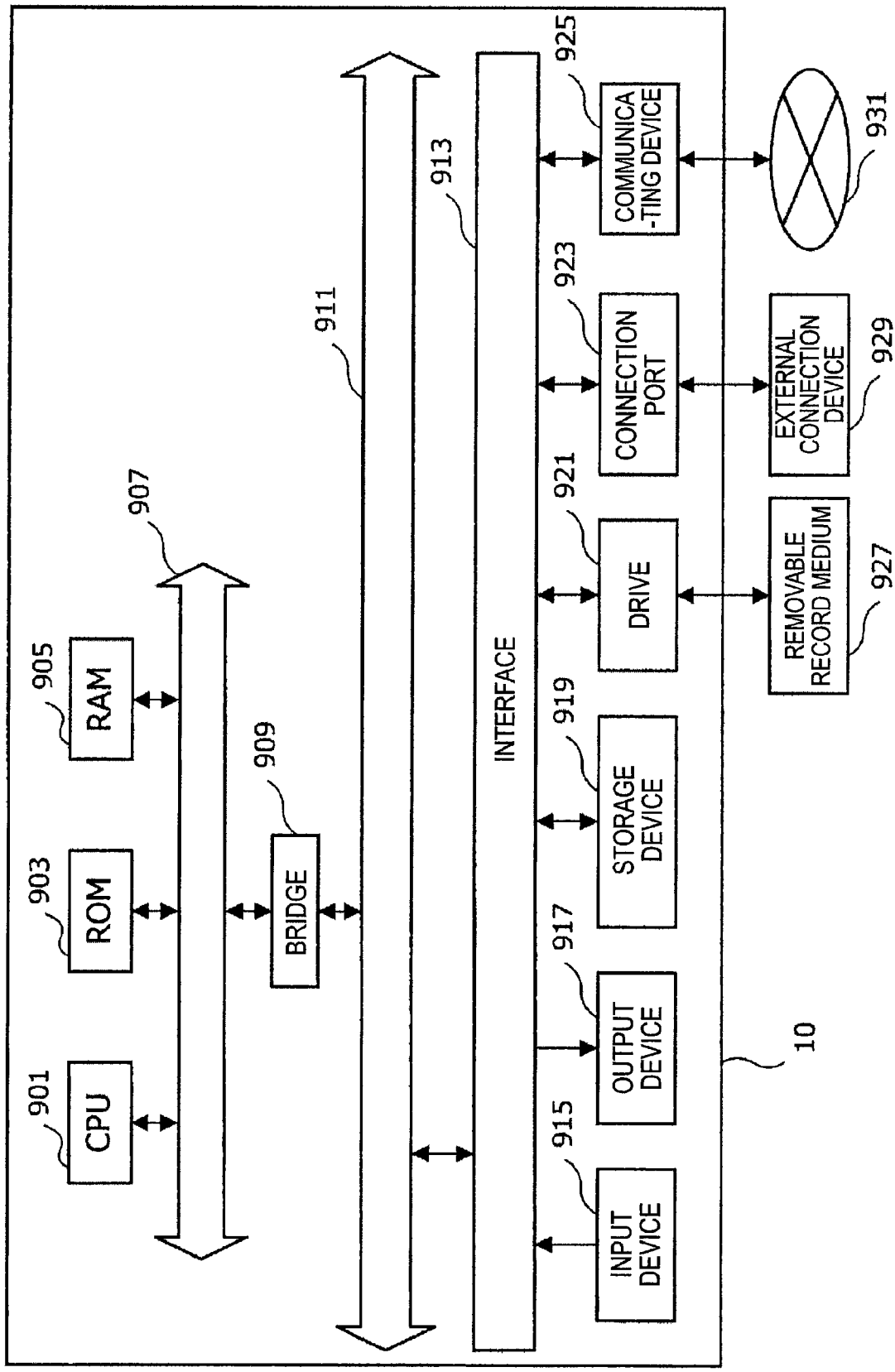
FIG. 42 is a block diagram illustrating a hardware configuration of the information processor according to the embodiment of the present disclosure.

Now referring to FIG. 42, hardware configuration of the information processor 10 according to the embodiment of the present disclosure will be described in detail. FIG. 42 is a block diagram for explaining the hardware configuration of the information processor 10 according to the embodiment of the present disclosure.

The information processor 10 includes mainly a CPU 901, a ROM 903 and a RAM 905. The information processor 10 further includes a host bus 907, a bridge 909, an external bus 911, an interface 913, an input device 915, an output device 917, a storage device 919, a drive 921, a connection port 923 and a communicating device 925.

The CPU 901 functions as an arithmetic processing unit and a control device to control entire or a part of operation in the information processor 10 in accordance with various kinds of programs recorded in the ROM 903, RAM 905, storage device 919 or removable record medium 927. The ROM 903 stores programs, operation parameters and the like used by the CPU 901. The RAM 905 temporarily stores programs used by the CPU 901, and parameters which are appropriately changed during executing the programs. These are connected to each other through a host bus 907 including an internal bus such as CPU bus.

The host bus 907 is connected to an external bus 911 such as PCI (peripheral component interconnect/interface) bus via a bridge 909.

The input device 915 is an operation device for allowing a user to operate thereon including, for example, a mouse, a keyboard, a touch panel, a button, a switch, a lever and the like. The input device 915 may be, for example, a remote control device (so-called, remote) which uses infrared light or other radio wave, or an external connection device 929 such as a mobile phone, a PDA or the like corresponding to the operation of the information processor 10. The input device 915 further includes, for example, an input control circuit which generates an input signal based on information input by a user and outputs the same to the CPU 901 using the above-described operation device. By operating the input device 915, a user of the information processor 10 is able to input various kinds of data to give an instruction of a processing operation to the information processor 10.

The output device 917 includes a device which is capable of providing obtained information to a user in a visual or auditory manner. As such device, display devices including a CRT display device, a liquid crystal display device, a plasma display device, an EL display device and a lamp and the like; audio output devices such as speaker, head phone and the like; a printer unit; a mobile phone; a facsimile and the like are available. The output device 917 outputs, for example, a result obtained by various kinds of processing made by the information processor 10. In particular, the display device displays the result of various kinds of processing made by the information processor 10 in a form of text or an image. On other hand, an audio output device converts audio signals of reproduced voice data or acoustic data into analog signals and outputs the same.

The storage device 919 is an example of a storage device configured for storing data of the information processor 10. The storage device 919 may be, for example, magnetic memory devices such as a HDD (hard disk drive), a semiconductor memory device, an optical memory device or an optical magnetic memory device. The storage device 919 stores a program executed by the CPU 901, various kinds of data, and various kinds of data obtained from the outside.

The drive 921 is a reader/writer for record medium, which is included in the information processor 10 or externally provided thereto. The drive 921 reads information recorded in a magnetic disk, an optical disk, a magnetic optical disk, or a removable record medium 927 such as semiconductor memory or the like mounted thereon, and outputs the same to the RAM 905. The drive 921 can also write a record on a magnetic disk, an optical disk, a magnetic optical disk mounted thereon, or a removable record medium 927 such as semiconductor memory or the like. The removable record medium 927 may be, for example, a DVD media, a HD-DVD media, a Blu-ray media or the like. The removable record medium 927 may be a CompactFlash (registered mark), a flash memory, or an SD memory card (secure digital memory card) or the like. The removable record medium 927 may be, for example, an IC card (integrated circuit card) mounted with non-contact IC chip or an electronic device.

The connection port 923 is a port for directly connecting a device to the information processor 10. As an example of the connection port 923, a USB (universal serial bus) port, an IEEE 1394 port, an SCSI (small computer system interface) port and the like are available. As another example of the connection port 923, an RS-232C port, an optical audio terminal, an HDMI (high-definition multimedia interface) port and the like are available. By connecting the external connection device 929 to the connection port 923, the information processor 10 obtains various kinds of data directly from the external connection device 929 and provides various kinds of data to the external connection device 929.

The communicating device 925 is a communication interface including, for example, a communication device or the like for connecting to communication network 931. The communicating device 925 may be, for example, a wired or wireless LAN (local area network), Bluetooth (registered mark) or a communication card for WUSB (Wireless USB) or the like. The communicating device 925 may be a router for optical communication, a router for ADSL (asymmetric digital subscriber line) or a modem for various kinds of communication. The communicating device 925 is capable of transmitting and receiving signals via, for example, Internet or other communication device in accordance with a predetermined protocol like, for example, TCP/IP. The communication network 931 connected to the communicating device 925 may include a network or the like connected in a wired or wireless manner such as for example, Internet, a home LAN, an infrared communication, a radiofrequency communication or a satellite communication.

A example of hardware configurations capable of achieving the functions of the information processor 10 according to the embodiment of the present disclosure has been described above. The above-described component elements may include a general purpose unit or circuit, or hardware each specialized to the functions of the component elements may be included. Therefore, the applied configuration may be appropriately changed in accordance with the technical art at the point when the embodiment is implemented.

The user operation device 20 and the information processing server 30 described in the first modification of the information processor according to the first embodiment of the present disclosure have the same configuration as the hardware configuration of the information processor 10 according to the embodiment of the present disclosure. Therefore, detailed description is omitted here.

Preferred embodiments of the present disclosure have been described in detail referring to the appended drawings. However, technical range of the present disclosure is not limited to the examples described above. It is clear that a person ordinarily skilled in the art of the present disclosure may easily conceive various changes or modifications within a range of technical spirit disclosed in the claims. It should be understood that such changes or modifications are included in the technical range of the present disclosure.

Additionally, the present technology may also be configured as below.

(1) An information processor, comprising:

a selection section that selects a set of content data satisfying a predetermined condition from a group of content data each associated with a piece of positional information representing a position in a feature space prescribed based on a predetermined feature amount as metadata; and a display format selection control section that selects a display format for displaying at least a part of the feature space and the set of the content data selected by the selection section in accordance with a display screen, wherein the display format selection control section is configured to:

with respect to a set of the content data located outside the displayed feature space as the feature space to be displayed on the display screen, display an object which includes a direction indicator indicating a direction of existence of the set of the relevant content data within the display screen, and when each of a plurality of the direction indicators indicates a similar direction to each other, further integrate the relevant plurality of direction indicators into a new direction indicator to display the new direction indicator on the display screen.

(2) The information processor according to (1), wherein the selection section selects the set of content data corresponding to the direction indicator so as to have a size of the set in the feature space corresponding to a separation distance from the displayed feature space.

(3) The information processor according to (1) or (2), wherein, when the new direction indicator is selected by a user operation, the display format selection control section controls to display a piece of information on the set of the content data included in the new direction indicator while reflecting the separation distance to the set of the relevant content data.

(4) The information processor according to (3), wherein the display format selection control section further controls to display an object which reflects a shape and a size of the feature space corresponding to the set of the relevant content data as a piece of information on the set of the content data included in the new direction indicator.

(5) The information processor according to (3) or (4), wherein, when the new direction indicator is selected by a user operation, the display format selection control section controls to move the selected new direction indicator to an end opposite to an end of the display screen which intersects with a direction indicated by the selected new direction indicator, and then controls to display the information on the set of the content data.

(6) The information processor according to any one of (1) to (5), wherein the feature space is a space representing a position on the earth surface prescribed by degrees of latitude and longitude.

(7) The information processor according to any one of (1) to (5), wherein the feature space is a space prescribed by a feature amount that specifies a position on a plane or space.

(8) An information processing method, comprising:

selecting a set of content data which satisfies a predetermined condition from a group of content data associated with a piece of positional information representing a position in a feature space prescribed based on a predetermined feature amount as metadata; and selecting a display format for displaying at least a part of the feature space and a set of the selected content data in accordance with a display screen, wherein, when selecting the display format, with respect to the set of the content data located outside a displayed feature space as the feature space to be displayed on the display screen, an object including a direction indicator indicating a direction of existence of the set of the relevant content data is displayed within the display screen, and when indicating a direction in which a plurality of the direction indicators indicate a similar direction to each other, the relevant plurality of direction indicators are further integrated into a new direction indicator so as to be displayed on the display screen.

(9) A program for causing a computer to achieve:

a selection function to select a set of content data satisfying a predetermined condition from a group of content data each associated with a piece of positional information representing a position in a feature space prescribed based on a predetermined feature amount as metadata; and a display format selection control function to select a display format for displaying at least a part of the feature space and the set of the content data selected by the selection function in accordance with a display screen, wherein the display format selection control function is configured to, with respect to a set of the content data located outside a displayed feature space as the feature space to be displayed on the display screen, to display an object which includes a direction indicator indicating a direction of existence of the set of the relevant content data within the display screen, and when each of a plurality of the direction indicators indicates a similar direction to each other, to further integrate the relevant plurality of direction indicators into a new direction indicator to display the new direction indicator on the display screen.

The present disclosure contains subject matter related to that disclosed in Japanese Priority Patent Application JP 2011-130543 filed in the Japan Patent Office on Jun. 10, 2011, the entire content of which is hereby incorporated by reference.

What is claimed is:

1. An information processor, comprising:
   circuitry configured to
   select a set of content data satisfying a predetermined condition from a group of content data each associated with a piece of positional information representing a position in a feature space prescribed based on a predetermined feature amount as metadata,
   select a display format for displaying at least a part of the feature space and the set of the content data selected by the circuitry in accordance with a display screen,
   with respect to a set of the content data located outside the displayed feature space as the feature space to be displayed on the display screen, display an object which includes a direction indicator indicating a geographical direction of existence of the set of the relevant content data within the display screen, the circuitry being configured to display the object, which includes the direction indicator indicating the geographical direction, in a first size, in response to the set of the relevant content data being at a first distance from a center position of the display screen, and to display the object, which includes the direction indicator indicating the geographical direction, in a second size different from the first size, in response to the set of the relevant content data being at a second distance from the center position of the display screen, and
   when each of a plurality of the direction indicators indicates a similar direction to each other, further integrate the relevant plurality of direction indicators into a new direction indicator to display the new direction indicator on the display screen.

2. The information processor according to claim 1, wherein the circuitry is configured to select the set of content data corresponding to the direction indicator so as to have a size of the set in the feature space corresponding to a separation distance from the displayed feature space.

3. The information processor according to claim 2, wherein, when the new direction indicator is selected by a user operation, the circuitry is configured to control to display a piece of information on the set of the content data included in the new direction indicator while reflecting the separation distance to the set of the relevant content data.

4. The information processor according to claim 3, wherein the circuitry is further configured to control to display an object which reflects a shape and a size of the feature space corresponding to the set of the relevant content data as a piece of information on the set of the content data included in the new direction indicator.

5. The information processor according to claim 3, wherein, when the new direction indicator is selected by the user operation, the circuitry is further configured to control to move the selected new direction indicator to an end opposite to an end of the display screen which intersects with a direction indicated by the selected new direction indicator, and to control to display the information on the set of the content data.

6. The information processor according to claim 1, wherein the feature space is a space representing a position on the earth surface prescribed by degrees of latitude and longitude.

7. The information processor according to claim 1, wherein the feature space is a space prescribed by a feature amount that specifies a position on a plane or space.

8. An information processing method, comprising:
   selecting a set of content data which satisfies a predetermined condition from a group of content data associated with a piece of positional information representing a position in a feature space prescribed based on a predetermined feature amount as metadata;
   selecting a display format for displaying at least a part of the feature space and a set of the selected content data in accordance with a display screen;
   when selecting the display format, with respect to the set of the content data located outside a displayed feature space as the feature space to be displayed on the display screen, displaying an object including a direction indicator indicating a geographical direction of existence of the set of the relevant content data is displayed within the display screen, the displaying displaying the object, which includes the direction indicator indicating the geographical direction, in a first size, in response to the set of the relevant content data being at a first distance from a center position of the display screen, and displaying the object, which includes the direction indicator indicating the geographical direction, in a second size different from the first size, in response to the set of the relevant content data being at a second distance from the center position of the display screen; and
   when indicating a direction in which a plurality of the direction indicators indicate a similar direction to each other, further integrating the relevant plurality of direction indicators into a new direction indicator so as to be displayed on the display screen.

9. A non-transitory computer-readable storage medium including computer executable instructions, wherein the instructions, when executed by a computer, cause the computer to perform a method, the method comprising:
   selecting a set of content data satisfying a predetermined condition from a group of content data each associated with a piece of positional information representing a position in a feature space prescribed based on a predetermined feature amount as metadata;
   selecting a display format for displaying at least a part of the feature space and the set of the content data in accordance with a display screen;
   with respect to a set of the content data located outside a displayed feature space as the feature space to be displayed on the display screen, displaying an object which includes a direction indicator indicating a geographical direction of existence of the set of the relevant content data within the display screen, the displaying displaying the object, which includes the direction indicator indicating the geographical direction, in a first size, in response to the set of the relevant content data being at a first distance from a center position of the display screen, and displaying the object, which includes the direction indicator indicating the geographical direction, in a second size different from the first size, in response to the set of the relevant content data being at a second distance from the center position of the display screen; and
   when each of a plurality of the direction indicators indicates a similar direction to each other, further integrating the relevant plurality of direction indicators into a new direction indicator to display the new direction indicator on the display screen.

* * * * *